United States Patent [19]

Nakata

[11] Patent Number: 5,640,225
[45] Date of Patent: Jun. 17, 1997

[54] BACKLASH COMPENSATION FOR AUTOMATIC FOCUSING APPARATUS

[75] Inventor: Masahiro Nakata, Tokyo, Japan

[73] Assignee: Asahi Kogaku Kogyo Kabushiki Kaisha, Tokyo, Japan

[21] Appl. No.: 467,801

[22] Filed: Jun. 6, 1995

Related U.S. Application Data

[62] Division of Ser. No. 185,239, Jan. 24, 1994, Pat. No. 5,448,329, which is a continuation of Ser. No. 884,077, May 15, 1992, abandoned.

[30] Foreign Application Priority Data

| May 15, 1991 | [JP] | Japan | 3-206605 |
| May 15, 1991 | [JP] | Japan | 3-206606 |
| May 15, 1991 | [JP] | Japan | 3-206607 |
| May 15, 1991 | [JP] | Japan | 3-206608 |
| May 15, 1991 | [JP] | Japan | 3-206609 |

[51] Int. Cl.⁶ ......................... G03B 13/36
[52] U.S. Cl. ...................... 396/135; 396/134
[58] Field of Search ................ 354/400, 402

[56] References Cited

U.S. PATENT DOCUMENTS

| 4,537,487 | 8/1985 | Tanaguchi et al. | 354/400 |
| 4,550,995 | 11/1985 | Toyama | 354/403 |
| 4,783,677 | 11/1988 | Hamada et al. | 354/402 |
| 4,800,410 | 1/1989 | Akashi et al. | 354/408 |
| 4,816,856 | 3/1989 | Hamada et al. | 354/402 |
| 4,860,045 | 8/1989 | Hamada et al. | 354/402 |
| 4,868,592 | 9/1989 | Suzuki et al. | 354/400 |

(List continued on next page.)

FOREIGN PATENT DOCUMENTS

| 0298486 | 7/1988 | European Pat. Off. |
| 0347042 | 12/1989 | European Pat. Off. |
| 349736 | 1/1990 | European Pat. Off. |
| 0364137 | 4/1990 | European Pat. Off. |
| 0382143 | 8/1990 | European Pat. Off. |
| 58-059416 | 4/1983 | Japan |
| 60-214325 | 10/1985 | Japan |
| 61-165716 | 7/1986 | Japan |
| 3289775 | 12/1991 | Japan |
| 2224126 | 10/1989 | United Kingdom |
| 2250828 | 6/1992 | United Kingdom |

OTHER PUBLICATIONS

English Language Abstract of Japanese Publication No. 60-214325.
Search Report—United Kingdom Application 9210487.6.
Patent Abstract of Japan vol. 10, No. 371 (P-526) Dec. 11, 1986 and JP-A-61 165 716.
Patent Abstract of Japan vol. 16, No. 124 (E-1183) Mar. 3, 1992 and JP-A-03 289 775.
Preliminary Search Report—French Appliaction 92 12522.
Patent Abstract of Japan vol. 7, No. 146 (P-206) Jun. 25, 1983 and JP-A-58 059 416.
Search Report—United Kingdom Application 9505187.6.
Search Report—United Kingdom Application 9505186.8.
Search Report—United Kingdom Application 9505185.0.
Search Report—French Application 92 12521.
Search Report—French Application 92 05919.

*Primary Examiner*—W. B. Perkey
*Attorney, Agent, or Firm*—Greenblum & Bernstein P.L.C.

[57] ABSTRACT

A focus detecting apparatus including an optical system having a group of focusing lenses, an object distance measuring device which measures the amount of defocus for a specific object imaged by the focusing optical system, a focus judging device which judges the focus state in accordance with the measurement of the object distance measuring device and a lens driver for driving the focusing lens group to a focal position, in accordance with the amount of defocus, wherein the apparatus includes a controller for repeatedly operating the object distance measuring device and the lens driver, and a moving object judging device for judging that the specific object is a moving object when the focus judging device judges the out-of-focus state more than one time during the repeated operations.

10 Claims, 36 Drawing Sheets

U.S. PATENT DOCUMENTS

| | | | |
|---|---|---|---|
| 4,908,647 | 3/1990 | Ueyama | 354/402 |
| 4,924,250 | 5/1990 | Hamada et al. | 354/402 |
| 4,952,962 | 8/1990 | Suzuki et al. | 354/400 |
| 4,967,224 | 10/1990 | Hamada et al. | 354/402 |
| 4,969,006 | 11/1990 | Ishibashi et al. | 354/402 |
| 4,980,715 | 12/1990 | Utagawa | 354/402 |
| 4,988,856 | 1/1991 | Hamada et al. | 354/402 X |
| 5,000,605 | 3/1991 | Ohara et al. | 401/209 |
| 5,005,039 | 4/1991 | Hamada et al. | 354/402 |
| 5,008,605 | 4/1991 | Ohara et al. | 354/400 |
| 5,012,267 | 4/1991 | Higashihara | 354/400 X |
| 5,036,349 | 7/1991 | Suzuki et al. | 354/402 |
| 5,040,015 | 8/1991 | Hamada et al. | 354/400 X |
| 5,065,175 | 11/1991 | Suzuki et al. | 354/400 |
| 5,066,968 | 11/1991 | Suzuki et al. | 354/400 |
| 5,157,434 | 10/1992 | Suzuki et al. | 354/402 |
| 5,276,476 | 1/1994 | Uenaka | 354/400 |
| 5,291,235 | 3/1994 | Uenaka | 354/402 |
| 5,321,459 | 6/1994 | Uenaka | 354/400 |
| 5,359,382 | 10/1994 | Uenaka | 354/400 |
| 5,416,559 | 5/1995 | Uenaka | 354/402 |
| 5,448,329 | 9/1995 | Nakata | 354/402 |

BACKLASH COMPENSATION FOR AUTOMATIC FOCUSING APPARATUS

This application is a division, of application Ser. No. 08/185,239, filed Jan. 24, 1994, now U.S. Pat. No. 5,448,329 which is a a continuation of application Ser. No. 07/884,077, filed May 15, 1992, now abandoned.

BACKGROUND OF THE INVENTION

1. Field of the Invention

The present invention relates to an automatic focus detecting and adjusting apparatus for optical instruments. More precisely, it relates to an automatic focusing apparatus which detects a moving object, that is to be photographed, by following the movement of the object and automatically and precisely focusing on the object.

Also, the present invention relates to an automatic focusing apparatus in which a backlash of a lens driving system can be controlled.

2. Description of Related Art

In a known focus detecting apparatus (automatic focusing apparatus) of a camera having a moving object predicting AF mode, a projected position of the moving object (i.e., a future position of the object after a predetermined period of time) is determined in accordance with the movement of the object, so that the focus is adjusted for the projected position. In such a known focus detecting apparatus having a moving object predicting AF mode, the mode is switched between the moving object predicting AF mode and a normal AF mode in which the focus is adjusted for a moving or stationary object at the moment of measurement of the object distance, respectively. Consequently, for example, in sports photographing, since an object to be photographed, i.e., a player, is neither constantly at rest or in movement, it is necessary to frequently switch the AF mode in accordance with the state of the player.

However, frequent switching of the AF mode is troublesome. Furthermore, if sudden movement of the object occurs when a picture is taken in the normal AF mode, a photographer is unable to quickly switch the AF mode to the moving object predicting AF mode, or vice versa, resulting in a missed photograph.

Furthermore, in a conventional moving object predicting AF mode, when the object is moving, the projected position thereof at which the object would be in a predetermined period of time is predicted, so that the focus is adjusted for the projected position, as mentioned above. The focusing lens is moved by a predetermined displacement in accordance with the predicted position preceding or subsequent to the completion of movement of the object.

The prediction requires a complex calculation which takes a relatively long time, resulting in decreased follow-up efficiency. To increase the calculation speed, it is necessary to use an expensive CPU (central processing unit).

There is a known optical instrument, such as a camera, having an automatic focusing function in which an object distance or amount of defocus by a taking lens is photoelectrically detected to automatically indicate "out of focus" or "in focus" (focus indication) or automatically move the taking lens to a focal position (automatic focusing). In a focus detecting apparatus incorporated in such an optical instrument, continuous measurements of the object distance are sometimes carried out to increase focusing accuracy.

However, particularly in a phase difference detecting type of focus detecting apparatus, a measurement error exists for the same object under the same measuring conditions when the contrast of the object is low. Consequently, due to the measurement error, the focusing lens unit which is located at a correct focusing position is moved to an incorrect position (i.e., out of focus position) by mistake, or a symbol representing "in focus" blinks to indicate "out of focus".

Furthermore, an automatic focusing apparatus, in which the object distance or the defocus amount of the object image is photoelectrically detected so that the focusing lens unit is moved in accordance with the detected result to effect automatic focusing, is also known.

In the above described automatic focusing apparatus, backlash between an AF motor (drive source) and focusing lens unit driving mechanism occurs. Therefore, if the direction of movement of the focusing lens unit changes, it is necessary to eliminate the backlash effect. To this end, in the prior art, a value (displacement value) corresponding to the backlash is added to a value (displacement value) calculated in accordance with the defocus amount, so that the focusing lens unit is moved by the resultant displacement.

The primary object of the present invention is to provide a focus detecting apparatus which can check whether an object to be photographed is a moving object.

Another object of the present invention is to provide an automatic focus adjusting apparatus in which when the object is a moving object, a focusing lens is moved in accordance with the speed of the moving object.

Still another object of the present invention is to provide a focus detecting apparatus free from maloperation caused by measurement error, particularly at low contrast.

Still another object of the present invention is to provide an automatic focusing apparatus in which the displacement of a focusing lens unit necessary to absorb a backlash can be easily calculated to effect precise control.

SUMMARY OF THE INVENTION

To achieve the primary object mentioned above, according to the present invention, there is provided a focus detecting apparatus that includes an optical system having a group of focusing lenses, an object distance measuring means for measuring an amount of defocus for a specific object imaged by the focusing optical system, a focus judging means for judging a focusing state in accordance with a measurement of the object distance measuring means, and a lens driving means for driving the focusing lens group to a focal position in which the specific object is in-focus, in accordance with the amount of defocus, wherein the focus detecting apparatus is characterized by a control means for repeatedly operating the object distance measuring means and the lens driving means, and a moving object judging means for judging that the specific object is a moving object when the focus judging means judges an out-of-focus state more than one time during the repeated operations.

The present disclosure relates to subject matter contained in Japanese patent application Nos. HEI3-206605, HEI3-206606, HEI3-206607, HEI3-206608, and HEI3-206609, (all filed on May 15, 1991) which are expressly incorporated herein by reference in its entirety.

BRIEF DESCRIPTION OF THE DRAWINGS

The invention will be described below in detail with reference to the accompanying drawings, in which;

FIG. 19 is a graph showing the second moving object predicting AF mode operation shown in FIG. 18, when a release switch is turned ON;

DESCRIPTION OF THE PREFERRED EMBODIMENTS

Figure 1:
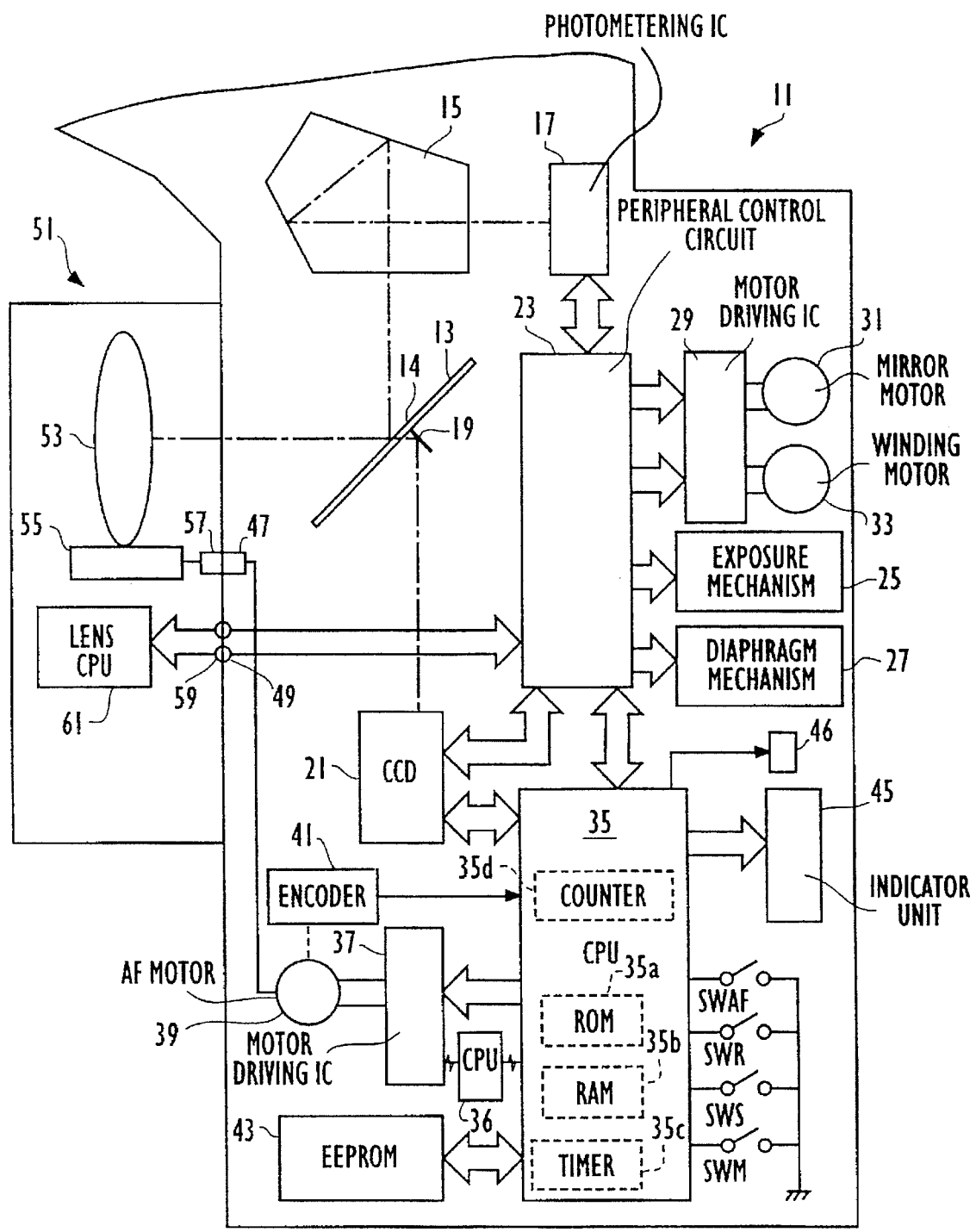
FIG. 1 is a block diagram of a single lens reflex camera having therein an automatic focusing apparatus according to the present invention.

FIG. 1 shows a block diagram of an automatic focusing (AF) single lens reflex camera to which the present invention is applied. The AF single lens reflex camera includes a camera body 11, and a taking lens 51 which is detachably attached to the camera body 11. A large part of a bundle of light rays transmitted through the taking lens 51 of the camera body 11 is reflected by a main mirror 13 towards a pentagonal prism 15 which constitutes a finder optical system. A part of the reflected light is made incident upon a light receiving element (not shown) of a photometering IC 17. The incident light transmitted through the lens 53 is partly transmitted through a half mirror portion 14 of the main mirror 13 and is reflected downwardly by an auxiliary mirror 19 to be made incident on an object distance measuring CCD sensor unit 21.

The light receiving element provided in the photometering IC 17 outputs electrical signals corresponding to the quantity of light received thereby. Analogue output signals are logarithmically compressed in the photometering IC 17 and sent to a main CPU 35 through a peripheral control circuit 23 to be converted to digital signals in the CPU 35. The main CPU 35 calculates optimum exposure factors (i.e., shutter speed and/or diaphragm value) in accordance with an object brightness and film sensitivity, and so on. As a result, a releasing operation is carried out (i.e., shutter mechanism 25 and diaphragm mechanism 27 are driven) in accordance with the optimum shutter speed and diaphragm value to expose the film. When the releasing operation is effected, the peripheral control circuit 23 drives a mirror motor 31 through a motor driving circuit 29 to effect an up-down movement of the main mirror 13. Upon completion of exposure, a winding motor 33 is driven to wind the film.

The object distance measuring CCD sensor unit 21 comprises a phase difference detecting type sensor having a beam splitter for splitting a bundle of light rays (object light) and CCD line sensors which receives the respective split beams and integrates them (i.e., photoelectric conversion and accumulation of electric charges). The object distance measuring CCD sensor unit 21 outputs the integration data by the CCD line sensors to the main CPU 35 as a control means. The object distance measuring CCD sensor unit 21 is driven and controlled by the main CPU 35 and the peripheral control circuit 23. The CCD sensor unit 21 has a monitoring element through which the peripheral control circuit 23 detects the brightness of an object to be photographed, so that the integration time is varied in accordance with the object brightness.

The main CPU 35 performs a predetermined calculation (prediction calculation) to calculate the amount of defocus in accordance with the integration data output from the photometering CCD sensor unit 21, to thereby obtain the direction of rotation and the number of revolutions (i.e., number of pulses of an encoder 41) of the AF motor 39 in accordance with the defocus amount. As a result, the main CPU 35 drives the AF motor 39 through the AF motor drive circuit 37 in accordance with the direction of rotation and the number of pulses of the AF motor 39 thus obtained. The main CPU 35 detects and counts the number of pulses output by the encoder 41 in accordance with the rotation of the AF motor 39 and stops the AF motor 39 when the counted value reaches the number of pulses. The main CPU 35 normally drives the AF motor 39 by DC control, and maintains the AF motor 39 at low constant speed (constant speed control) in accordance with the interval of the pulses output from the encoder 41. The rotation of the AF motor 39 is transmitted to the taking lens 41 through a joint 47 provided on a mount of the camera body 11 and a joint 57 provided on a mount of the taking lens 51 to be connected to the joint 47.

"DC control", referred to above, is indicative of the AF motor 39 being driven by a substantially direct current. "Constant speed control", referred to above, is indicative of the AF motor 39 being driven at a constant speed. "DC control" and "constant speed control" are realized by a PWM control (pulse width modulation) control circuit in the illustrated embodiment.

The main CPU 35 is connected to a photometering switch SWS which is turned ON when a release button (not shown) is depressed half way, a release switch SWR which is turned ON when the release button is fully depressed by, an automatic focusing switch SWAF, and a main switch SWM which is actuated to turn ON and OFF a power source connected to the main CPU 35 and the peripheral elements, etc. The main CPU 35 indicates the set AF, exposure value, photographic modes, shutter speed, diaphragm value, etc., in indicator unit 45 which is usually provided on an outer surface of the camera body 11 and within the field of view of a finder.

The main CPU 35 serves not only as a control means for generally controlling the whole camera system, but also as a focus detecting means and a moving object judging (checking) means. The main CPU 35 constitutes an object distance measuring means together with the CCD sensor unit 21 and the peripheral control circuit 23, etc., and a lens driving means together with the AF motor 39 etc., respectively.

The taking lens 51 includes a focus adjusting mechanism 55 for moving a focusing lens unit (group) 53 in the optical axis direction, the lens joint 57 provided on the lens mount of the taking lens and connected to the body joint 47 of the camera body 11 to transmit the rotation of the AF motor 39 to the focus adjusting mechanism 55, and a lens CPU 61 for calculating necessary data of the taking lens 51. The lens CPU 61 is connected to the peripheral control circuit 23 of the camera body 11 through a group of electrical contacts 59 and 49, so that data communication between the main CPU 35 and the lens CPU 61 is effected through the peripheral control circuit 23. The data sent from the lens CPU 61 to the peripheral control circuit 23 includes an open diaphragm value, maximum diaphragm value, focal length, and K value, etc. The K value represents the number of pulses of the encoder 41 (i.e., number of revolutions of the AF motor 39) necessary for moving the image plane formed by the taking lens by a predetermined unit displacement (e.g., 1 mm).

The following discussion will be directed to the AF operation with reference to FIGS. 2 through 9.

The AF operation of the single lens reflex camera starts when the photometering switch SWS is turned ON. In the AF operation, the photometering CCD sensor unit 21 commences a first integration. Thereafter, the main CPU 35 calculates the amount of defocus and the number of drive pulses in accordance with the integration data. Consequently, the AF motor 39 is driven in accordance with the number of drive pulses thus obtained. In the illustrated embodiment, the AF mode functions in the same way that the normal AF mode functions when the object is still, and functions as the above-mentioned moving object predicting AF mode when the object moves. Furthermore, the Af mode also includes an AF single mode in which the focused state is locked when no object moves, and a focus priority AF mode in which release can be effected only in the focused state.

Figure 2:
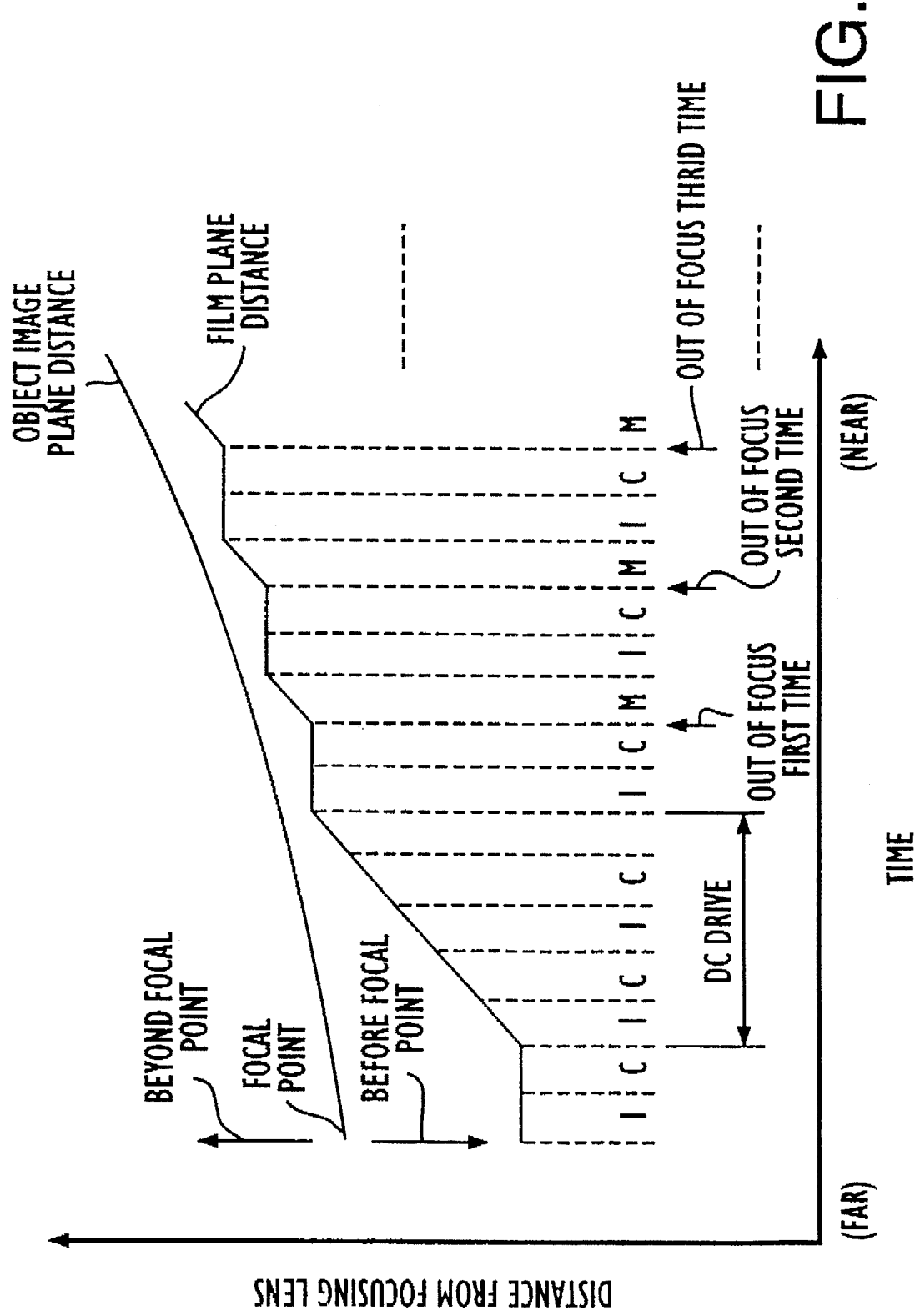
FIG. 2 is a graph showing an AF mode operation prior to a moving object predicting AF mode in the automatic focusing apparatus shown in FIG. 1.
Figure 3:
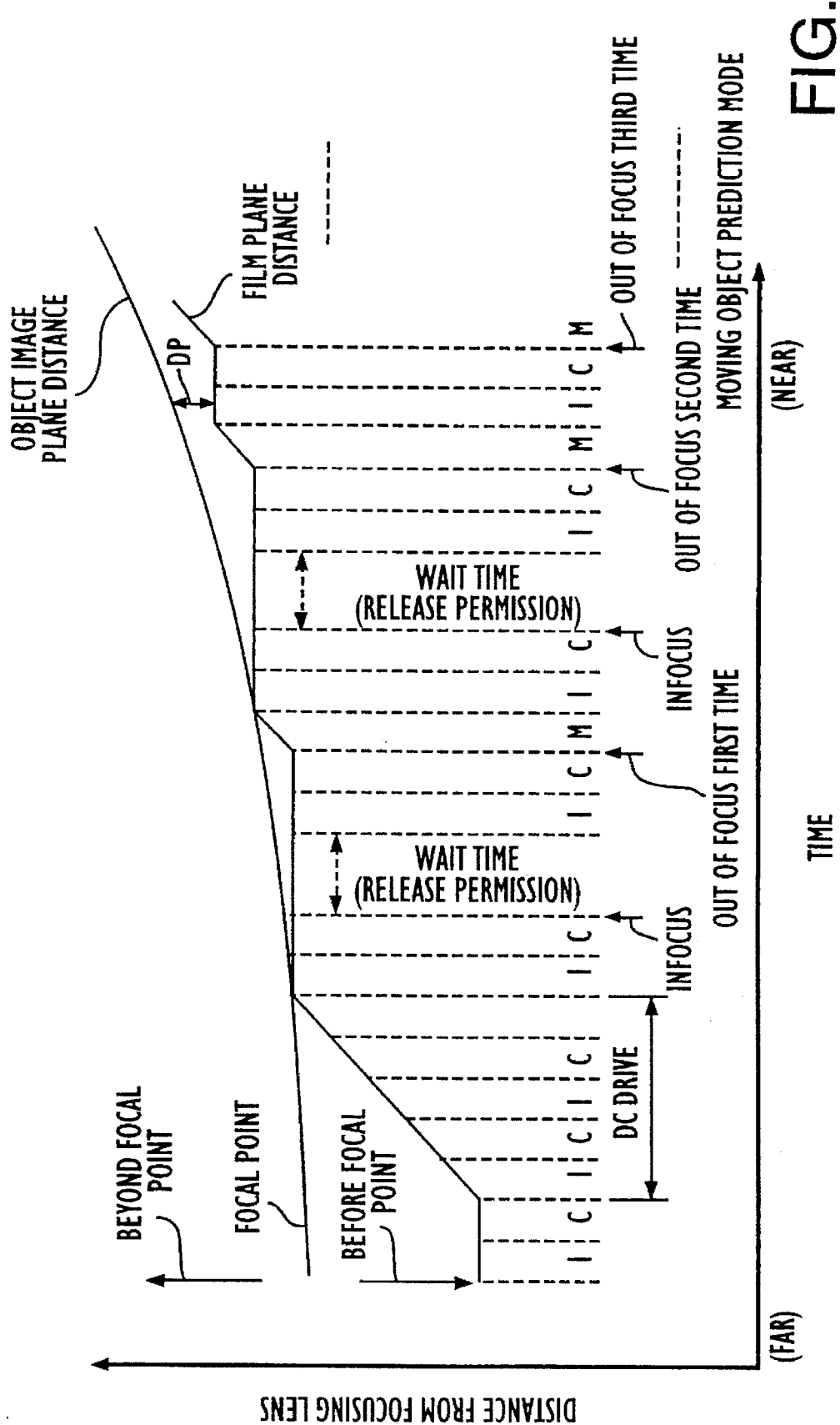
FIG. 3 is a graph showing another AF mode operation prior to a moving object predicting AF mode in the automatic focusing apparatus shown in FIG. 1.

The operation prior to the moving object tracing AF operation (i.e., moving object predicting AF mode) is as follows (FIGS. 2 and 3).

The graphs of FIGS. 2 and 3 show the relationship between the position of an object image plane and the position of a plane equivalent to a film plane (focal position), with respect to the position (reference position) of the focusing lens 53 when the moving object approaches the camera. In FIGS. 2 and 3, "I" designates the integration operation, "O" the calculation operation and "M" the movement of the lens (lens driving operation), respectively.

When control enters the AF operation after the photometering switch SWS is turned ON, the lens (i.e., the AF motor 39) is driven in accordance with the displacement (i.e., number of drive pulses) obtained by the first integration operation I and calculation C. In the illustrated embodiment, as a result of the first integration and calculation after the photometering switch SWS is turned ON, if the defocus amount (i.e., number of drive pulses) is above a predetermined value, the integration operation and calculation are repeated during the movement (drive) of the lens. If the defocus amount becomes smaller than the predetermined value during the repeated integration and calculation, the subsequent integration operation and calculation are stopped, and the lens is moved in accordance with the number of drive pulses obtained by the latest integration operation and calculation. The integration operation and calculation will also be referred to as an object distance measuring operation hereinafter.

Upon completion of the first lens driving operation, the integration operation and calculation are again effected to check whether the object is in-focus. If the object is in-focus, the object may be considered still, with a slight possibility that the object is moving. To compensate for the slight possibility that the object is moving, the object distance measuring operation is effected after the lapse of a predetermined time and if necessary, the lens is driven. If the main routine is interrupted by the operation of the release switch SWR during the predetermined time, release is effected. If there is no interruption, the object distance measuring operation and the lens driving operation are repeated while the photometering switch SWS is ON.

If a focused state is not attained during a predetermined number of repeated object distance measuring operations and lens driving operations (e.g., three times), the object is deemed to be a moving object, and control enters the moving object predicting AF mode routine (FIG. 3).

In an alternative embodiment, the object distance measuring operation and the lens driving operation are repeated, while the photometering switch SWS is ON, and if a focused state is not attained during the three consecutive object distance measuring operations and lens driving operations after the object is once focused, control enters the moving object predicting AF mode routine (FIG. 3).

Moving Object Predicting AF Mode:

The moving object predicting AF mode routine will be discussed below.

Figure 4:
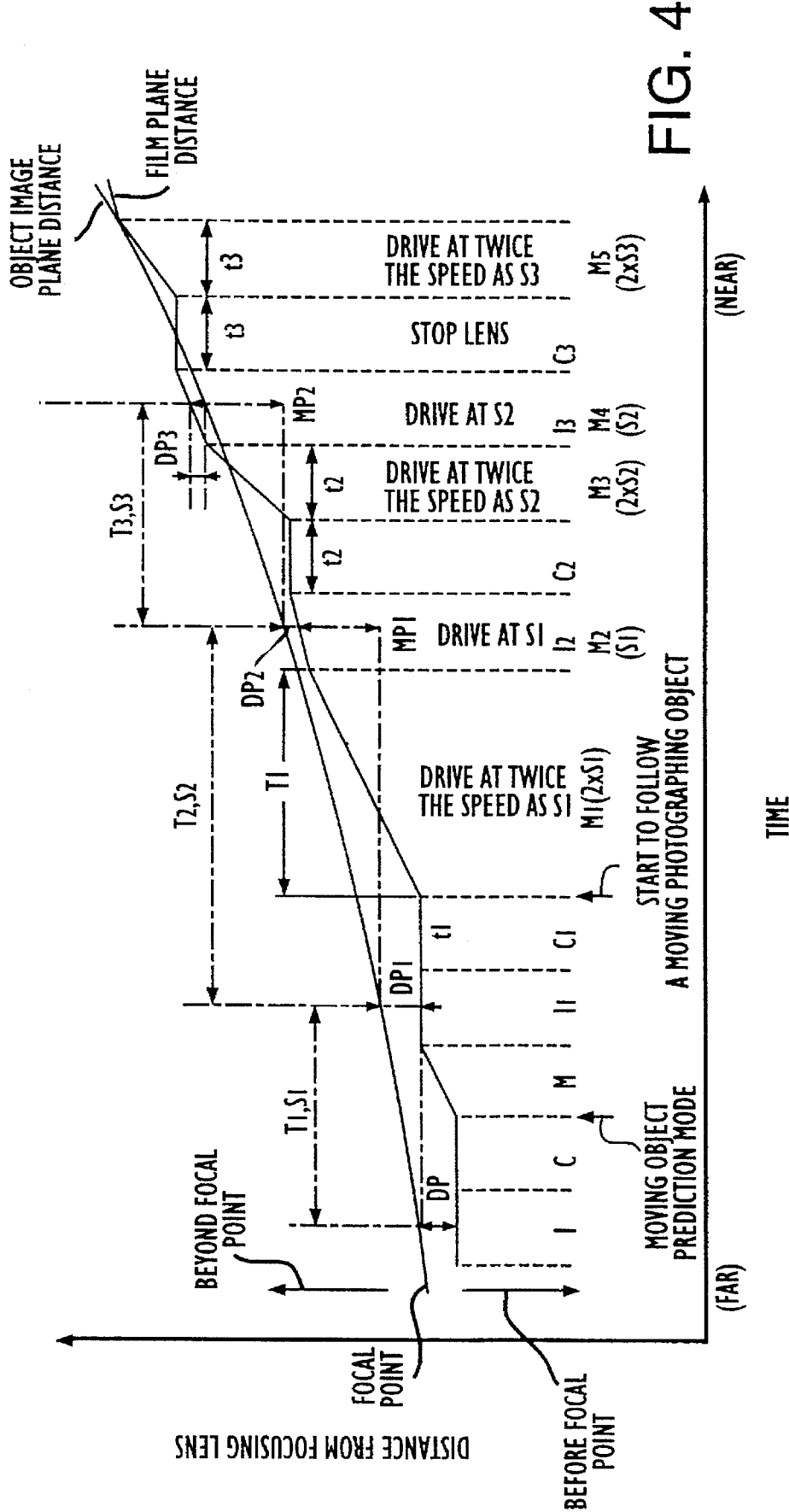
FIG. 4 is a graph showing an AF mode operation in a moving object predicting AF mode in the automatic focusing apparatus shown in FIG. 1.
Figure 5:
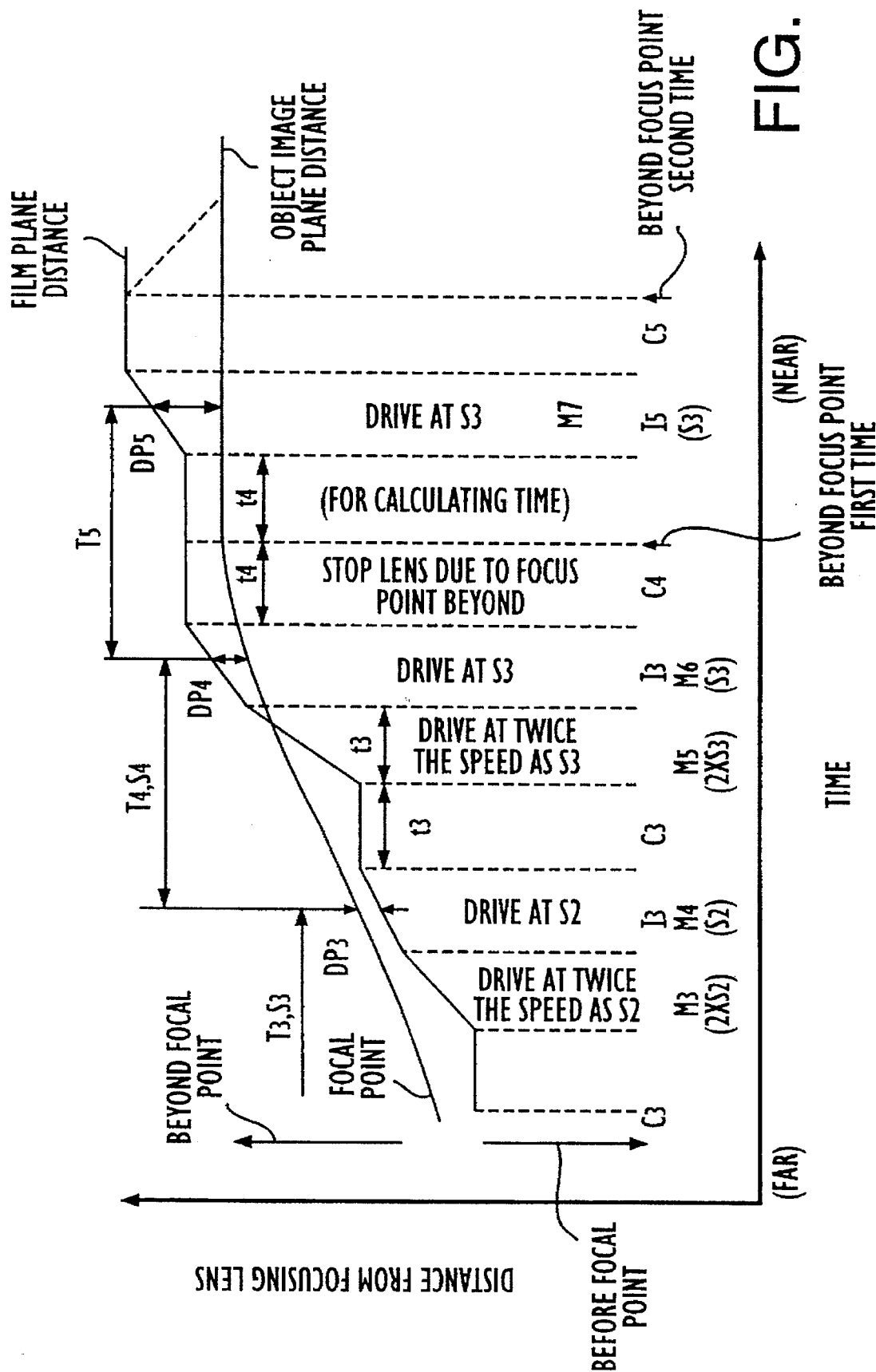
FIG. 5 is a graph showing an AF mode operation in an excess state in a moving object predicting AF mode in the automatic focusing apparatus shown in FIG. 1.

FIGS. 4 and 5 are graphs showing the operation in the moving object predicting AF mode, by way of example. When a defocus amount DP (i.e., number of pulses) is obtained by the calculation C in accordance with the integration operation I, which is performed when the object is a moving object, the lens is driven (lens drive M) in accordance with the defocus amount DP.

Upon completion of the lens drive M, the integration operation $I_1$ (I1) is carried out again to calculate a defocus pulse number $DP_1$ (DP1). Thereafter, moving speed (moving object following speed) S of the object image plane is calculated by calculation $C_1$ (C1) in accordance with time $T_1$ between an intermediate point of preceding integration operation I and an intermediate point of the present integration operation $I_1$. Thereafter, to make the object image plane coincident with the film plane within a short space of time, constant speed control $M_1$ (multiplied speed lens driving operation) is effected in time $T_1$ (T1) at a speed several times (e.g. two times that of) the moving object following speed S. While integration operation $I_2$ is performed after a doubled lens driving operation $M_1$ (M1) is completed, constant speed control (lens driving operation) $M_2$ is effected at a moving object following speed $S_1$. The moving speed of the object image plane corresponds to the speed of the movement of the object image plane, formed by the taking lens 51, in the optical axis direction.

Upon completion of the integration operation $I_2$, the lens drive $M_2$ is finished, and calculation $C_2$ is performed. In the calculation $C_2$, the moving object following speed $S_2$, of the object image plane is calculated in accordance with the defocus pulse number $DP_2$, the calculated moving pulse number $MP_1$ of the moving object, and the time $T_2$ between the integration operations $I_1$ and $I_2$. Consequently, the multiplied speed lens drive $M_3$ is performed at a speed two times the moving object following speed $S_2$ for the time $t_2$ in which the calculation $C_2$ has been effected. When multiplied lens drive $M_3$ is completed, integral $I_3$ commences. During the integration operations $I_3$, multiplied lens drive $M_4$ is performed at a moving object following speed $S_3$.

The focusing lens 53 may move beyond the focal position due to the double speed lens drive. For example, in FIG. 4, the excess displacement is represented by defocus pulse number $DP_3$ in the double speed lens drive $M_3$. If the excess displacement (defocus pulse number $DP_3$) is below a predetermined value; it can be considered that the object is continuing to move. Accordingly, multiplied speed lens drive $M_5$ is performed at a double speed of the moving object following speed $S_3$ after calculation $C_3$ is finished.

Conversely, the excess displacement (defocus pulse number $DP_3$) may be larger than the predetermined value. There are several cases that may have caused this, for example, the moving speed of the object may have been decreased, the object may have stopped moving, or the direction of the movement of the object may have changed, etc. In these cases, a checking operation is performed without effecting the lens driving operation, for example, as shown in FIG. 5.

In FIG. 5, if the excess defocus pulse number $DP_4$ above the predetermined value is obtained by integration operation $I_4$, no operation (lens driving operation) is effected for time $t_4$ which has been required for calculation $C_4$. Thereafter, upon commencement of subsequent integration operation $I_5$, tracing (following) lens drive $M_7$ is effected at object following speed $S_3$ obtained in the preceding calculation $C_4$. If defocus pulse number $DP_5$ within the predetermined value is obtained, by integration operation $I_5$, the tracing AF operation (i.e., normal multiplied speed lens driving operation) is performed.

If an object image cannot be brought within the focus range, even by the two checking operations in which a multiplied lens driving operation is not effected, and since it is considered that either the speed of the object has decelerated, the object has stopped moving, or the direction of the movement of the object has changed, control is returned from the moving object predicting AF mode to the normal AF mode, as shown in FIG. 2.

As can be seen from the foregoing, the change in state (i.e., direction, speed, etc.) of the moving object can be detected by the two checking operations of the focus state. Although the twice checking operations are repeated in the illustrated embodiment, the number is not limited to two and can be more than two. Furthermore, it is possible to realize a modified construction in which a tracing lens driving operation is not effected in the checking operations.

Calculation 1 of Moving Object Tracing Speed (Object Image Moving Speed):

The moving object following speed S can be calculated as follows (FIGS. 4 and 5).

The first moving object following speed $S_1$ is obtained by the equation below, in accordance with the defocus pulse number $DP_1$ obtained by the first integration operation $I_1$ and the time $T_1$ between the intermediate point of the preceding integration operation I and the intermediate point of the present integration operation $I_1$:

$$X_1 = T_1/DP_1 \quad (ms) \qquad (1)$$

$$S_1 = 1/X_1 \qquad (2)$$
$$= DP_1/T_1 \quad (pulse/ms)$$

wherein $X_1$ (X1) is an output cycle (ms) of the pulses generated by the encoder 41.

The moving object following speed $S_1$ is substantially or approximately equal to the moving speed of the object image plane.

The multiplied lens drive $M_1$ is carried out at a speed ($2 \cdot DP_1/T_1$), two times the moving object following speed $S_1$ thus obtained, during the time $T_1$, corresponding to the integration operation time (interval) $T_1$, so that the focusing lens 53 is moved to the vicinity of the focal position at high speed. Thereafter, the tracing lens drive $M_2$ is effected at the moving object following speed $S_1$ during the integration operation $I_2$ to follow the movement of the moving object.

Calculation 2 of Moving Object Tracing Speed Sn:

During the trace of the movement of the moving object, moving object tracing speed Sn is obtained as follows:

First, a lens drive pulse number $MP_1$ corresponding to the displacement which is obtained on the assumption that the object continues moving at the moving object tracing speed $S_2$ in time $T_2$ between the intermediate point of the preceding integration operation $I_1$ and the intermediate point of the present integral $I_2$ is obtained by equation (3) below:

$$MP_1 = T_2 \times S_1 \qquad (3)$$

Thereafter, output cycle $X_2$ of the AF pulse corresponding to the object tracing speed $S_2$ is first obtained in accordance with time $T_2$ between the intermediate point of the preceding integration operation $I_1$ and the intermediate point of the present integration operation $I_2$, the pulse number $MP_1$ which is assumed to correspond to the displacement within the time $T_2$, and the present defocus pulse number $DP_2$. The object tracing speed $S_2$ is then obtained, as follows:

$$X_2 = T_2/(MP_1 + DP_2) \quad (ms) \qquad (4)$$

$$S_2 = 1/X_2 \qquad (5)$$
$$= (MP_1 + DP_2)/T_2 \quad (pulse/ms)$$

The lens drive $M_2$ is effected at a speed twice that of the object following speed $S_2$ for time $t_2$ required for the calculation $C_2$. After the lens drive $M_2$ at double speed is finished, the lens drive $M_3$ is effected at the moving object following speed $S_2$ for the time period of integration operation $I_3$ to follow the movement of the moving object.

Note that the defocus pulse number DP is represented by a scalar value in the calculations mentioned above, the sign (+ or −) depending on a front focus or rear focus. Accordingly, in the case of an excess displacement, the pulse number $MP_1$ corresponding to the displacement within the time $T_2$ is subtracted by the present defocus pulse number $DP_2$.

For example, $$MP_{n-1} = T_n \times S_{n-1} \qquad (6)$$

$$X_n = T_n/(MP_{n-1} \pm DP_n) \qquad (\text{ms}) \qquad (7)$$

$$S_n = 1/X_n \qquad (\text{pulse/ms}) \qquad (8)$$

repeated calculations of the equations (6), (7), and (8) mentioned above and the lens driving operation and the integration operations in accordance with the calculation results make it possible to follow the movement of the object as shown in the drawings. In the illustrated embodiments, since the calculated moving pulse number $MP_{n-1}$ (MPn−1) of the object image and the calculated defocus pulse number $DP_n$ (DPn) are absolute numbers, $(MP_{n-1} \pm DP_n)$ in equation (7) is replaced by $(MP_{n-1}+DP_n$ and $(MP_{n-1}-DP_n)$ or (MPn−1−DPn) in the case of a rear focus and a front focus, respectively.

As can be understood from the above discussion, after the calculation is finished, the lens is driven at the speed two times the moving object following speed that is $S_1$ for the time required for the calculation. This is because the image plane must be moved by the displacement corresponding to the movement of the moving object after the lens driving operation has stopped and before the subsequent lens driving operation is completed. Namely, the relationship defined by $S_n \times$(lens stop period+lens driving period)=(lens driving speed×lens driving period) can be obtained by an easier calculation. Therefore, it is possible to drive the lens at a different object following speed, provided that the above relationship is satisfied.

Figure 6:
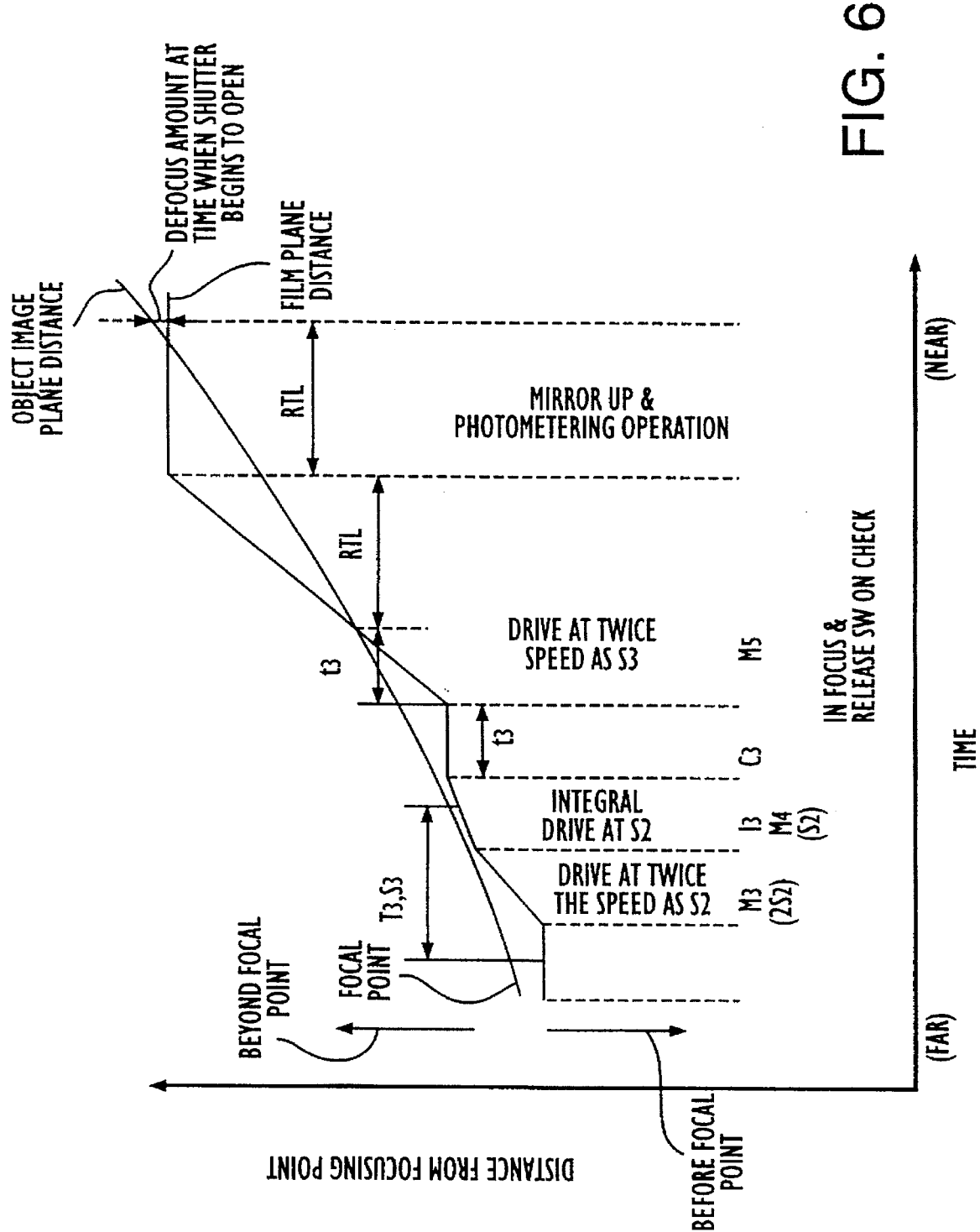
FIG. 6 is a graph showing an AF mode operation in a moving object predicting AF mode in the automatic focusing apparatus shown in FIG. 1, when a release switch is turned ON while an object to be photographed approaches the camera.
Figure 7:
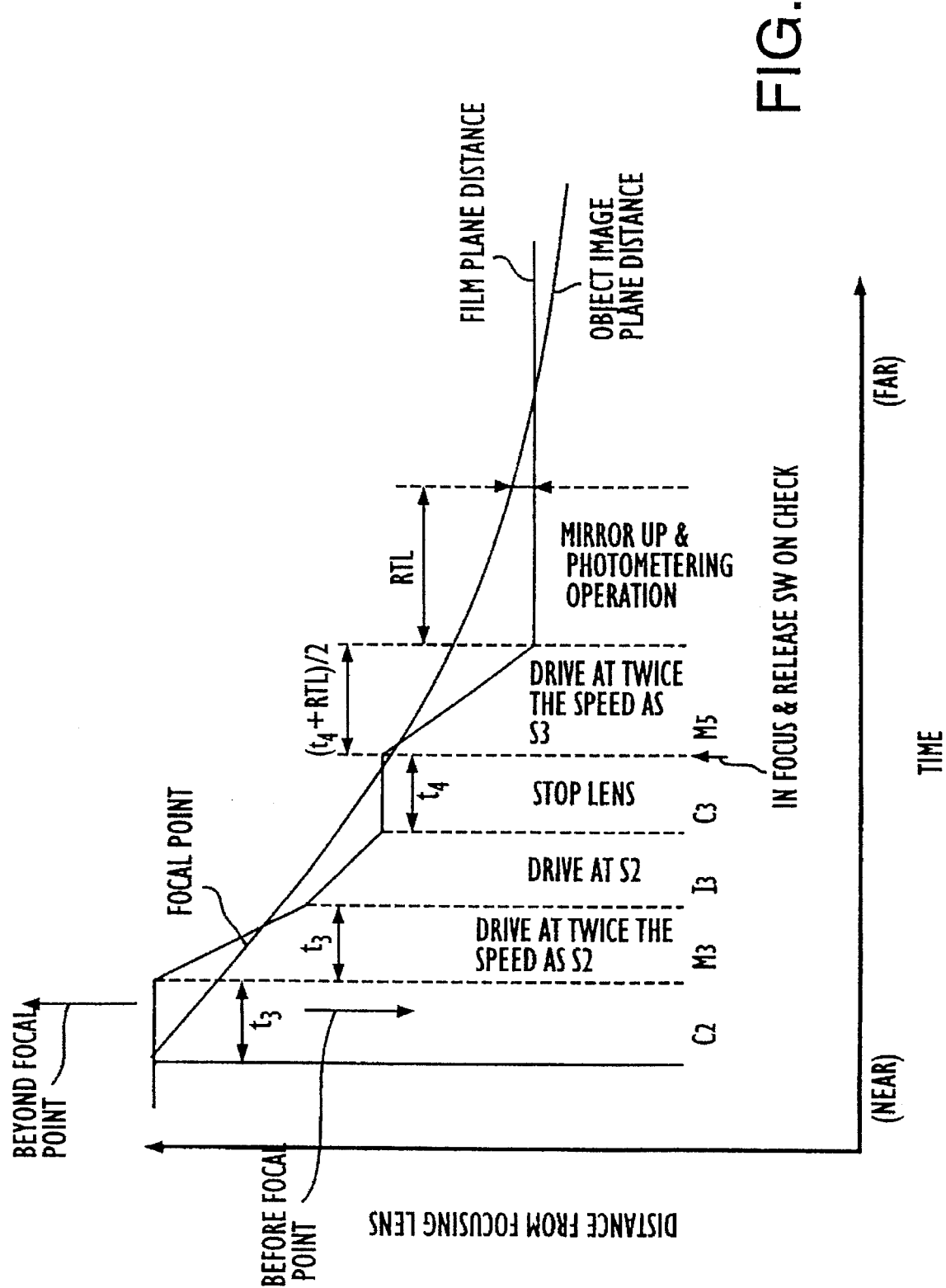
FIG. 7 is a graph showing an AF mode operation in a moving object predicting AF mode in the automatic focusing apparatus shown in FIG. 1, when a release switch is turned ON while an object to be photographed moves away from the camera

Operation when the Release Switch is turned ON:

The operation when the release switch SWR is turned ON during the moving object predicting AF mode operation is discussed below with reference to FIG. 6.

Generally speaking, since the mirror is moved up after the release switch is turned ON in a single lens reflex camera, a certain amount of time is required before the film is actually exposed after the release switch is turned ON. This is referred to as release time lag RTL. In the case of a moving object, since the object continues to move during the release time lag RTL (i.e., after the release switch SWR is turned ON and before the exposure commences), it is preferable to continuously drive the lens to follow the movement of the object.

To this end, in the illustrated embodiment, whether the release switch SWR is turned ON is checked at the completion of the necessary calculations. If the release switch SWR is turned ON, the lens drive $M_3$ is performed at a speed that is twice the moving object following speed $S_3$ for the calculation time $t_3$ plus the release time lag RTL, so that the focusing lens 53 is initially moved in the optical axis direction by an additional (excess) displacement corresponding to the release time lag RTL.

Operation when Object moves away from Camera:

Upon completion of the double speed lens drive $M_5$, the photometering calculation and the upward movement of the mirror are effected, so that the diaphragm is adjusted to a calculated value, and the shutter mechanism 25 is driven at the calculated shutter speed.

The above-mentioned operations are operations in which the object approaches the camera. If the focusing lens is initially moved through the excess displacement, for an object moving away from the camera, as mentioned above, a "rear focus" occurs. Since the depth of field decreases as the object distance decreases, a "front focus" is preferable to a rear focus. Furthermore, in the case of where the object is moving away from the camera, the moving speed of the image plane gradually decreases, provided that the moving velocity of the object is constant.

In view of these phenomena in the present invention, in case of the object is moving away from the camera, the lens is driven at the multiplied speed for a time equal to half the time as in case of the object approaching the camera. Namely, in FIG. 7, the lens driving operation is effected at a speed that is twice the object following speed $S_3$ for a time equal to half the calculation time $t_4$ plus the release time lag RTL, i.e., the time defined by $(t_4+RTL)/2$.

Main Operation:

The main operation of the present embodiment will be discussed below in more detail, with reference to FIGS. 8 through 15.

The operation is performed by the main CPU 35 in accordance with the program stored in the internal ROM 35a thereof. Data, such as constants or parameters necessary to conduct the calculations, are stored in the $E^2$PROM 43.

Figure 8:
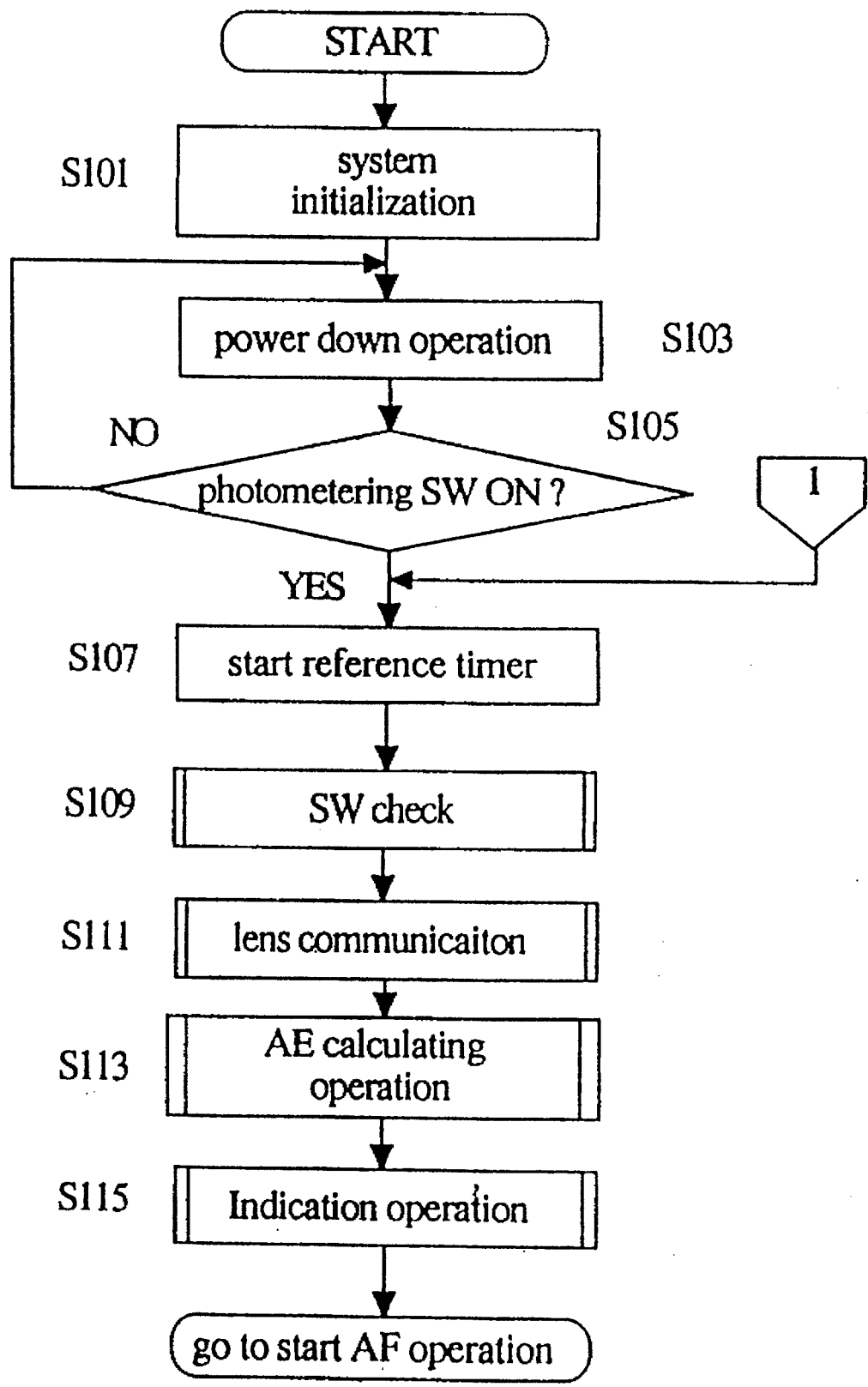
FIG. 8 is a flow chart of a main operation of an automatic focusing apparatus according to the present invention.

FIG. 8 shows a main routine of the main operation of the main CPU 35. When the main switch SWM is turned ON, control enters the main routine in FIG. 8. First, at step S101, the system of the main CPU 3.5 including various ports and the memory, etc., is initialized. Thereafter, a power down operation is performed to reduce unnecessary electrical power consumption (step S103). At step S105, whether the photometering switch SWS is turned ON is checked (step S105). The power down operation is retained and the checking operations are repeated until the photometering switch SWS is turned ON.

If the photometering switch SWS is turned ON, a reference timer 35c (FIG. 1) starts, and the states of the switches, such as the AF switch SWAF are checked (steps S107, S109). Thereafter, data communication with the lens CPU 61 is carried out to receive lens data, such as an open diaphragm value a maximum diaphragm value, a focal length, and a K value data, etc., at step S111.

The photometer data is inputted to the main CPU 35 from the photometering IC 17, so that the shutter speed and the diaphragm value are calculated, based on the photometer data and the film sensitivity, etc., in accordance with a predetermined algorithm (step S113). The calculated shutter speed and the diaphragm value thus obtained are indicated in the indicator unit 45 at step S115. Thereafter, the AF operation is performed.

Figure 9:
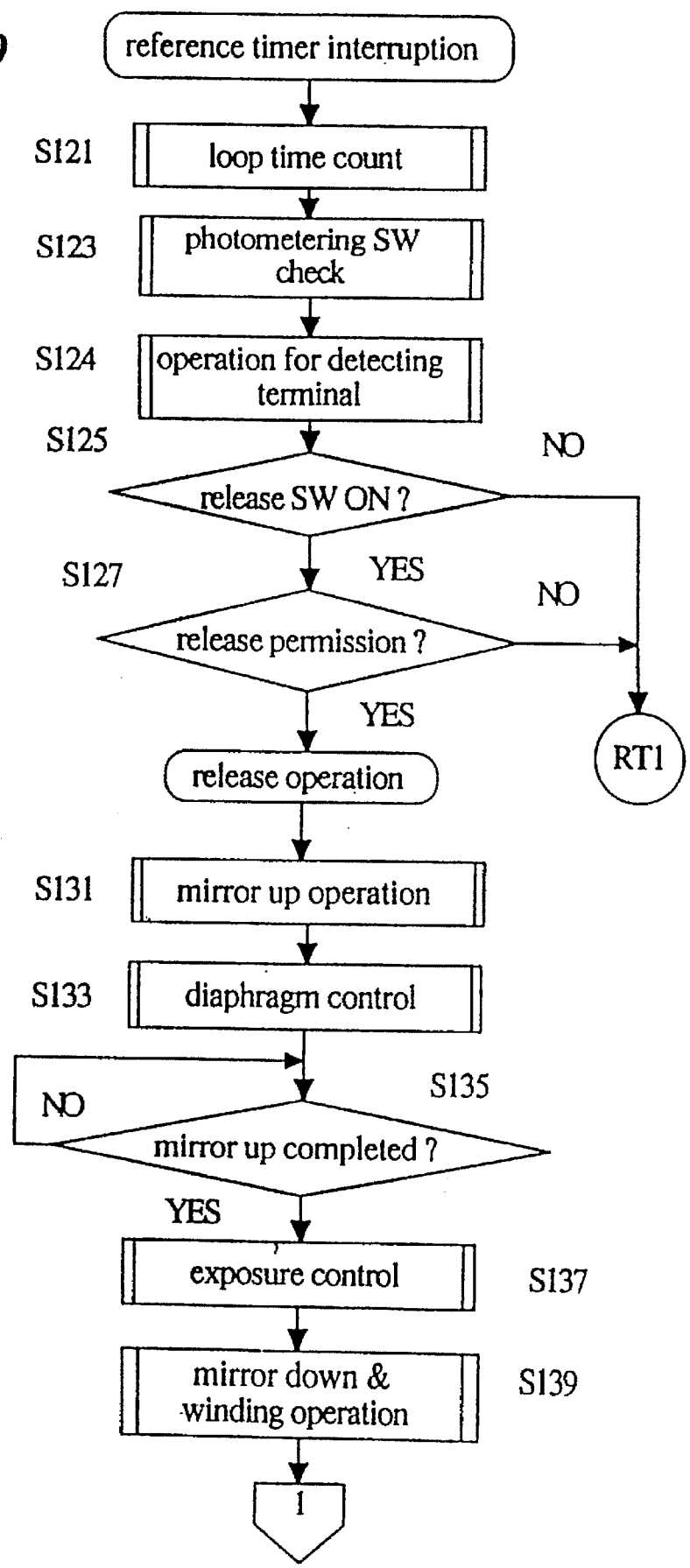
FIG. 9 is a reference timer interruption operation of an automatic focusing apparatus according to the present invention.
Figure 10A:
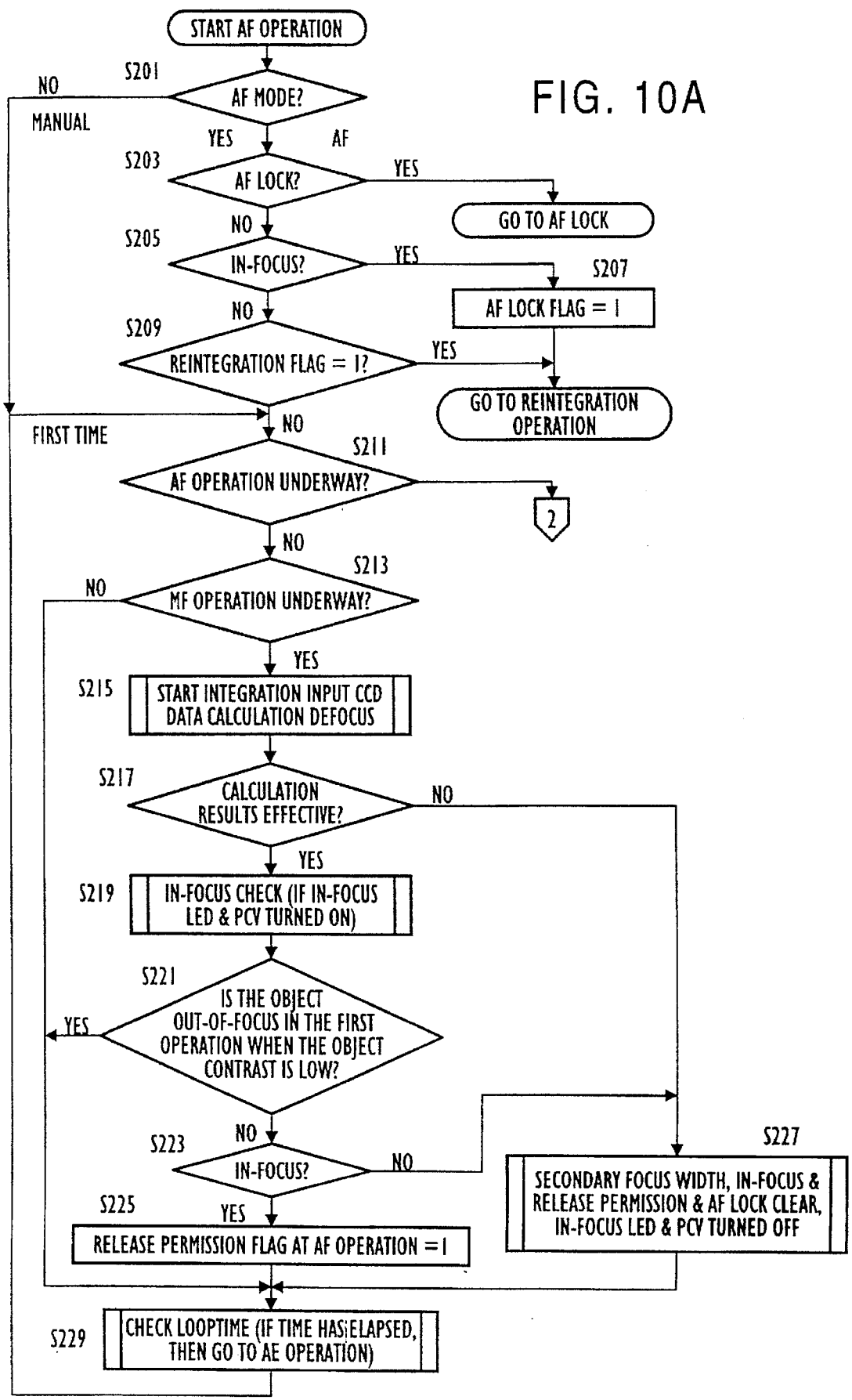
FIGS. 10A and 10B are flow charts of an AF operation of an automatic focusing apparatus according to the present invention.
Figure 10B:
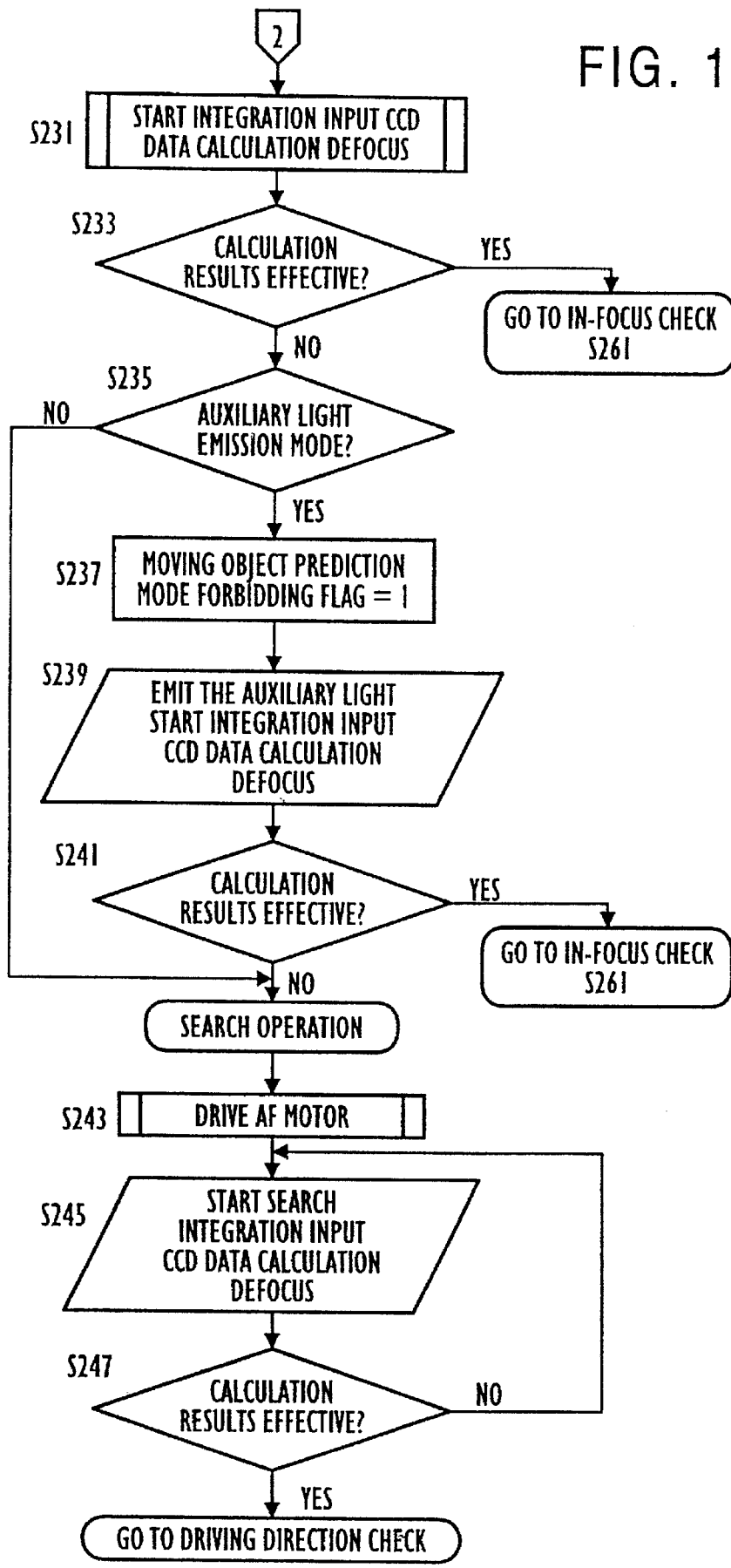

Every time the set time, of the reference timer 35c has expired during the repeating of the operations of steps S109 through S119, the main routine is interrupted by the reference timer routine, which is shown in FIG. 9. In the reference timer routine shown in FIG. 9, a loop time is counted and the states of the photometering switch SWS, and the release switch SWR are inputted (steps S121 and S123).

Figure 17:
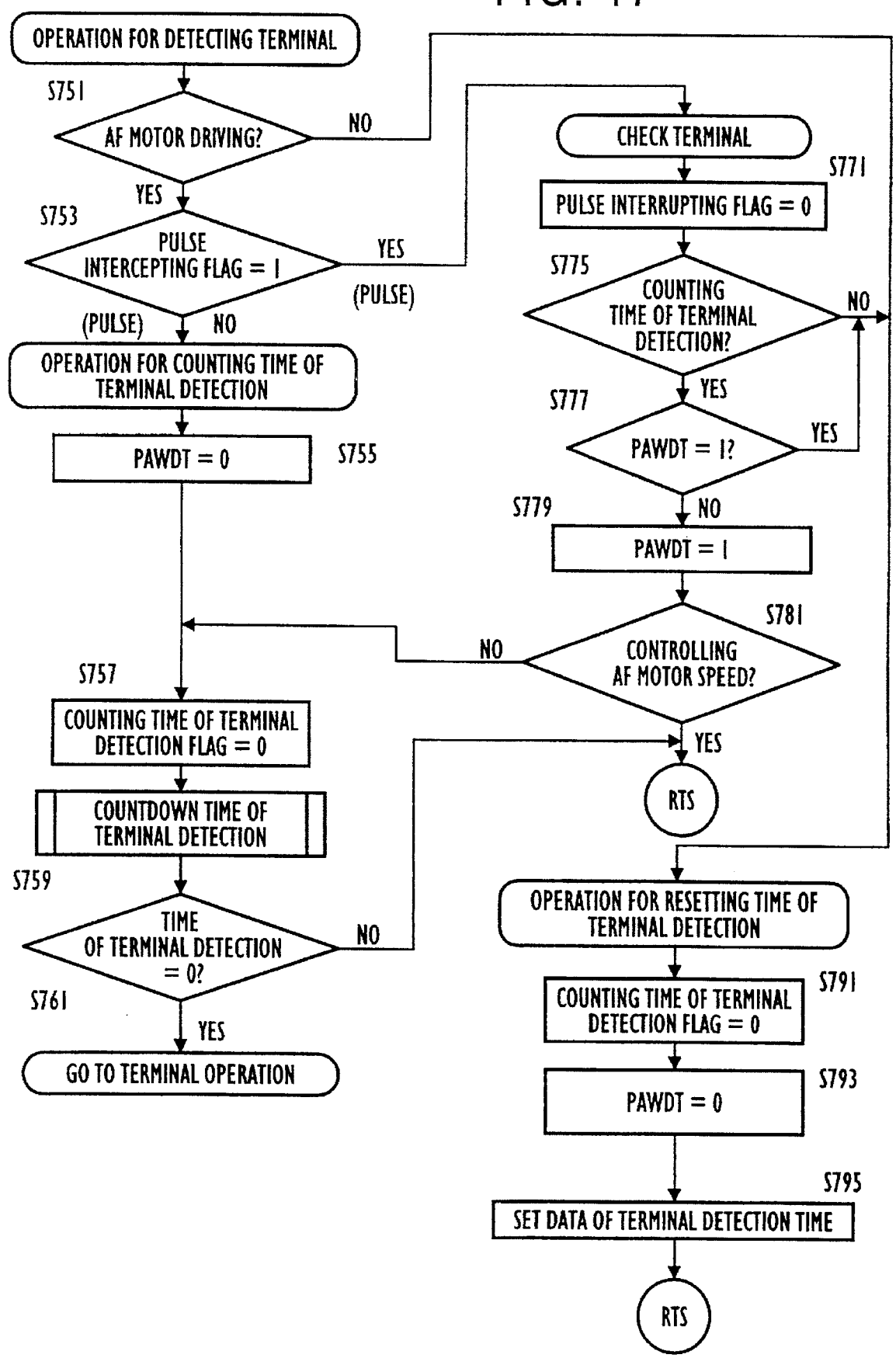
FIG. 17 is a flow chart of an extremity detecting operation.

After the photometering switch has been checked, the release switch SWR is checked after an operation for detecting terminal, which will be discussed hereinafter with reference to FIG. 17. If the release switch SWR is turned OFF or if the release switch SWR is turned ON but a permission signal of the release is not issued, for example, if the object is not focused in the focus priority mode, control is returned to the step prior to the interruption by the reference timer routine (steps S125 and S127).

If the release switch SWR is turned ON and release is permitted, the release is performed. During the release operation, the mirror motor 31 is driven to move the mirror up and the diaphragm mechanism 27 is driven to adjust the diaphragm value to the calculated value obtained at step S113 (steps S131 and S133).

Upon completion of the upward movement of the mirror, the exposure mechanism 25 is driven to effect the exposure at the shutter speed calculated at step S113 (steps S135, S137). When the exposure is finished, the mirror motor 31 is driven to move the mirror down and the film winding motor 33 is driven to wind the film by one frame (step S139). Thereafter, control is returned to step S107.

AF operation:

The following discussion will be directed to the AF operation according to an embodiment of the present invention, with reference to FIGS. 10 through 13.

First, whether the focus mode is the AF mode or the MF mode (manual focus mode) is checked (step S201). If the mode is the MF mode, control jumps to step S211. The AF mode and the MF mode referred to above are the automatic focus adjusting mode, and the manual focus adjusting mode in which the focus is adjusted by a photographer, respectively.

When control enters, the AF operation routine in the AF mode for the first time since an integration operation is not performed, it is not in an AF lock state (i.e., AF lock flag is "0"), the object is not in-focus (i.e. an IN-FOCUS flag is "0") and a reintegration flag is "0", control jumps to step S211 (steps S203, S205, S209). In the second operation or operation subsequent thereto, if the AF lock flag is "1", control jumps to the step for performing the AF lock operation. If the AF lock flag is "0", and if the object is focused, i.e., if a predetermined time has elapsed after the object is once focused, the Af lock flag is set at "1", and the reintegration operation is performed (steps S203, S205 and S207). If the object is not in-focus, but the operation is the second AF operation or the operation subsequent thereto, since the reintegration flag is "1", the reintegration operation is carried out (steps S203, S205 and S209).

If the operation is the first AF operation, or the focus mode is the manual focus mode, control proceeds to step S211 (steps S201, S203, S205, S209). Whether or not the AF operation is being performed is checked at step S211, and whether or not the MF operation is being performed is checked at step S213, respectively.

If the operation is performed in the AF mode (first AF operation), control proceeds to step S231, and if the operation is performed, not in the AF mode but in the MF mode, the object distance measuring operation and focus state indication operation are effected (steps S215 through S227).

At step S215, the integration and calculation operations are carried out. Thereafter, whether the calculation results are effective is checked at step S217. If the calculation results are effective, and if the object is in-focus, the in-focus state is indicated by lighting a focus indicating LED (not shown) of the indicator unit 45. In addition thereto, an electronic buzzer (PVC) 46 is sounded to alert the photographer of the in-focus state (step S219). If the object is out-of-focus, an indication operation is not effected.

If the object contrast is low and the operation is the first operation of the routine, control jumps to step S229, and if the operation is not the first AF operation at low object contrast, whether or not the object is in-focus is checked (steps S221 and S223). If the object is in-focus, the release permission flag is set at "1" and control proceeds to step S229 (steps S223 and S225). Conversely, if the object is not in-focus, the secondary in-focus width (focal range) flag is cleared and the focus, release permission flag and the AF lock flag are cleared. The indication of the indicator unit 45 and the operation of the buzzer 46 are stopped (steps S223 and S227), and control proceeds to step S229.

If the calculation results are not effective, the secondary focal width is cleared, and the in-focus, release permission flag, and the AF lock flag are cleared. Thereafter, the indication of the indicator unit 45 and the operation of the buzzer 46 are stopped (steps S217 and S227). Thereafter, control proceeds to step S229, in which the loop time is checked. If a predetermined loop time has not elapsed, control is returned to step S211 to repeat the operations mentioned above. If a predetermined loop time has elapsed, control is returned to step S109 of the main routine.

If the operation is determined to be the AF operation at step S211, control proceeds to step S231 to enter the AF operation routine. At step S231, the integration and calculation operations are effected. Thereafter, whether the calculation results are effective is checked at step S233. If the calculation results are effective, control jumps to step S261, in which the focus state is checked. Conversely, if the calculation results are not effective, whether the mode is an auxiliary light emission mode is checked (step S233). In the auxiliary light emission mode, infrared auxiliary light (contrast pattern) is emitted towards the object from an auxiliary light emitter (not shown) when the brightness of the object is smaller than a predetermined value. In the auxiliary light emission mode, since it is difficult to follow the movement of the moving object, a moving object predicting mode forbidding flag is set (step S237). Thereafter, the auxiliary light is emitted and the integration and calculation are effected. Thereafter, the calculation results are checked (steps S239 and S241). If the calculation results are effective, control proceeds to step S261 in which the focus state is checked. Conversely, if the calculation results are not effective, control proceeds to step S243. If the mode is not the auxiliary light emission mode, control jumps steps S237 through S241 and goes to step S243. The steps following S243 involve a search integration operation.

At step S243, the AF motor 39 is driven by the DC control, since effective calculation results were not obtained. Thereafter, the search integration and calculation are effected to detect the focal point at step S245. The calculation results are checked at step S247. If the calculation results are not effective, the search integration and calculation are effected again, and if the calculation results are effective, control proceeds to step S373 to check the driving direction (step S245 and S247).

Figure 11A:
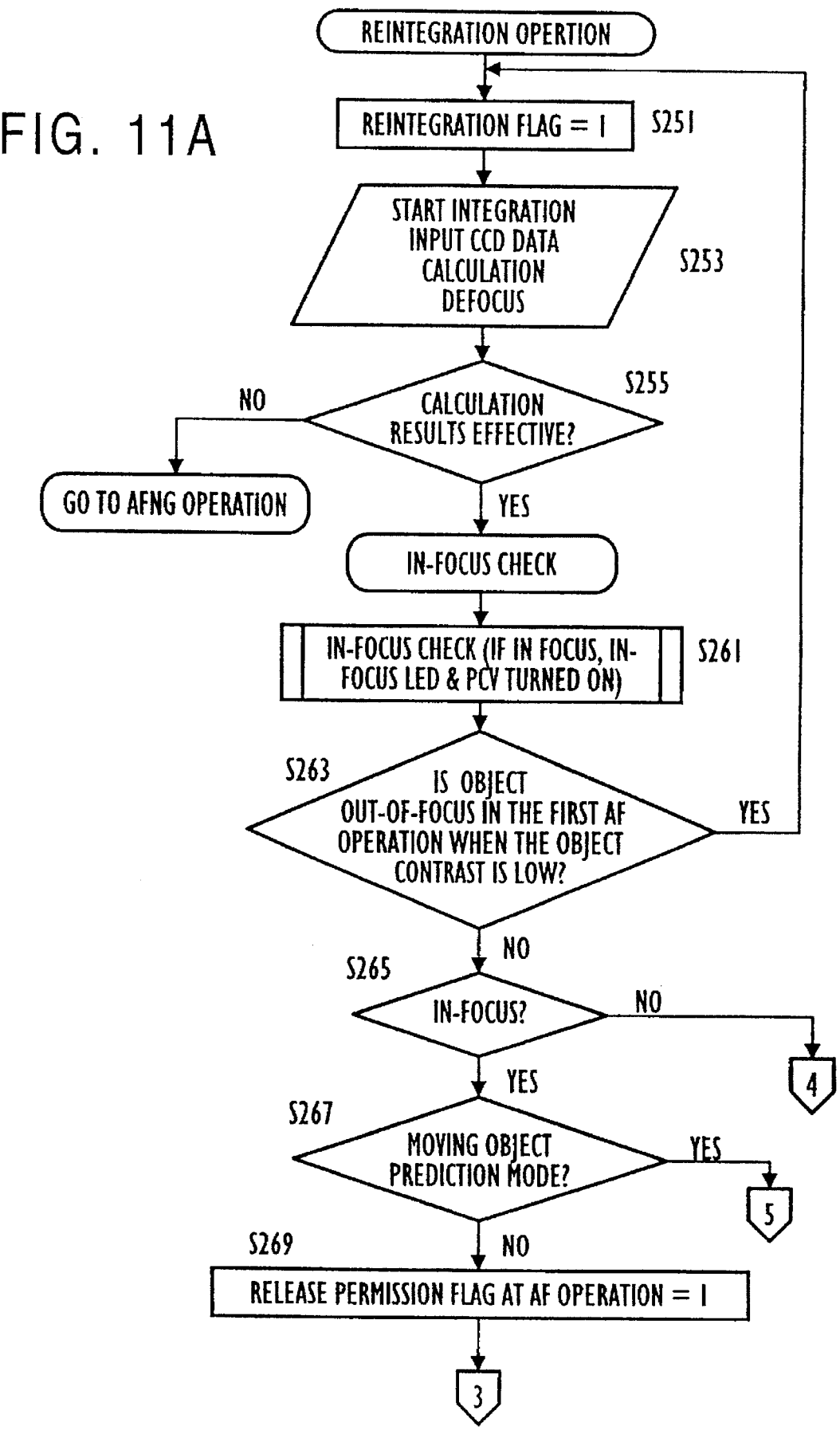
FIGS. 11A, 11B and 11C are flow charts of a reintegration operation in an AF mode operation and a moving object predicting AF mode operation.
Figure 11B:
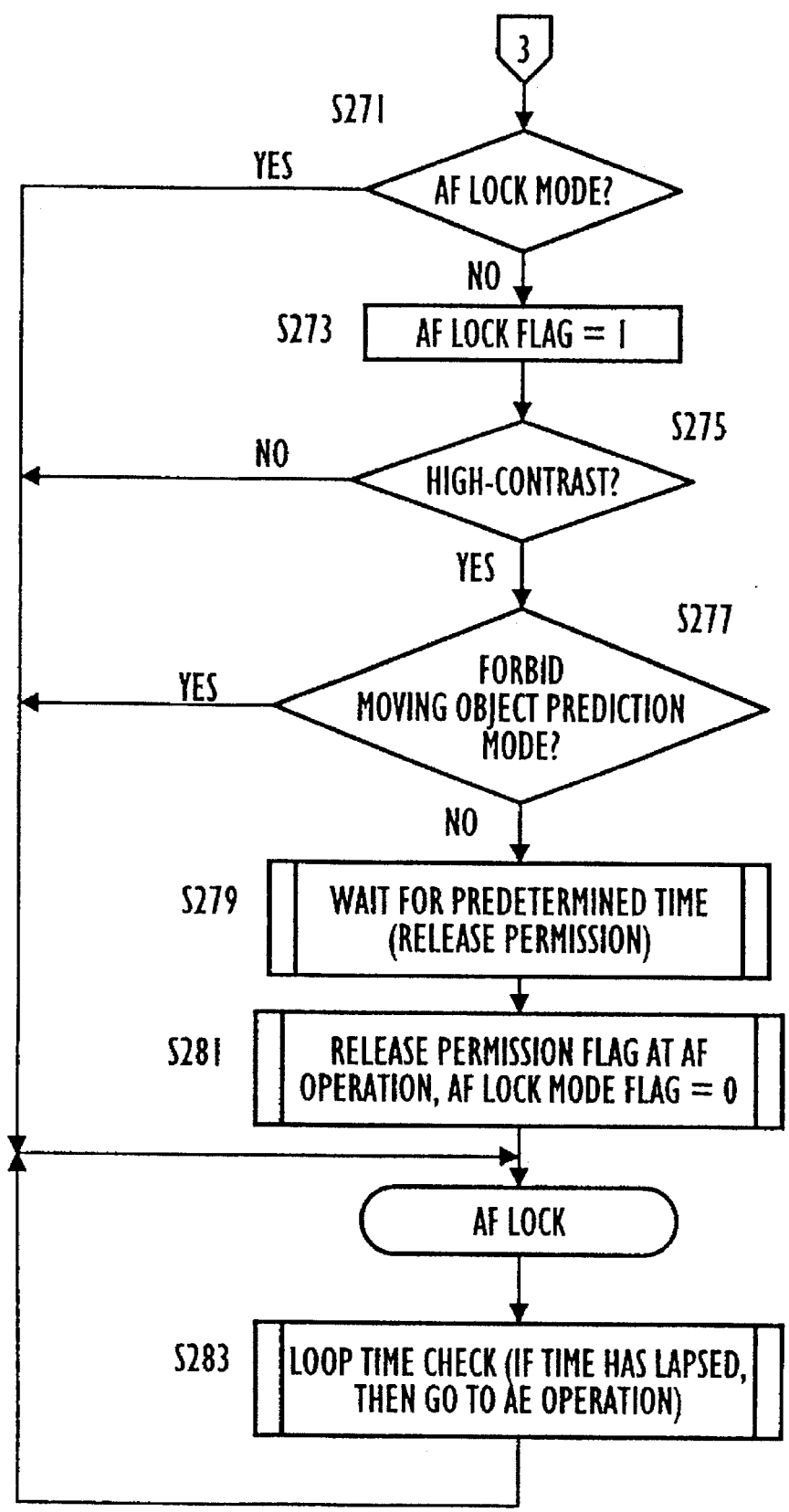
Figure 11C:
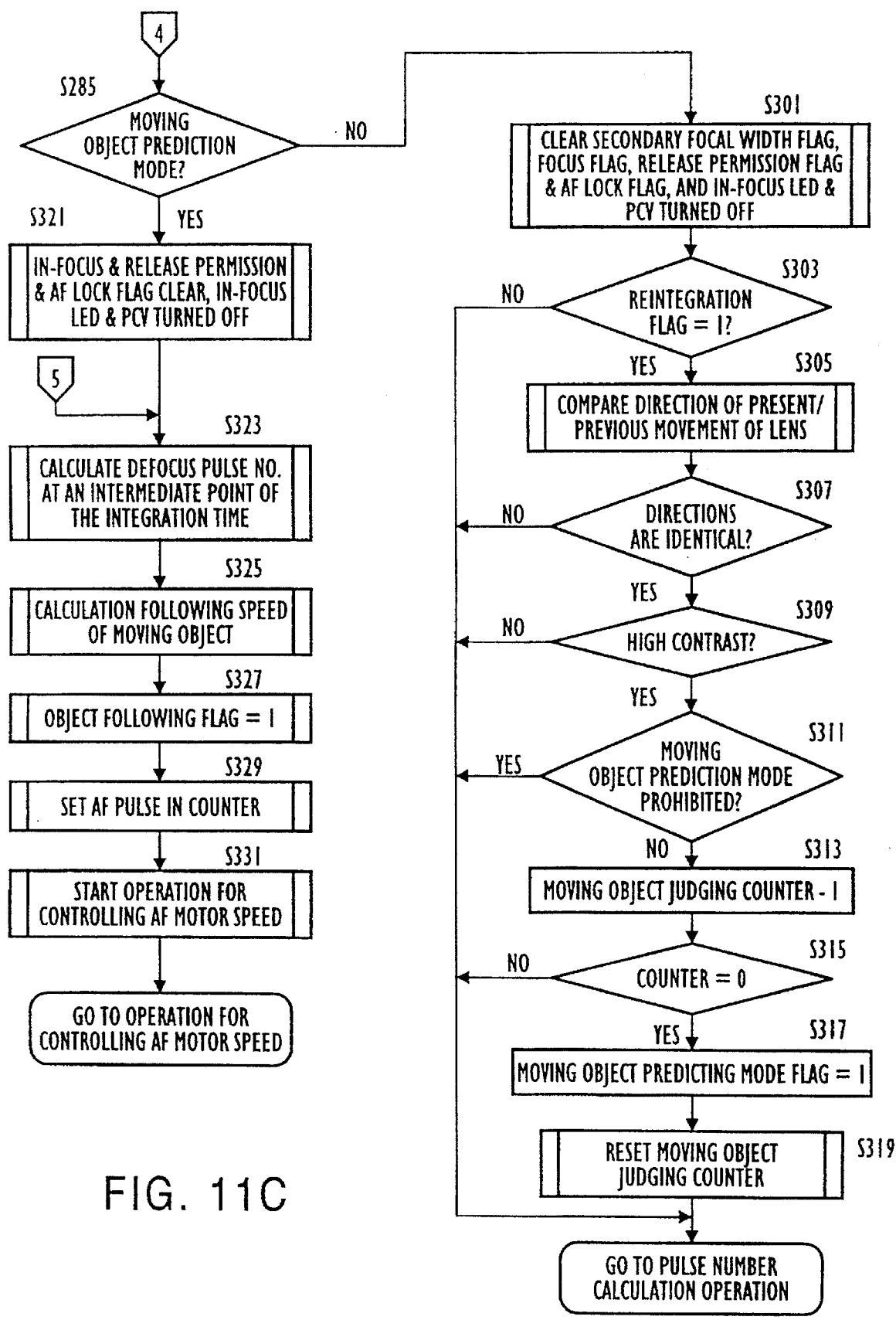

Reintegration and Focus Check Operation:

FIGS. 11A and 11B show the sub-routine of the reintegration and focus check operation.

Reintegration is a second integration operation or an integration operation subsequent thereto. In the reintegration operation, the reintegration flag is set to "1". The integration and the calculation for obtaining the defocus amount are effected (steps S251, S253). Thereafter, based upon a determination in step S255, if the calculation results of the defocus amount are not effective, control proceeds to an AFNG operation, and if the calculation results are effective, control proceeds to an in-focus check operation.

In the in-focus state checking operation, whether the object is in focus is checked. If the object is in-focus, the focus indicating LED of the indicator unit 45 is lit and the electronic buzzer (PCV) 46 is actuated (step S261). Conversely, if the object is out-of-focus, no operation is effected.

Thereafter, at step S263, if the object is out-of-focus for the first time at a low object contrast, control is returned to step S251, and the integration operations, etc., are carried out. If the object is not out-of-focus at a low object contrast at step S263, if it is in-focus at S265, and if the mode is not a moving object predicting mode, AF release permission flag is set at "1" (steps S263, S265, S267 and S269).

If the mode is not the AF lock mode (i.e., if the AF lock flag is not set in step 271), control proceeds to step S273. Namely, the AF lock flag is set in the first operation after the object is in-focus, and if the AF lock flag has already been set, the operation is the second operation or the operation subsequent thereto (steps S271, S273). Control then proceeds to an AF lock operation (step S283).

If the AF lock flag is set at "1" at step S273, control does not proceed for a predetermined period of time in which the operation may be interrupted by the release operation, provided that the object contrast is high and the moving object prediction forbidding flag is "0". If no interruption occurs within the predetermined time, the AF release permission flag is cleared to forbid the releasing, and the AF lock flag is cleared to permit the AF operation (steps S275, S277, S279 and S281). Thereafter, the AF lock operation starts. When the loop time has elapsed, control is returned to step S109 in the main routine (step S283). If the object contrast is not high, or the moving object prediction forbidding flag is set at 1, control immediately proceeds to the AF lock operation without waiting for a predetermined time (i.e. operation interruption by the release operation). The preceding is shown at steps S275, S277, S283. In the AF lock operation, once the object is focused, an AF operation is not performed while the photometering switch SWS is turned ON.

In the focus checking operation at step S265, if the object is out-of-focus, the control skips to step S285 to check whether the mode is the moving object predicting mode. If the mode is not the moving object predicting mode, control proceeds to step S301 (i.e., moving object checking operation), and if the mode is the moving object predicting mode, the control proceeds to step S321.

In the moving object checking operation where it is checked whether the object is the moving object (FIGS. 2 and 3), the secondary focal width flag, the focus flag, the release permission flag and the AF lock flag are cleared and the focus indicating LED of the indicator unit 45 and the electronic buzzer (PVC) 46 are turned OFF (step S301).

Thereafter, if the reintegration flag is cleared at step S303, control jumps to the pulse number calculation operation and if the reintegration flag is set, control proceeds to step S305 in which the direction of the present movement of the lens is compared with the direction of the previous movement thereof (step S305). If the directions of the movements are identical to each other, the moving object judging counter is decremented by one, provided that the object contrast is high and the moving object prediction forbidding flag is cleared (steps S307, S309, S311 and S313). Note that the initial value of the moving object judging counter is "3" in the illustrated embodiment.

Conversely, if the direction of the present movement of the lens is not identical to the direction of the previous movement thereof at step S305, the object contrast is not high, or the moving object prediction forbidding flag is set at "1", control jumps to a pulse number calculation operation, without performing the counting operation (steps S307, S309 and S311).

After the moving object judging counter is decremented by one, it is checked if the counted value is 0. If so, the moving mode predicting mode flag is set and the moving object judging counter is reset (steps S315, S317 and S319). Thereafter, the pulse number calculation operation is performed. If the counted value is not 0, control proceeds directly to the pulse number calculation operation (step S315).

If the mode is the moving object predicting mode at step S285, the focus flag, the release permission flag and the AF lock flag are cleared, and the focus indicating LED of the indicator unit 45 and the electronic buzzer 46 are turned OFF (step S321).

Thereafter, the defocus pulse number is calculated in accordance with the result of the latest integration operation at step S253. The defocus pulse number thus obtained is a value for the object at an intermediate point of the integration operation time.

Thereafter, the speed (following speed) of the movement of the object is calculated in accordance with the calculated pulse number for the movement of the object, the present defocus pulse number, and the integration operation time between the intermediate points of the integration operations. Upon completion of the calculation, the object following flag, which is indicative of the object being traced, is set at 1 (steps S325 and S327). Thereafter, the defocus pulse number is set in counter 35d, so that the operation for controlling the AF motor speed constant is commenced (steps S329 and S331).

If the mode is the moving object predicting mode within the focusing range at step S267, control proceeds to step S323.

Figure 11D:
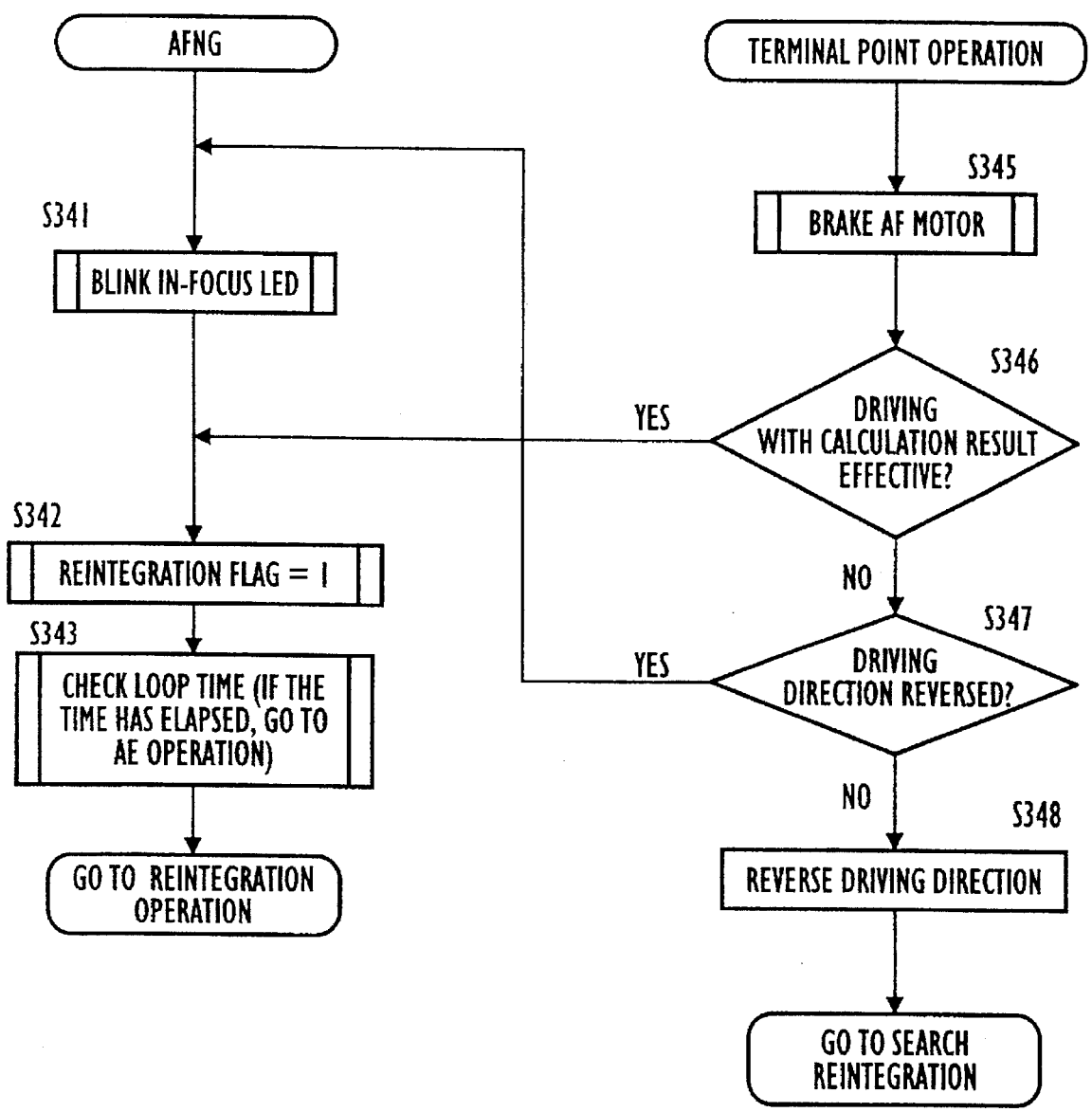
FIG. 11D is a flow chart of an AFNG operation and a terminal point point operation.

The following discussion will be directed to the operation which is effected when the result of the AF calculation operation is void (AFNG operation), with reference to the flow chart shown in FIG. 11D. The AFNG operation is also performed as a part of "terminal operation", which performed when the focusing lens reaches the telephoto or wide extremity.

When the result of the AF calculation operation is void the, in-focus indication LED 46 is effected to emit light in a blinking manner to inform the photographer that it is impossible to focus (S341). Then, the reintegration flag is set. The AE calculation operation is performed if the loop time has elapsed after the loop time is checked. The control returns to the reintegration operation if the loop time has not elapsed (S342, S343).

Figure 12A:
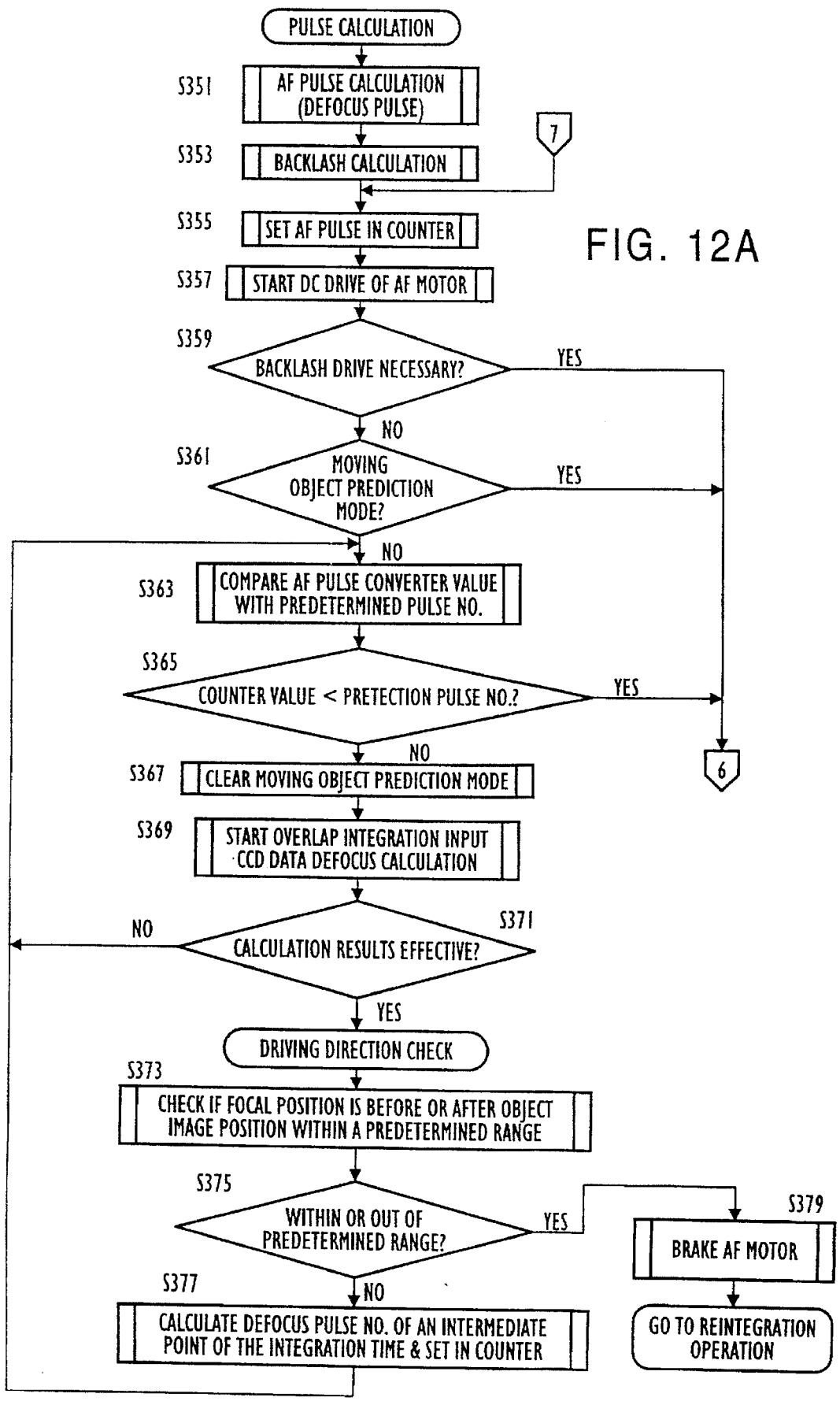
FIGS. 12A and 12B are flow charts of calculations of a defocus amount and drive pulses in an AF mode operation.
Figure 12B:
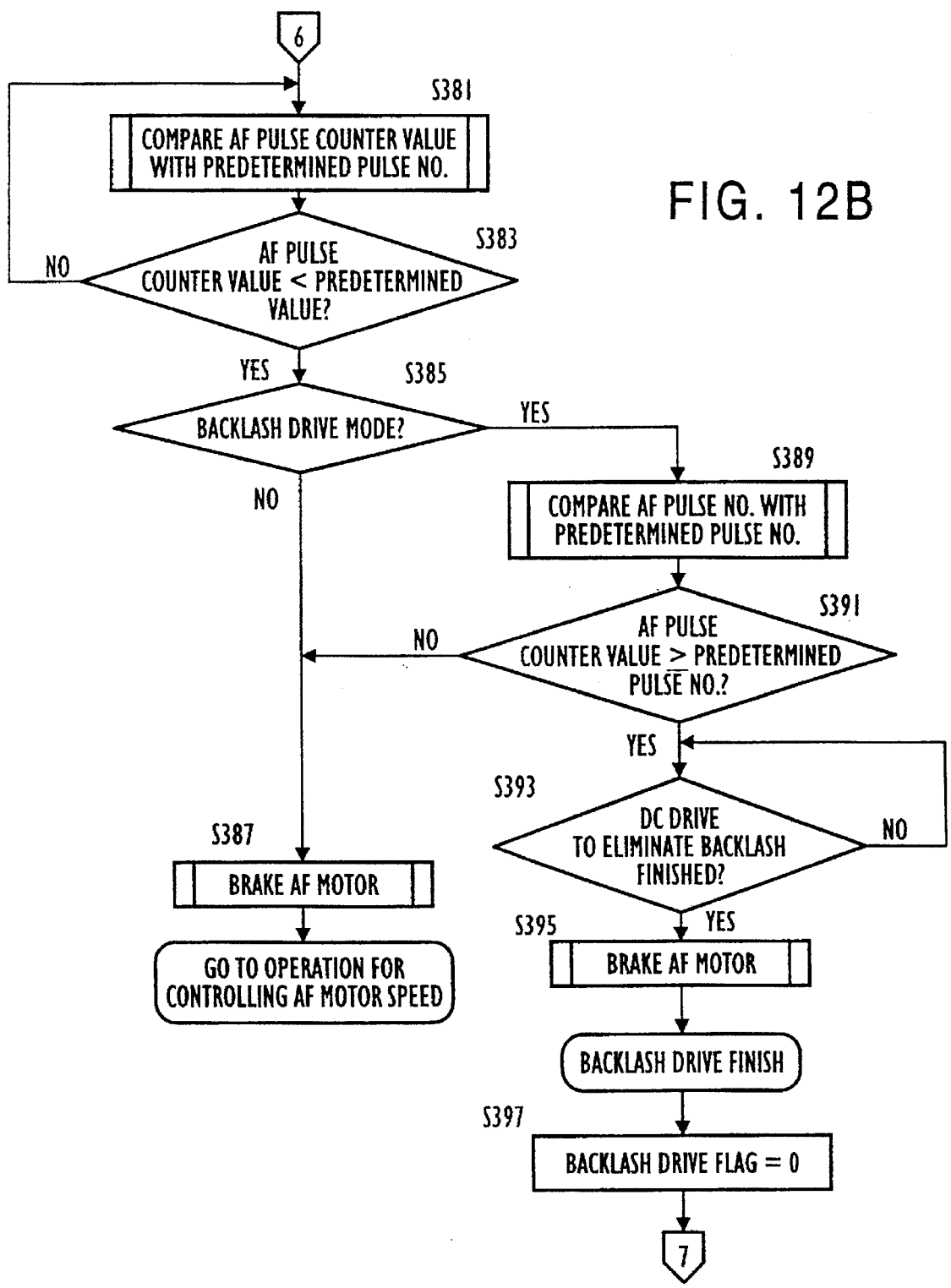

Pulse Calculation and Backlash Drive:

The following discussion will be directed to the calculation of pulse number and backlash drive, with reference to FIGS. 12A and 12B.

The pulse calculation calculates the number of pulses corresponding to the defocus amount and the number of pulses necessary to eliminate backlash.

The backlash drive referred to is indicative of the driving of internal gears of the AF motor 39, the joints 47 and 57, and the lens driving mechanism 55 to eliminate backlash, for example, when the direction of the driving operation of the AF motor 39 changes. In the illustrated embodiment, the backlash driving operation is separately carried out prior to the driving operation based on the defocus amount.

In the pulse calculation, first, the defocus pulse number is calculated. If the direction of the driving operation is different from that of the previous driving operation, the backlash pulse quantity is calculated, and the backlash drive flag is set at 1 (steps S351 and S353). The backlash pulse quantity referred to is indicative of the pulse number and direction necessary to remove the backlash. The backlash value of the camera body 11 is stored in the E²PROM 43, and the backlash value of the taking lens 51 is stored in the ROM of the lens CPU 61 and can be stored in the RAM 35b of the main CPU 35 through the peripheral control circuit 23 by the data communication.

If the backlash drive flag is not set, the defocus pulse number is set as the AF pulse number in the counter and if the backlash drive flag is set, the backlash pulse number is set as the AF pulse number in the counter, respectively. Thereafter, the DC drive of the AF motor 39 is commenced (steps S355 and S357).

If the backlash drive flag is cleared, and if the mode is not the moving object predicting mode (i.e. the moving object predicting mode flag is cleared), the value of the counter is compared with a predetermined pulse number (steps S363 and S365). If the counted value is above the predetermined pulse number, the moving object prediction mode is cleared (S367) and an overlap integration operation is commenced to calculate the defocus amount (steps S367 and S369). The overlap integration operation referred to is indicative of an integration operation being executed during the lens driving operation.

After the defocus amount is calculated, whether the defocus amount is effective is checked at step S371. If the defocus amount is ineffective, control is returned to step S363 and if the defocus amount is effective, control proceeds to a direction of movement check operation (steps S373–S377).

In the direction checking operation, whether the focal position is before or after the object image position and within a predetermined range (allowance) is checked in accordance with the defocus amount (steps S373, and S375). If the focal position is before the object image position and out of the predetermined range of the defocus pulse number is calculated in accordance with the defocus amount calculated at step S369, and then, the calculated number is set in the counter (steps S375 and S377). Thereafter, control is returned to step S363. If the focal position is beyond the object image position, or within the predetermined range, the AF motor 39 is braked to stop the driving operation of the taking lens. Thereafter, control is returned to the reintegration operation (steps S375 and S379). The braking of the AF motor 39 is indicative of a short circuit of the input terminals of the AF motor 39 in the illustrated embodiment.

If the backlash driving operation is necessary, the mode is the object moving predicting mode, or the counted value is smaller than the predetermined pulse number, the counted value of the AF pulse counter is compared with the predetermined pulse number. Control does not proceed until the AF counter value is smaller than the predetermined pulse number (steps S359–S365, S381 and S383).

If the AF pulse counter value is smaller than the predetermined pulse number, the AF motor 39 is braked when the mode is not the backlash drive mode. Thereafter, a constant speed control operation commences (steps S385 and S387).

In the case of the backlash drive mode, the AF pulse number is compared with the predetermined pulse number. If the AF pulse number is smaller than the predetermined pulse number, the AF motor 39 is braked, so that control proceeds to the constant speed control (steps S389, S391, S387). The backlash driving operation is performed by the constant speed control.

If the AF pulse number is larger than the predetermined pulse number, control does not proceed until the DC drive, for eliminating backlash, is finished. Upon completion of the DC drive, the AF motor 39 is braked, so that the backlash drive flag is cleared to finish the backlash driving operation (steps S391, S393, S395 and S397). Thereafter, control is returned to step S355. In the case that the predetermined pulse numbers in S365, S383 and S391 are $P_1$, $P_2$, and $P_3$, the following relationship is satisfied: $P_1 > P_2 = P_3$.

The defocus pulse number is set in the AF pulse counter, so that the lens driving operation for the normal AF operation is performed.

Thus, the backlash driving operation is carried out prior to the defocus driving operation. Furthermore, if the backlash pulse number is larger than a predetermined value, the backlash driving operation is performed by the DC drive within an extremely short space of time, and if the backlash pulse number is smaller than a predetermined value, the backlash driving operation is performed by the constant speed driving operation so as not to exceed the predetermined backlash.

Figure 13A:
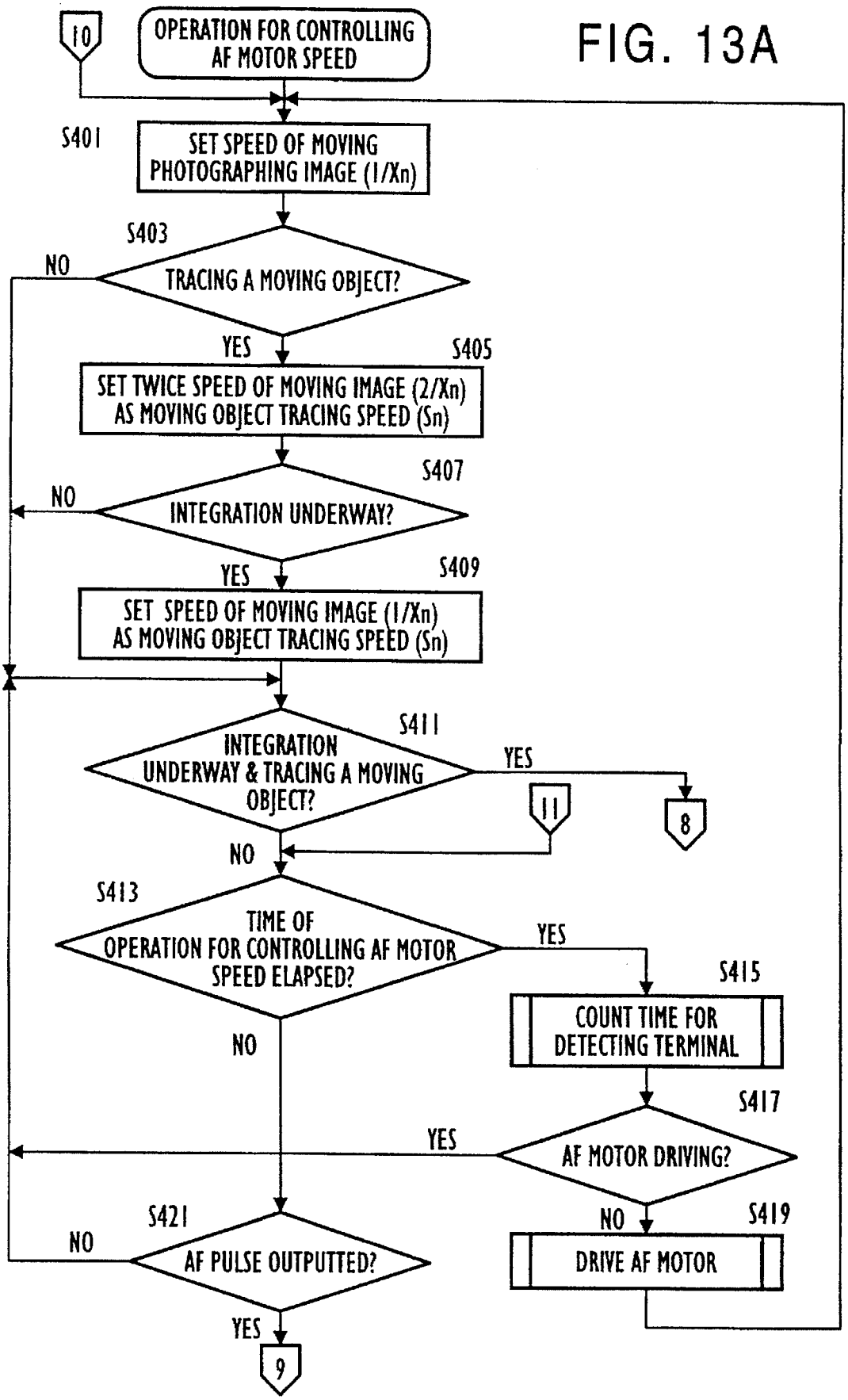
FIGS. 13A, 13B and 13C are flow charts of a constant speed control operation in an AF mode operation.
Figure 13B:
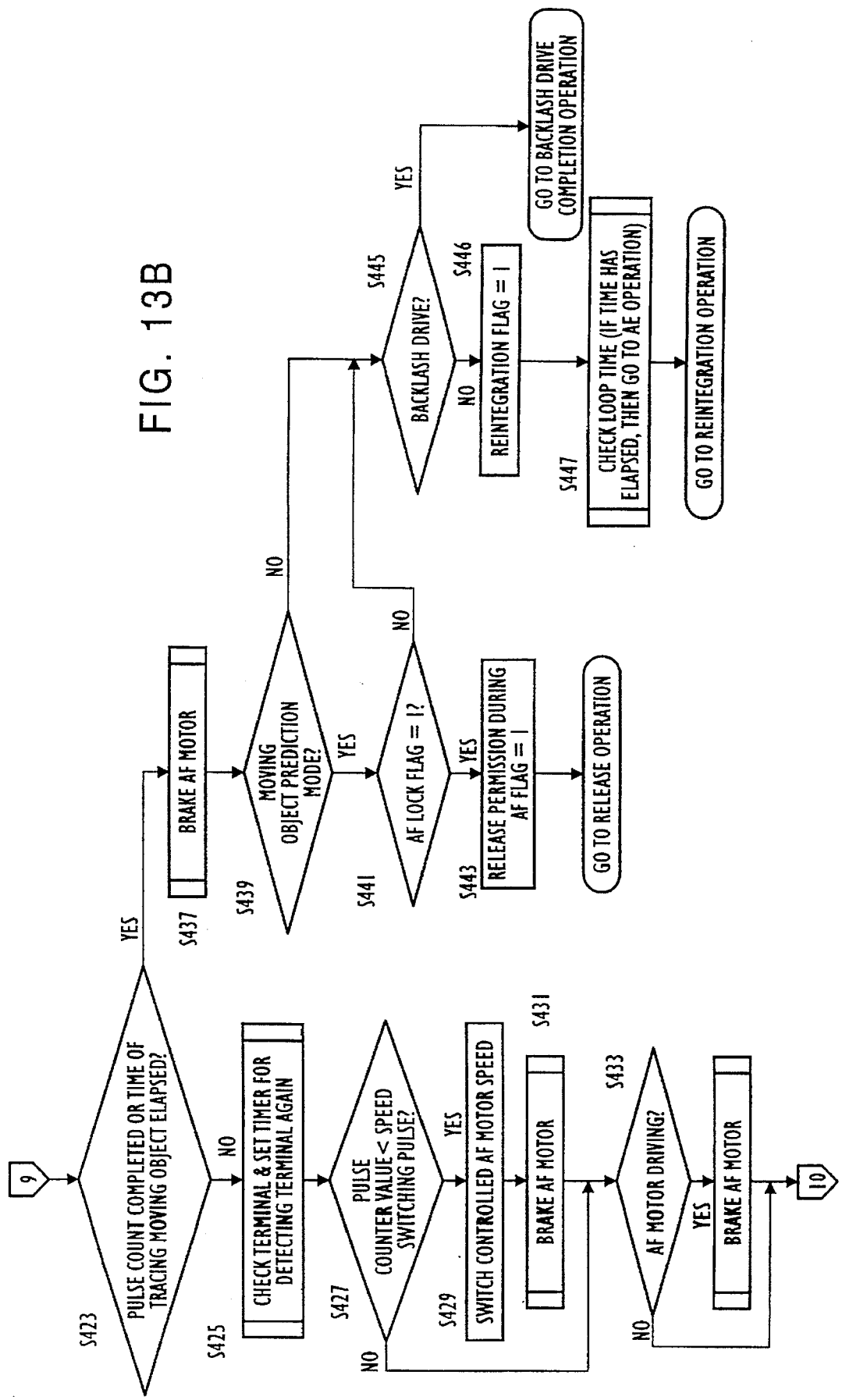

Constant Speed Control:

The following discussion will be directed to constant speed control, with reference to FIGS. 13A and 13B.

Constant speed control involves the control of the AF motor 39 at a constant speed. In the illustrated embodiment, the main CPU 35 controls the AF motor 39 so as to rotate the same at a predetermined constant speed in accordance with the pulse interval output from the encoder 41. In a preferred embodiment, the AF motor 39 is rotated at a constant speed equal to or twice the moving speed S of the object image.

In the constant speed control operation, $X_n$ is set as the constant speed control time (pulse width) and the counter for the constant speed control is set (step S401). Thereafter, if the moving object is being traced, a double speed 2Sn twice the constant speed Sn is set (steps S403 and S405). If the integration operation is effected, the constant speed Sn is set to trace the moving object at the tracing speed, and control then proceeds to step S411. If no integral is effected, control proceeds directly to step S411 (steps S407 and S409).

At step S411, it is checked if the object is being traced and integration is underway. If the object is being traced and the integration is underway, control jumps to step S459 to check for the completion of integration. Conversely, if neither the object is being traced nor the integration is underway, control proceeds to step S413 (step S411).

At step S413, whether the constant speed control time has elapsed is checked. When the constant speed control time has elapsed, the counter for the constant speed control is reset, then the terminal point detecting timer is counted (S414, S415). If the constant speed control time has elapsed, control proceeds to step S415 where it is checked whether the focusing lens has come to a terminal point. Thereafter, if the AF motor is being driven, control returns to step S411. If the AF motor is not being driven, the drive AF motor operation is carried out at step S419 and control is returned to step S401. Conversely, if constant speed control time has not elapsed, control proceeds to step S421. At step S421, whether the AF pulses are outputted from the encoder 41 is checked. If AF pulses are not outputted, control is returned to step S411, and if AF pulses are outputted, control proceeds to step S423, respectively.

At step S423, whether the count of the pulses is completed when not in the moving object tracing mode, or the drive time for following the moving object has elapsed when in the moving object tracing mode is checked. If the count of the pulses is completed, or the drive time has elapsed, the braking operation is effected. If neither the count of the pulses is completed, nor the drive time has elapsed, control proceeds to step S425 (steps S423, S437 and S425).

At step S425, whether the focusing lens 53 reaches the terminal point is checked and the terminal point detecting timer is reset. Thereafter, whether the counted value of the AF pulse counter is below a certain the speed switching pulse number is checked. If the counted value is below the speed switching pulse number, the drive speed is switched to low speed, and then, the AF motor 39 is braked. Thereafter, control proceeds to step S433 (steps S427, S429, S431). At step S433, whether the AF motor 39 is driven is checked. If the AF motor 39 is driven, the AF motor 39 is braked. Thereafter, control is returned to step S401. Conversely, if the AF motor 39 is not driven, control is directly returned to step S401.

If the count of the pulse number is finished or the drive time has elapsed at step S423, the AF motor 39 is braked at step S437. Thereafter, whether the AF lock flag in the moving object predicting mode is set is checked. If the AF lock flag is set, the AF release permission flag is set. Thereafter, control proceeds to the release operation (steps S439, S441 and S443). If the mode is not the moving object predicting mode, or the AF lock flag is cleared, whether or not backlash drive is effected, that is, whether the drive at present is backlash drive is checked (step S445). If backlash drive is effected, control proceeds to the backlash drive completion operation (S397). If backlash drive is not effected, the reintegration flag is set and the loop time is checked. If the loop time has elapsed, control is returned to step S109. If loop time has not elapsed, control proceeds to the reintegration operation (steps S445, S446 and S447).

Figure 13C:
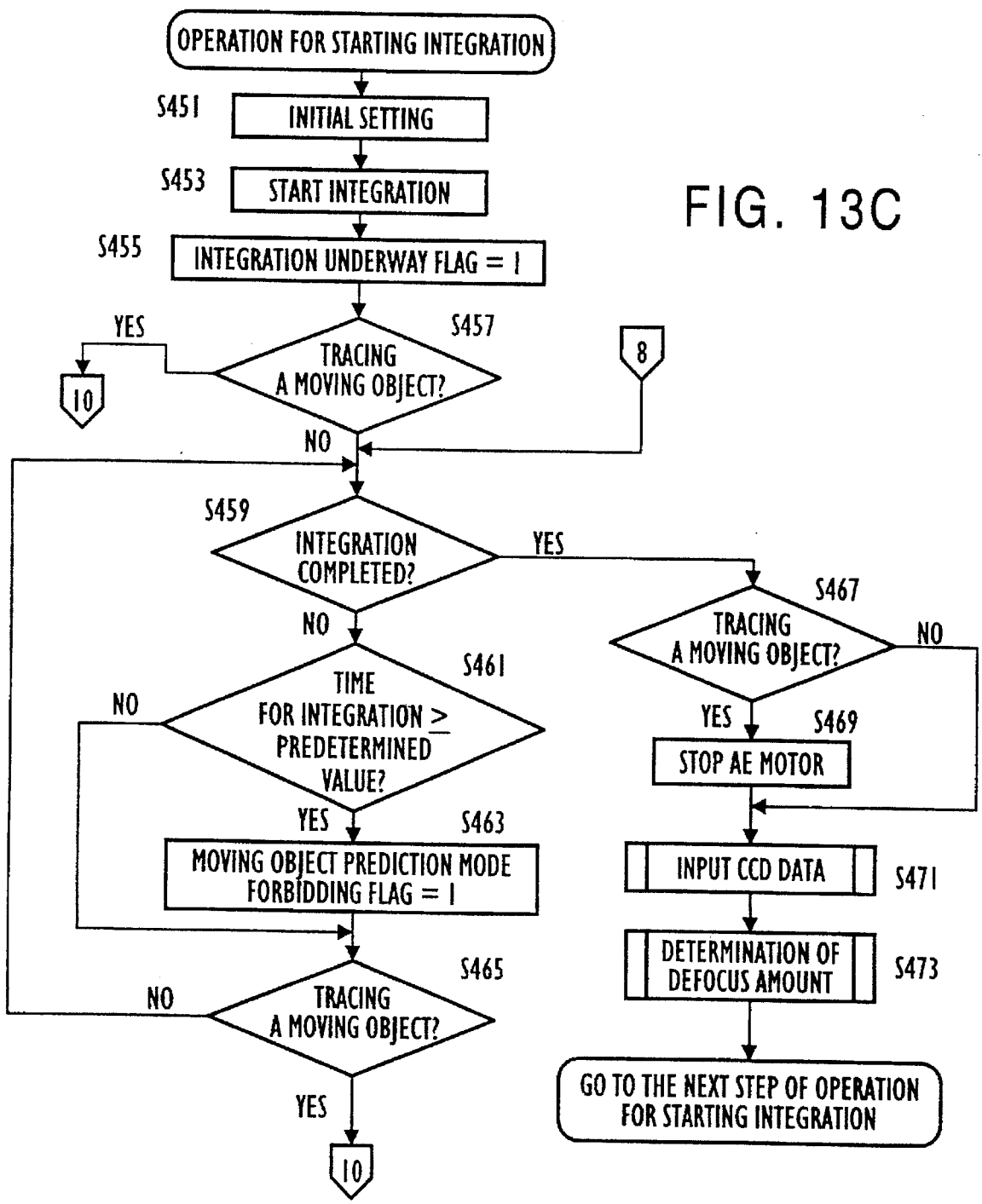

FIG. 13C shows a start integration operation in which CCD data is inputted, and an integration operation is performed by a defocus calculation (S215, S231, and S253). In the reintegration operation, the initialization for integration and calculation is effected. Thereafter, integration commences and the integration flag is set (steps S451, S453 and S455). If the moving object is traced, control jumps to step S401 (i.e., constant speed control operation), and if the moving object is not being traced, whether or not integration is finished is checked (steps S457 and S459).

If integration is not completed, control proceeds to step S461 to check whether the integration time is longer than a predetermined time. If the integration time is longer than the predetermined time, the moving object predicting mode forbidding flag is set at step S463, since the object brightness is considered to be small. Conversely, if the integration time is shorter than the predetermined time, control proceeds to step S465. If the moving object is not traced at S465, control is returned to step S459 to wait for the completion of integration (steps S459~S465). If the moving object is traced at S465, control is returned to step S413.

When integration is completed (step S459), and if the object is being traced (step S467), the AF motor 39 is braked. Thereafter, the integration data is inputted from the object distance measuring sensor unit 21 to determine the defocus amount. After that, control is returned to the step that is subsequent to the step at which integration starts (steps S467, S469, S471 and S473). If the object is not being traced at step S467, step S469 is skipped and control goes to step S471.

Figure 14A:
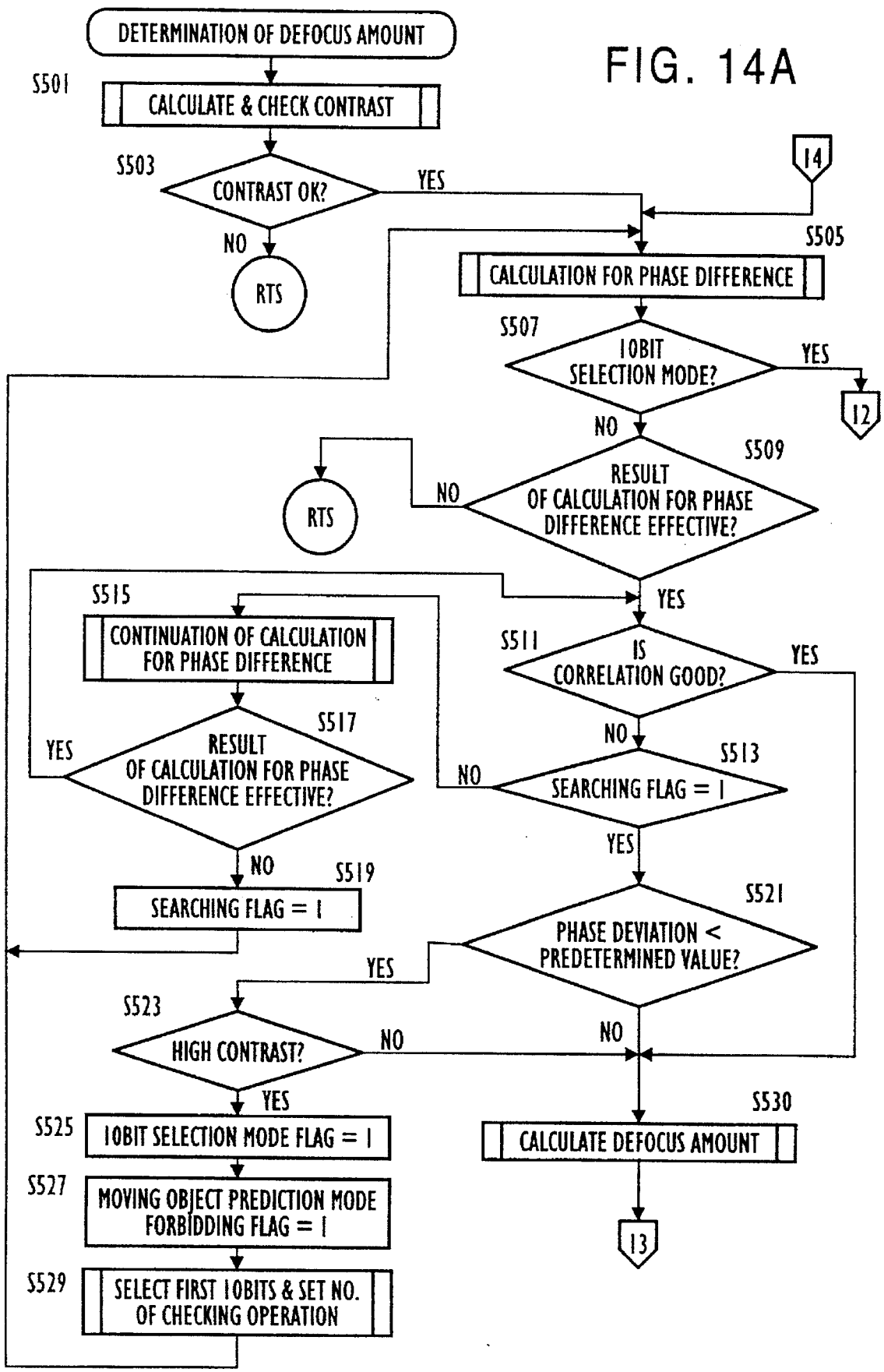
FIGS. 14A, 14B and 14C are flow charts of a defocus calculation operation a 10 bit selection operation, and a blinking preventing operation at a low contrast, respectively.
Figure 14B:
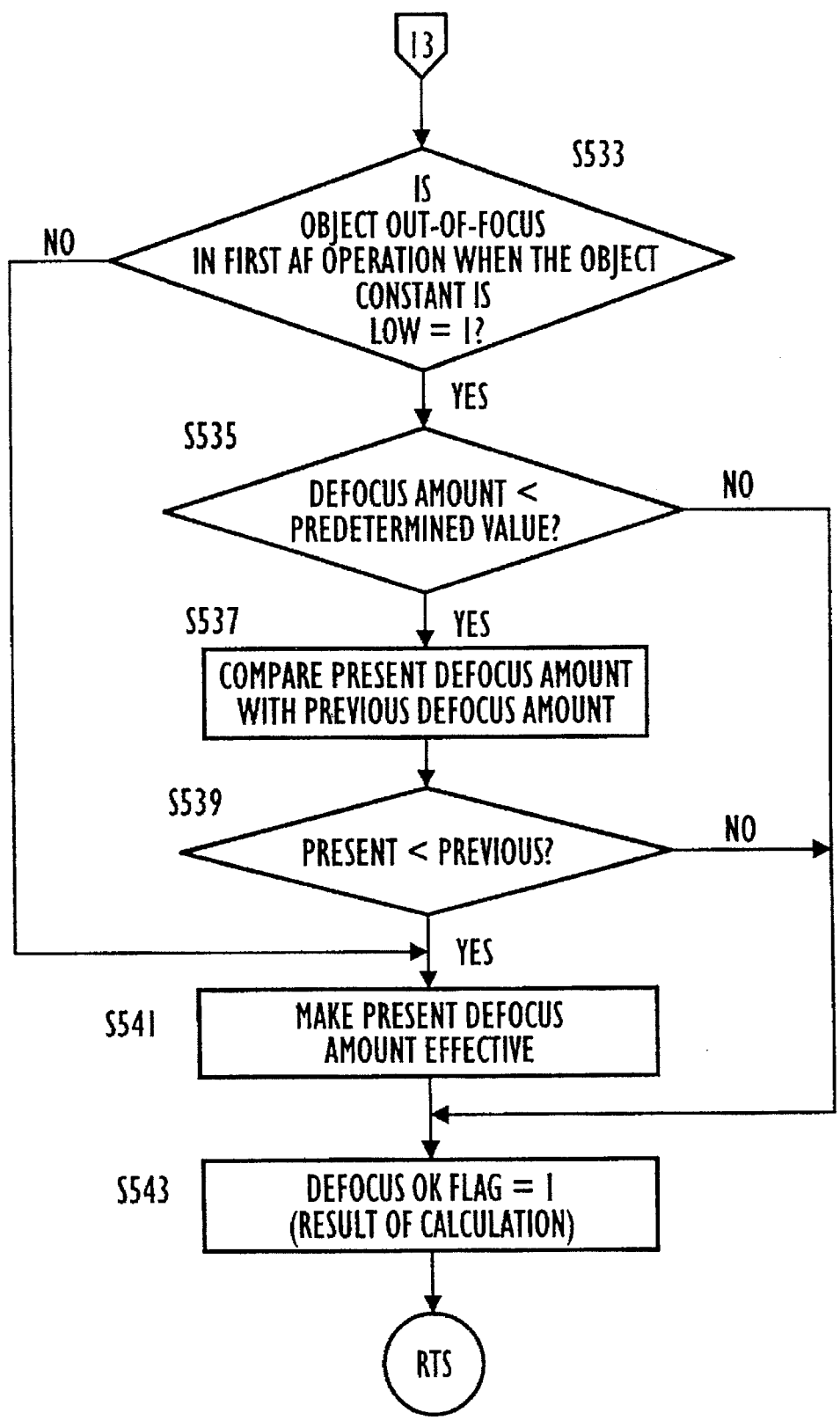
Figure 14C:
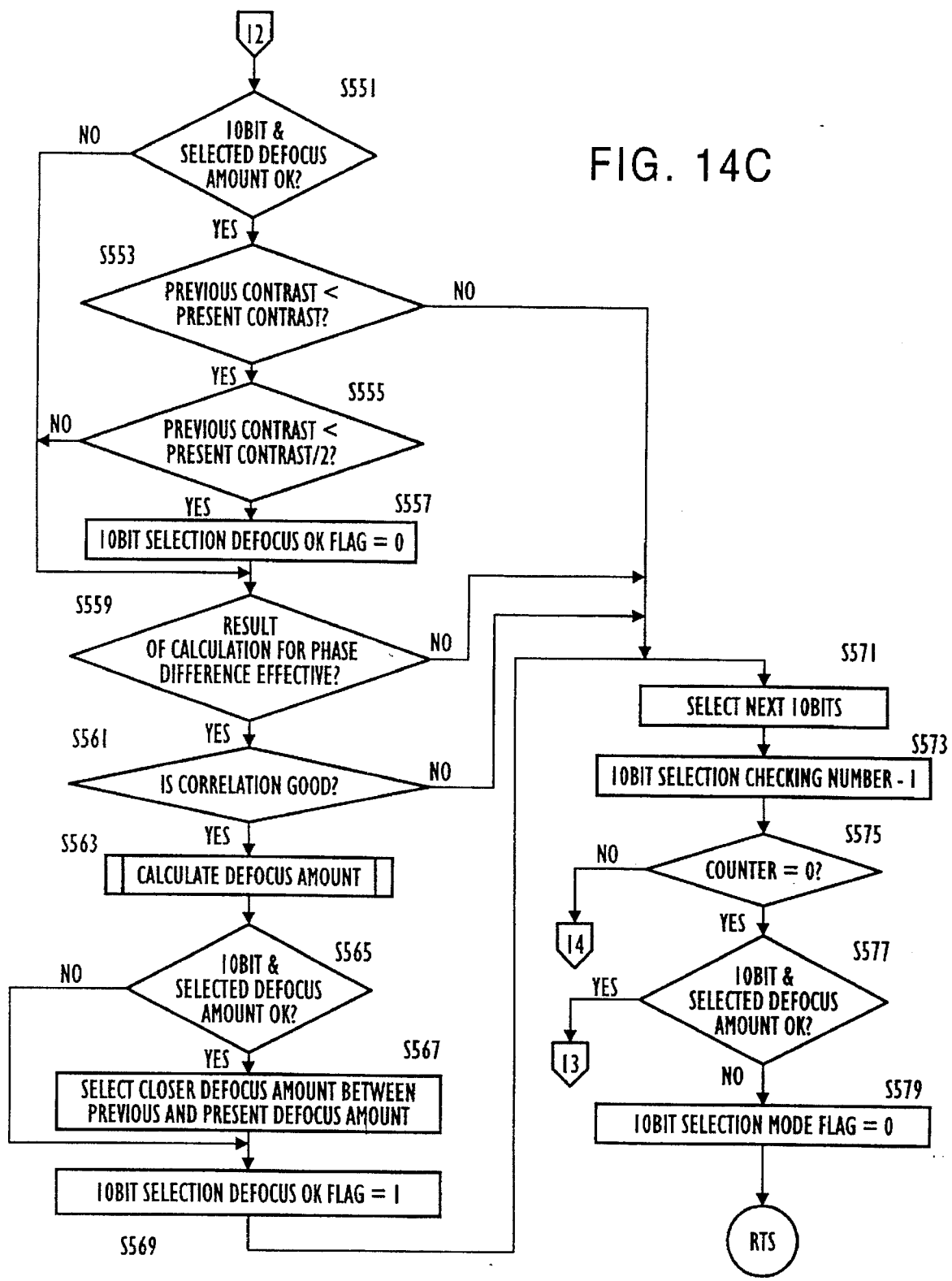

Determination of Defocus Amount:

The following discussion will be directed to the determination of defocus amount which is performed at step S473, with reference to FIG. 14. First, the calculation and check of contrast are effected (step S501). In the calculation of contrast, the sum of the differences of the integration data of the adjoining light receiving portions in the CCD object measuring sensor unit are calculated. After that, whether the contrast is high enough to calculate the phase difference is checked (step S503). If the contrast is low, control is returned, and if the contrast is sufficiently high, the calculation of the phase difference is effected (steps S503 and S505).

At step S505, the phase difference is calculated, for example, by a correlation method or the like. In step S507, if the mode is a 10 bit select mode, control proceeds to step S551 (10 bit select operation), and if the mode is not the 10 bit select mode, control proceeds to step S509. When control first enters this routine, the mode is not the 10 bit select mode. Accordindly, control proceeds to step S509. The 10 bit select mode referred to is indicative of an operation in which, if a correlation (identity) of the integration data between a comparative portion and a reference portion of the CCD line sensor is not satisfactory, a plurality of 10 bit areas are successively selected from among the comparative portion and the reference portion of the CCD line sensor to obtain high correlative areas.

At step S509, whether the calculation results of the phase difference are effective is checked. If the calculation results of the phase difference are not effective, control is returned. Conversely, if the calculation results are effective, the correlation is checked (steps S509 and S511). If the correlation is good, a calculation of the defocus amount is carried out (steps S511 and S530). If the first out-of-focus flag at a low contrast flag is set, and the defocus amount is smaller than a predetermined value, the defocus amount determined by the present calculation is compared with that determined by the previous calculation (steps S533, S535, S537). If the present defocus amount is smaller than the previous defocus amount, the present defocus amount is set as an effective value, and the defocus OK flag is set (steps S539, S541 and S543). Thereafter, control is returned.

If the first out-of-focus flag at a low contrast flag is not set, the present defocus amount is effective, so that the defocus OK flag is set (steps S533, S541 and S543). Thereafter, control is returned.

Even if the first out-of-focus at low contrast flag is set, if the defocus amount is larger than a predetermined value, the previous defocus amount is made effective, and then, the defocus OK flag is set (steps S533, S535 and S543). Thereafter, control is returned. Even if the first out-of-focus flag at a low contrast is set and the defocus amount is less than a predetermined value, if the previous defocus amount is smaller than the present defocus amount, the previous defocus amount is retained. Thereafter, the defocus OK flag is set (steps S533, S535, S537, S539 and S543). Thereafter, control is returned.

As can be understood from the above discussion, if the object contrast is low, a smaller defocus amount is selected from those of the present and previous defocus amounts, a malfunction due to a possible measurement error, for example, an unsteady blinking of the indication of the in-focus state or a failure to operate the AF motor 39 does not occur.

If there is a poor correlation in the integration data at step S511, the searching flag is checked at step S513. Since the flag is "0" when control first comes to this operation a continuation of the calculation for the phase difference is performed at step S515. If the result of the calculation for the phase difference is effective, control goes back to step S511, and if not effective, the searching flag is set. Control then goes back to step S505 (S517 and S519). After the searching flag has been set, control proceeds from step S513 to step S521 and, the phase deviation is compared with a reference value (step S521). If the phase deviation is smaller than the reference value, the contrast is checked (steps S521 and S523). If the contrast is low, control proceeds to step S530. If the contrast is high, the 10 bit select mode flag and the moving object predicting mode forbidding flag are set to select the first 10 bits. Thereafter, the number of checking operations is set (the number is 4 in the illustrated embodiment). Thereafter, control is returned to step S505 (steps S523, S525, S527 and S529).

If the 10 bit select mode flag is set, control proceeds to step S551 (10 bit select operation) from step S507. In the 10 bit select operation, whether the effective defocus amount based on the selected 10 bits is obtained by one operation is checked. If so, and if the contrast is more than twice the previous contrast, the 10 bit select defocus OK flag is cleared to make the previous data null. Thereafter, control proceeds to step S559 (steps S551, S553, S555 and S557). If the 10 bit select defocus amount is not obtained at step S551, control proceeds to step S559 directly. If the contrast is lower than the previous contrast, control proceeds to step S571, since the presently selected 10 bit data is not used (steps S551 and S555). If the present contrast is greater than the previous contrast, but less than twice the previous contrast, control proceeds to step S559 without clearing the 10 bit select defocus OK flag (steps S551~S557).

At step S559, if the calculation result of the phase difference is effective, the defocus calculation is performed, provided that there is a good correlation (steps S559, S561 and S563). After the defocus calculation, the bit select defocus OK flag is checked (step S565). If the 10 bit select defocus OK flag is set, the smaller of the present defocus amount and the previous defocus amount, i.e., a smaller defocus amount is selected (step S565, S567). Thereafter, the 10 bit select OK flag is set and control proceeds to step S571 (S569). If the 10 bit select defocus OK flag has been cleared, control proceeds directly to step S569 and the flag is then set (steps S565, S569). Thereafter, control proceeds to step S571 (steps S565, S567, and S569). If the calculation result of the phase difference is not effective, or the correlation is bad, control proceeds to step S571 without calculating the defocus amount (steps S559 and S561).

At step S571, the subsequent 10 bits are selected. Thereafter, the counter that counts the number of 10 bit select checking operations is decremented by one. If the counter value is not 0, control is returned to step S505. The operations from step S551 to step S575 are repeated until the counter value is 0 (steps S573 and S575). The initial value of the counter is set at "4" in the illustrated embodiment. If the counter value is 0, control proceeds to step S533 (i.e., the operation that prevents the unsteady flicker at low contrast), on the condition that the 10 bit select defocus OK flag is set. If no 10 bit select defocus OK flag is set, the 10 bit select mode flag is cleared (steps S575, S577 and S579). Thereafter, control is returned.

Thus, the integration data can be selected from the bit group of the CCD sensors having good correlation by the operations of steps S505, S507, S551~S575. Although the bit number is 10 (10 bits) in the illustrated embodiment, the number is not limited to 10.

Figure 15A:
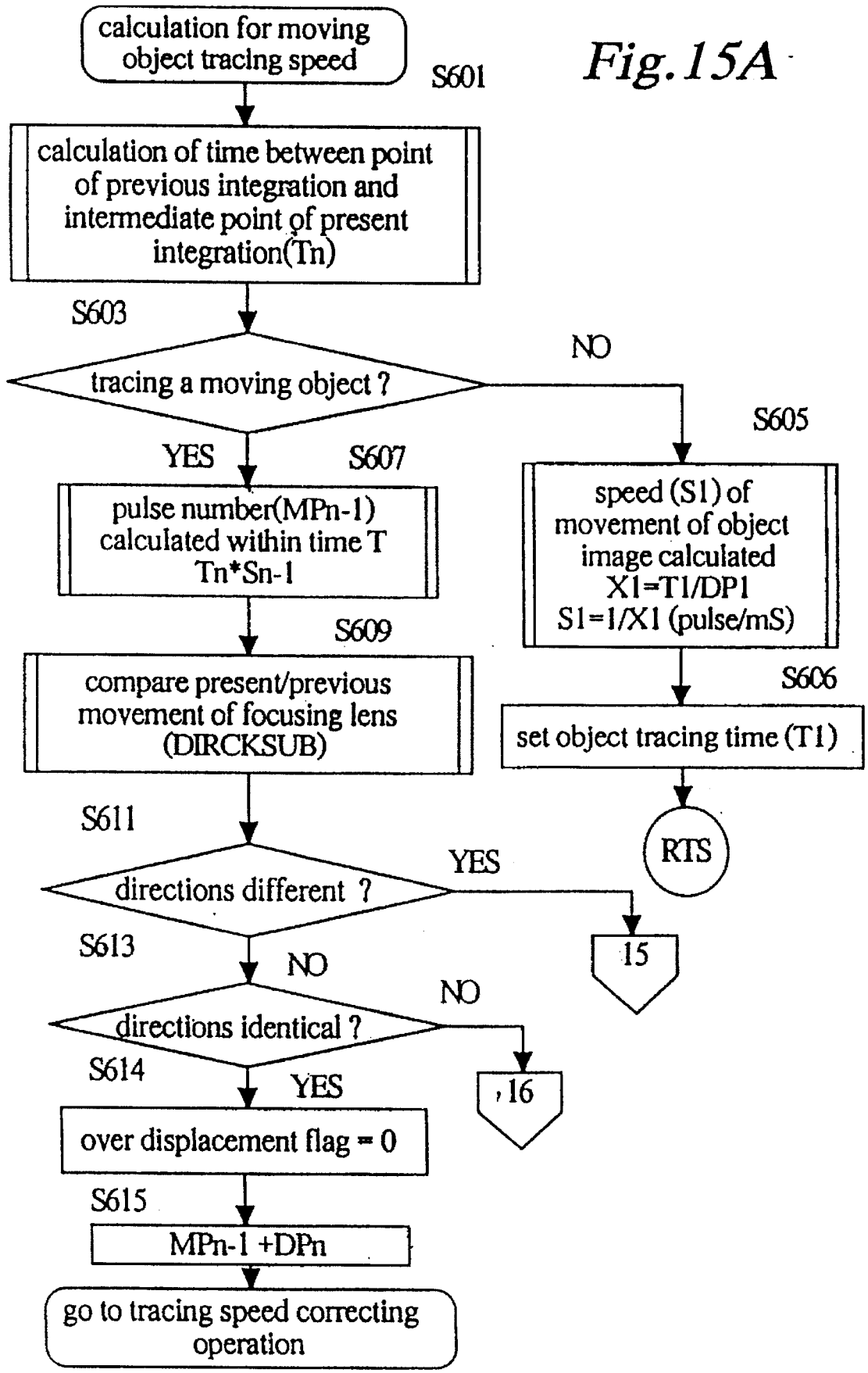
FIGS. 15A, 15B and 15C are flow charts of a calculation of a moving object following speed and a correction thereof.
Figure 15B:
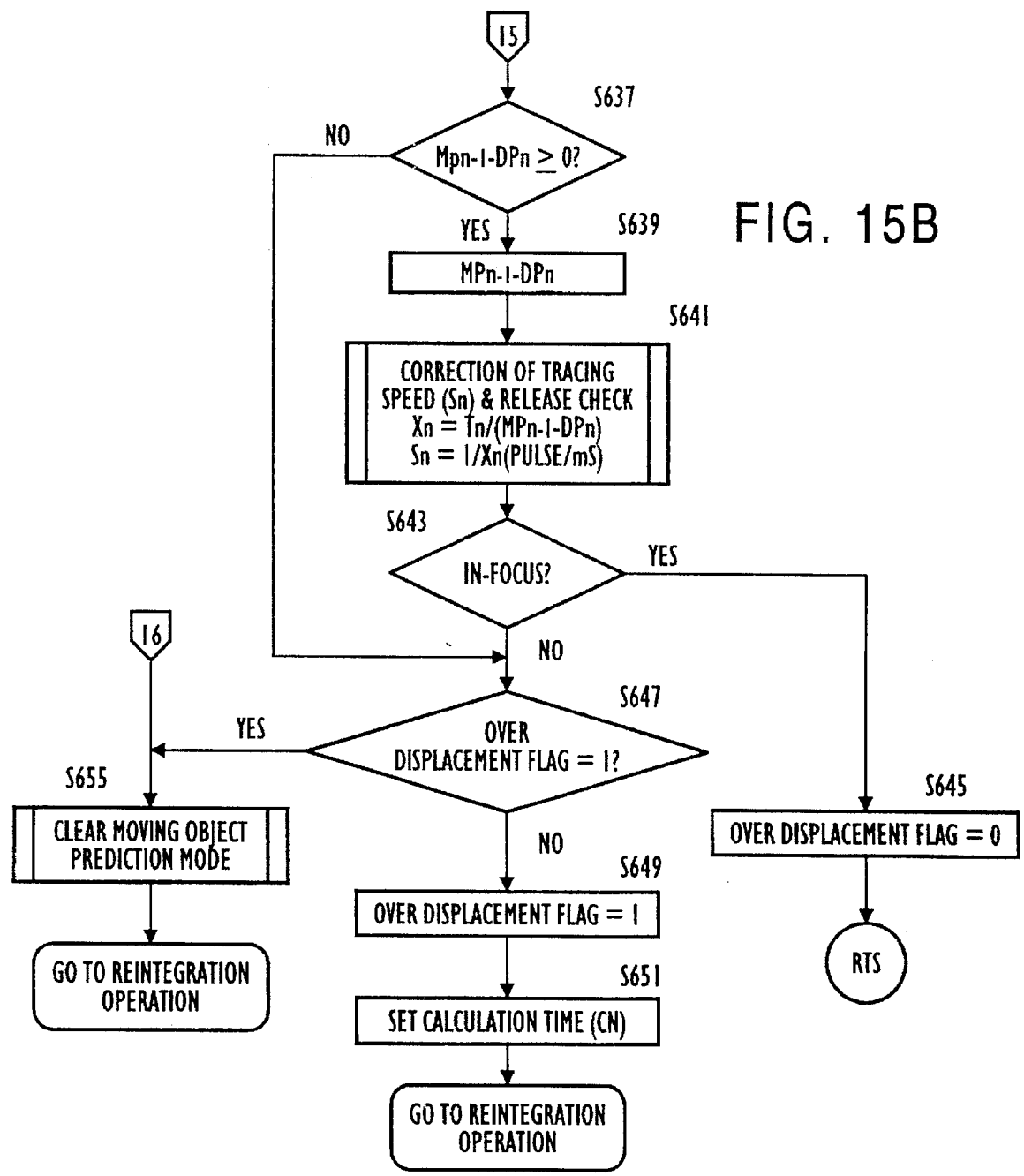
Figure 15C:
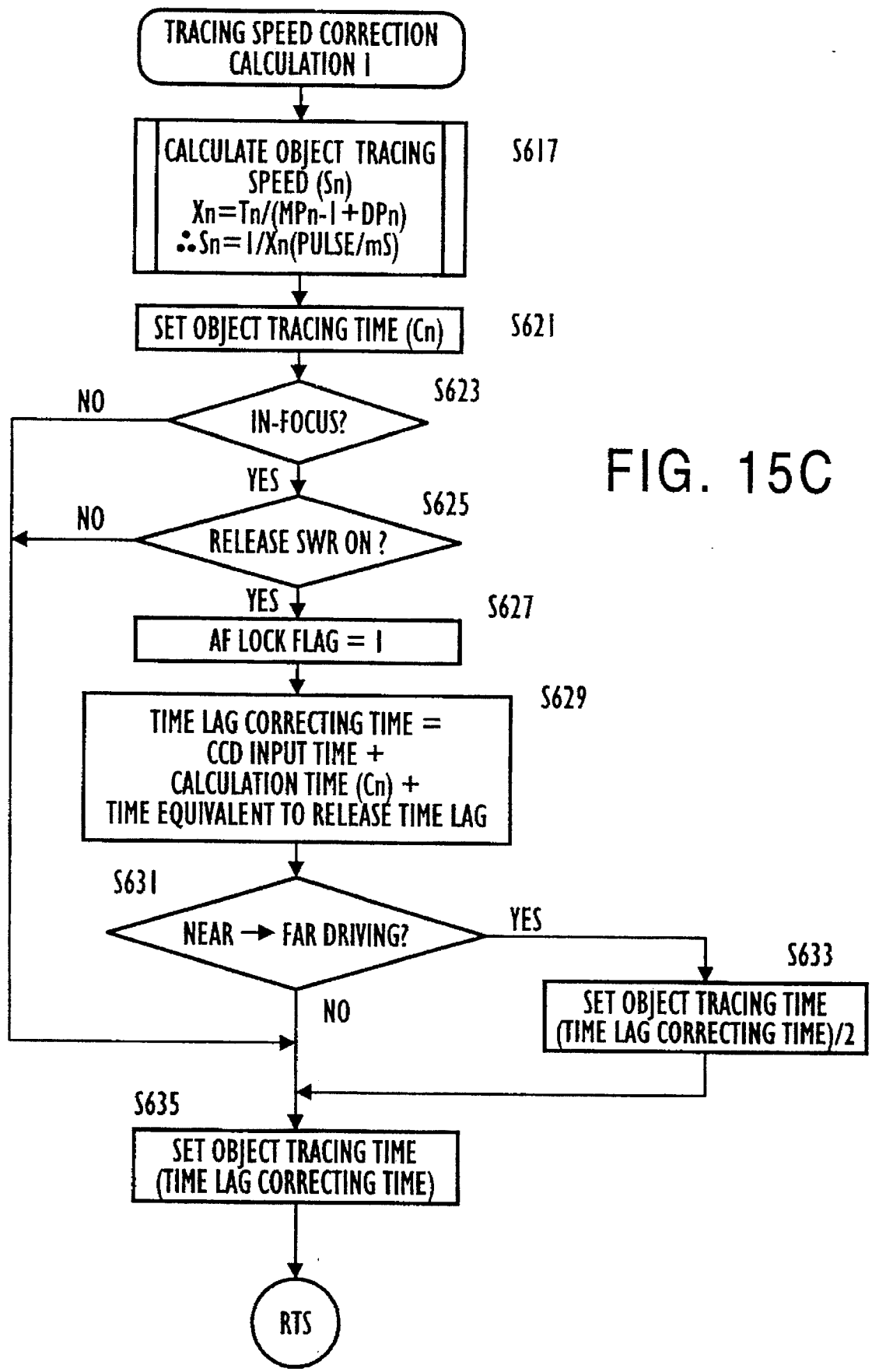

Calculation of Tracing Speed of Moving Object:

The tracing speed of the moving object is calculated as follows, with respect to FIG. 15. First, time $T_n$ between the intermediate point of the previous integration and the intermediate point of the present integration is calculated (step S601). The reason that the intermediate point of the integration is used as a reference point is that the integration time varies depending on the object brightness.

If the object is not traced, that is, it is the first time control comes to this operation after the moving object tracing mode has been set, the speed $S_1$ of the movement of the object image from time $T_1$ and the defocus pulse number $DP_1$ is calculated in accordance with equations ① and ②. Thereafter, $T_1$ is set at the object tracing time (i.e., constant speed control time, and control is returned (step S605 and S606). If the object is being traced, that is, it is the first time control comes to this operation after the moving object tracing mode has been set, the number of pulses $MP_{n-1}$ in which the object image would move within time $T_n$ from time $T_n$ and speed $S_{n-1}$ in accordance with equation ③ is calculated (step S607). The suffix "n-1" mentioned above refers to a variable of the previous integration, calculation or driving operation, whereas "n" stands for a current value. Thereafter, the direction of the present movement of the focusing lens is compared with that of the previous movement thereof. If the directions are identical to each other, the over displacement flag (i.e., over displacement of the focusing lens beyond an intended position) is cleared. Thereafter, the pulse number $MP_{n-1}$ is added to the present defocus pulse number DPn. Control then proceeds to step S617 (i.e., tracing speed correcting operation in FIG. 15C) (steps S609, S611, S613 and S615). If the directions of movement of the focusing lens are different from each other, control proceeds to step S637, since it can be considered that the moving speed of the object image is decreased or the object image is stopped at an extreme position beyond the intended position, or that the direction of the movement thereof is changed (steps S609 and S611). If an error occurs, i.e., if it is impossible to detect the difference in the direction of the movement of the focusing lens, the moving object predicting mode flag is cleared and control proceeds to the reintegration operation (steps S611, S613 and S655).

Tracing Speed Correcting Calculation 1:

In the tracing speed correcting calculation 1, the object tracing speed $S_n$ is obtained by the following formula (step S617);

$$X_n = T_n/(MP_{n-1} + DP_n)$$
$$S_n = 1/X_n$$
$$= (MP_{n-1} + DP_n)/T_n \quad \text{(pulse/ms)}$$

Thereafter, the object tracing time (sum of the integration data input time and the calculation time) $C_n$ is set at step S621. If the object is in-focus (step S623) and the release switch SWR is turned ON (step S625), the AF lock flag is set (step S627). Thereafter, the time lag correcting time (i.e., the object tracing time $C_n$ plus the time corresponding to the release time lag) is calculated at step S629. If the object moves away from the camera, the constant speed control time is set to be half the time lag correcting time (step S633). If the object approaches the camera, the constant speed control time is set to be identical to the time lag correcting time (step S635).

If the object is out-of-focus, or if the release switch SWR is not turned ON, even if the object is in-focus (steps S623 and S625), control proceeds to step S635 to continue the tracing operation, so that the constant speed control time is set to be identical to the object tracing time $C_n$ (step S635).

If the direction of the present movement of the focusing lens is different from that of the previous movement, whether ($MP_{n-1} - DP_n$) is positive or negative is checked at step S637. If ($MP_{n-1} - DP_n$) ≥ 0, the value of ($MP_{n-1} - DP_n$) is calculated at step S639. Thereafter, the correcting calculation of the tracing speed $S_n$ is effected based on the following equations and the state of the release switch SWR is checked (step S641).

$$X_n = T_n/(MP_{n-1} + DP_a)$$

$$S_n = 1/X_n$$

$$= (MP_{n-1} + DP_n)/T_n \quad \text{(pulse/ms)}$$

If the object is in-focus at step S643, the over displacement flag representing the over displacement of the focusing lens is cleared (step S645). If the object is out-of-focus at step S643, or if $(MP_{n-1}-DP_n)<0$ at step S637, whether the over displacement flag has been set is checked (step S647). If the over displacement flag has not been set, it is set at step S649. Thereafter, the calculation time $C_n$ is set at step S651. Control then waits for the calculation time $C_n$ and proceeds with reintegration. If the over displacement flag has been set at step S647, the moving object predicting mode flag is cleared at step S655.

Figure 16:
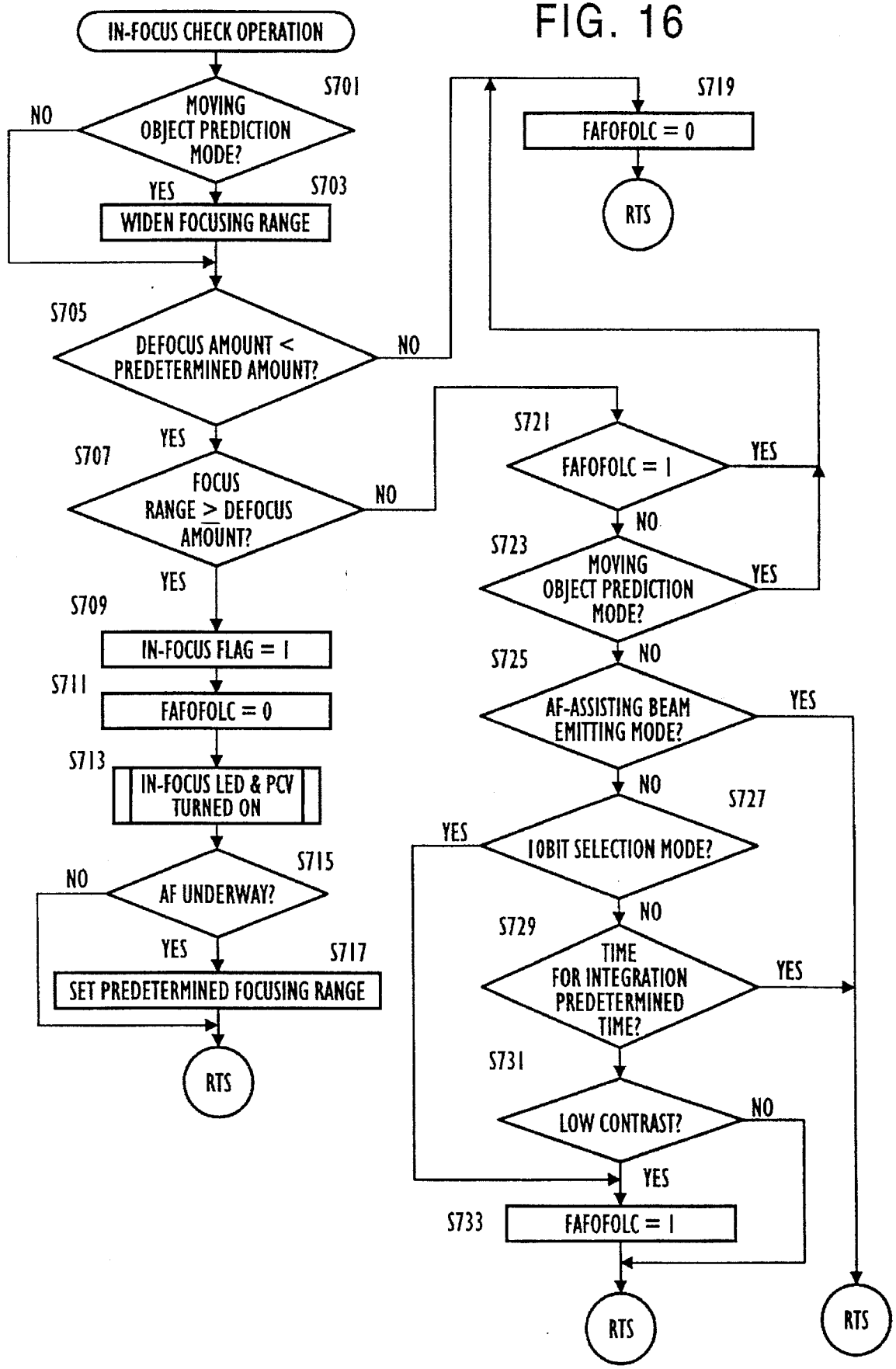
FIG. 16 is a flow chart of a focus state checking operation and a blinking preventing operation at a low contrast.

Focus Check:

FIG. 16 shows the focus checking operation. In this operation, the focus range (width) is expanded to increase the permissibility range of the releasing operation when the object is traced.

First, the predetermined focus range (i.e. predetermined defocus amount) is maintained if the mode is not the moving object predicting mode. If the mode is the moving object predicting mode, the focus range is expanded (enlarged). Thereafter, whether the present defocus amount is smaller than a predetermined value is checked (steps S701, S703 and S705).

If the present defocus amount is larger than a predetermined value (which is larger than the focus width), the first out-of-focus at low contrast flag is reset at step S719.

If the defocus amount is smaller than a predetermined value, and the object is in-focus (within the focus width), the in-focus flag is set. Thereafter, the first out-of-focus at a low contrast flag is cleared. Thereafter, the focus indicating LED of the indicator unit 45 is illuminated, and the electronic buzzer (PCV) 46 is sounded (steps S705, S707, S709, S711 and S713).

If the AF operation is effected, a predetermined focus range (width) corresponding to the moving speed of the object image is set to check the moving object. Conversely, if the AF operation is not effected, control is directly returned (steps S715 and S717).

If the defocus amount is larger than a predetermined focus width of S707 and smaller than the predetermined value of step S705, the operation to prevent the unsteady blinking at a low contrast is carried out. If the first out-of-focus flag at a low contrast has been set, or even if it has not been set, but the mode is the moving object predicting mode, the first out-of-focus at a low contrast flag is cleared and control is returned (steps S721, S723 and S719).

If the first out-of-focus at low contrast flag has been cleared at step S271, the mode is not the moving object predicting mode, and the mode is the auxiliary light emission mode, control is directly returned (steps S721, S723 and S725). If the mode is not the auxiliary light emission mode, and the 10 bit select mode flag is set, the first out-of-focus at low contrast flag is set (steps S727 and S733). Even if the mode is not the 10 bit select mode, if the integration operation time is longer than a predetermined time, control is directly returned (steps S727 and S729). Even if the integration operation time is shorter than a predetermined time, if the contrast is not low, the control is directly returned. If the contrast is low, the first out-of-focus at low contrast flag is set. Thereafter, control is returned (steps S729, S731 and S733). If the contrast is high, control is directly returned (step S731).

As can be seen from the above discussion, when control enters this routine for the first time, if the object is out-of-focus, and the contrast is low, the first out-of-focus flag at a low contrast is set. As a result, even if the focus state is switched from the in-focus state to the out-of-focus state, the out-of-focus indication operation (step S301) is not effected at the first out-of-focus state. Accordingly, an unsteady blinking of the indication lamp does not occur. Although the out-of-focus state is indicated when the two consecutive out-of-focus states occur in the illustrated embodiment, the number of the occurrence of the out-of-focus state is not limited to two, and can be, for example, three or more than three.

Terminal Point Detecting Operation

The operations when the focusing lens group 53 reaches a closet extremity (i.e., shortest focal position) and a farthest extremity (i.e., infinite focal position) will be discussed below with reference to FIG. 17.

In this operation, when the arrival of the focusing lens group 53 to the terminal points (i.e., two extremities) or the impossibility of the drive of the focusing lens group 53 by some reason is detected, the AF motor 39 is stopped.

Whether the AF motor 39 is driven is checked. If the AF motor is not driven, control proceeds to step S791 to perform a terminal point detecting timer resetting operation. If the pulse interruption flag is set (i.e., the encoder 41 outputs the pulses) during the driving of the AF motor 39, a terminal point checking operation is carried out (step S771). Conversely, if the pulse interruption flag is not set (i.e., pulse is not issued), control proceeds to step S755 (i.e., counting operation of the terminal point detecting timer).

In the terminal point, detecting timer counting operation, the AF motor 39 is stopped when no pulse is outputted from the encoder 41 for a predetermined time during the driving of the AF motor 39, since it is assumed that the focusing lens group 53 is at one of the extremities of the focusing lens group 53 can not move. First, the pulse flag which represents the presence of the pulse at the terminal point PAWDT is cleared, and the terminal point detecting timer count flag which indicates that the counting operation of the timer is being effected, is set. The counting operation of the timer is decreased (step S755, S757 and S759). If the counted number is 0, it is detected that the focusing lens group has come to the terminal point and control goes to the terminal process operation. If the counted number is not 0, control is returned (step S801).

The following discussion will be directed to the operation which is performed when the time of the terminal point detecting timer is up, with reference to the flow chart regarding terminal operation shown in FIG. 11D.

In the terminal operation, the AF motor is first braked to a stop (step S345). Then, when the result of the calculation is effective while the AF motor is being driven, control goes to step S342 in the AFNG operation to set the reintegration operation. Then, the AE calculation operation is performed if the loop time has expired. Control goes back to the reintegration operation if the loop time has not expired (steps S346, S342, S343). When the result of calculation is not effective in step S347 and the driving direction is reversed, control proceeds to the AFNG operation (step 341) and the operations of steps S341–S343 are performed (S346, S347, S341). If the driving direction is determined not to be reversed in step S347, control proceeds to step S348 to reverse the driving direction prior to going to a search reintegration operation.

In the terminal point checking operation, the terminal point of the focusing lens group 53 is detected by the change of the pulses outputted from the encoder 41. In this operation, the pulse interrupting flag is cleared (step S771) of FIG. 7.

Thereafter, the counting operation of the terminal point detecting timer is checked (step S775). If counting is not effected, or if the pulse flag PAWDT is set during the counting operation, control proceeds to the terminal point detecting times resetting operation (step S791). If the pulse flag PAWDT is not set during the counting operation, the pulse flag PAWDT is set. Thereafter, if the constant speed pulse flag PAWDT is set. Thereafter, if the constant speed control is effected, control is returned. But, if constant speed control is not effected, control proceeds to step S757 (steps S777, S779 and S781).

The timer resetting operation is effected to initialize the data regarding the detection of the terminal point. In this operation, the timer count flag and the pulse flag PAWDT are cleared, and the terminal point detecting timer data is set (steps S791, S793 and S795).

Second Embodiment of Moving Object Predicting AF Operation:

The second embodiment of the moving object predicting AF operation will be discussed below with reference to FIG. 18 and 19.

In the second embodiment, the constant speed control continues even during the calculation. Namely, the lens driving speed corresponding to the moving speed of the object image is calculated, and the tracing speed is corrected by the integration while driving the focusing lens group at the constant speed identical to the calculated speed. The basic principle of the second embodiment is the same as that of the first embodiment, except that the constant speed control is effected during the necessary calculation in the second embodiment. To this end (i.e., constant speed control in parallel with the necessary calculation), the CPU 36 is provided to control the motor driving IC 37 in the second embodiment.

First, the DC lens drive M is effected in accordance with the defocus pulse DP when the mode is the moving object predicting mode. Upon completion of the DC lens drive M, the integration operation $I_1$ is carried out. In the calculation $C_1$, the speed, $S_1$ of the movement of the object image in the period of time $T_1$ between the intermediate point of the integration operation I and the intermediate point of the integration operation $I_1$ is calculated by equations ① and ② mentioned above, so that the lens driving time can be obtained by the following equation ⑨:

$$(T_1 + I_1/2 + 1)/2 \qquad ⑨$$

Consequently, the lens drive $M_1$ is performed at a constant speed that is identical to the triple speed of the tracing speed $S_1$ for the drive time calculated by the equation ⑨. As a result of the lens drive $M_1$ at the constant speed control, the focusing lens group 53 is moved to the vicinity of the focal position within a short space of time. The effect substantially similar to that obtained by the driving operation at the speed twice the moving speed $S_1$ of the object image for the time $(T_1 + I_1/2 + C_1)$ is also obtained by the lens driving operation at triple speed.

Upon the completion of the lens drive $M_1$ at the triple speed, the integration operation $I_2$ and the calculation $C_2$ are effected while performing the constant speed drive $M_2$ at the tracing speed $S_1$. In the calculation $C_2$, the pulse number $MP_1$ corresponding to the displacement of the object image on the assumption that the object image moves at the tracing speed $S_1$ for the time $T_2$ between the intermediate point of the previous integration operation $I_1$ and the intermediate point of the present integration operation $I_2$ is calculated based on equation ③ ($MP_1 = T_2 \times S_1$) mentioned above. Thereafter, the moving speed $S_2$ of the object image for the time $T_2$ is obtained by the following equations, similar to equations ④ and ⑤ mentioned above:

$$X_2 = T_2/(MP_1 + DP_2)$$

$$S_2 = 1/X_2$$
$$= (MP_1 + DP_2)/T_2 \quad \text{(pulse/ms)}$$

The lens drive $M_3$ at the constant tracing speed $S_2$ continues during the integration operation $I_3$ and the calculation $C_3$.

Thereafter, similar to the foregoing, the tracing speed $S_n$ is obtained in accordance with the pulse number $MP_{n-1}$ ($MP_{n-1} = T_n \times S_{n-2}$), corresponding to the displacement of the object which would move at speed $S_{n-1}$ within the time $T_n$. The lens drive $M_{n+1}$ continues at the constant tracing speed $S_n$ during the integration operation $I_{n+1}$ and the calculation $C_{n+1}$.

The tracing control as mentioned above ensures that the moving object is substantially always kept in-focus. If the release switch is turned ON during the tracing operation, the constant speed control is effected at the tracing speed $S_n$ obtained in the previous calculation while the mirror is in an upward position. The focusing lens group stops before the shutter leading curtain moves (FIG. 19). Thus, the object is substantially in-focus when the leading curtain starts to move (i.e., when the exposure commences).

Figure 20A:
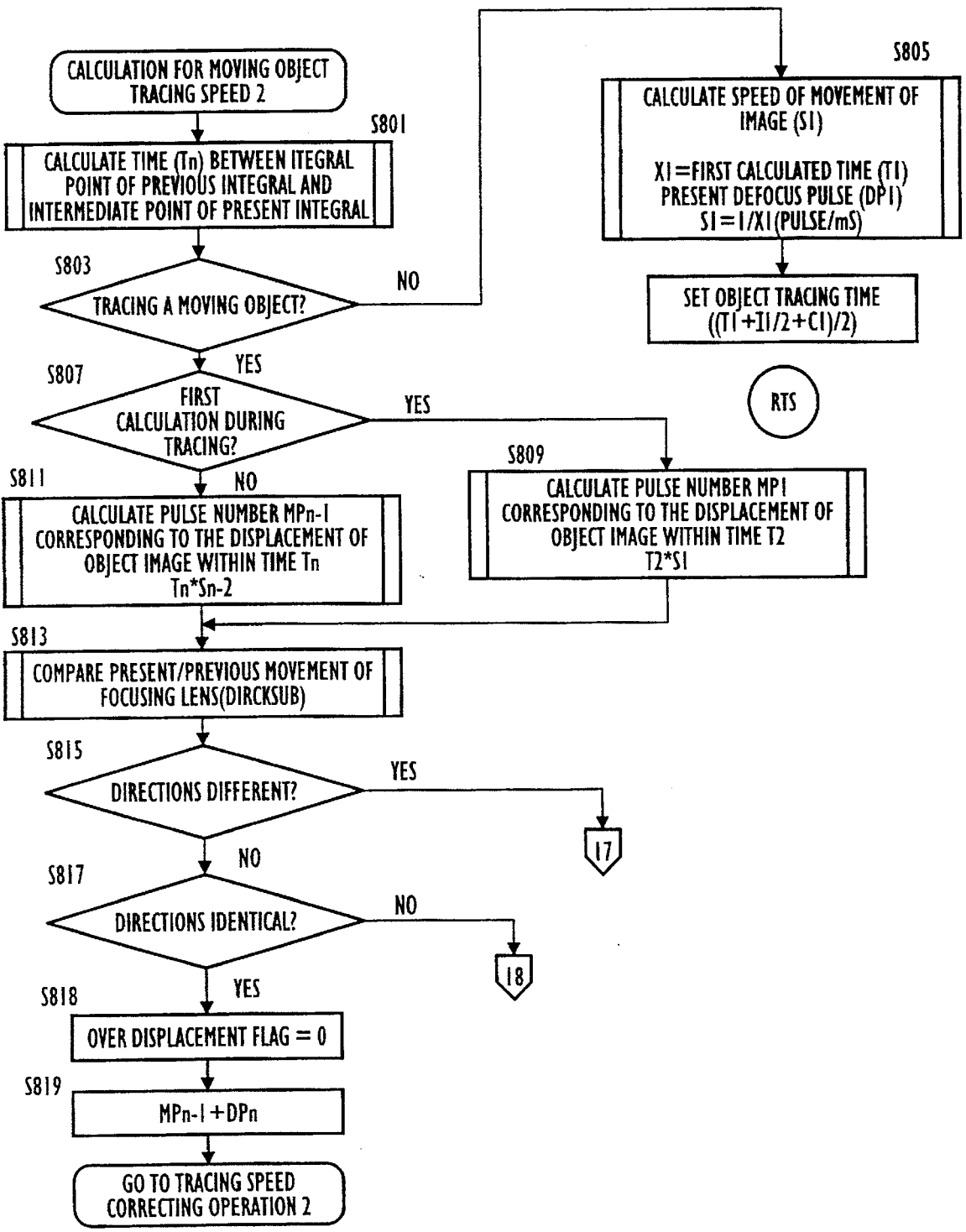
FIGS. 20A, 20B and 20C are flow charts of calculations of a moving object following speed, etc., in the second moving object predicting AF mode operation shown in FIG. 18.
Figure 20B:
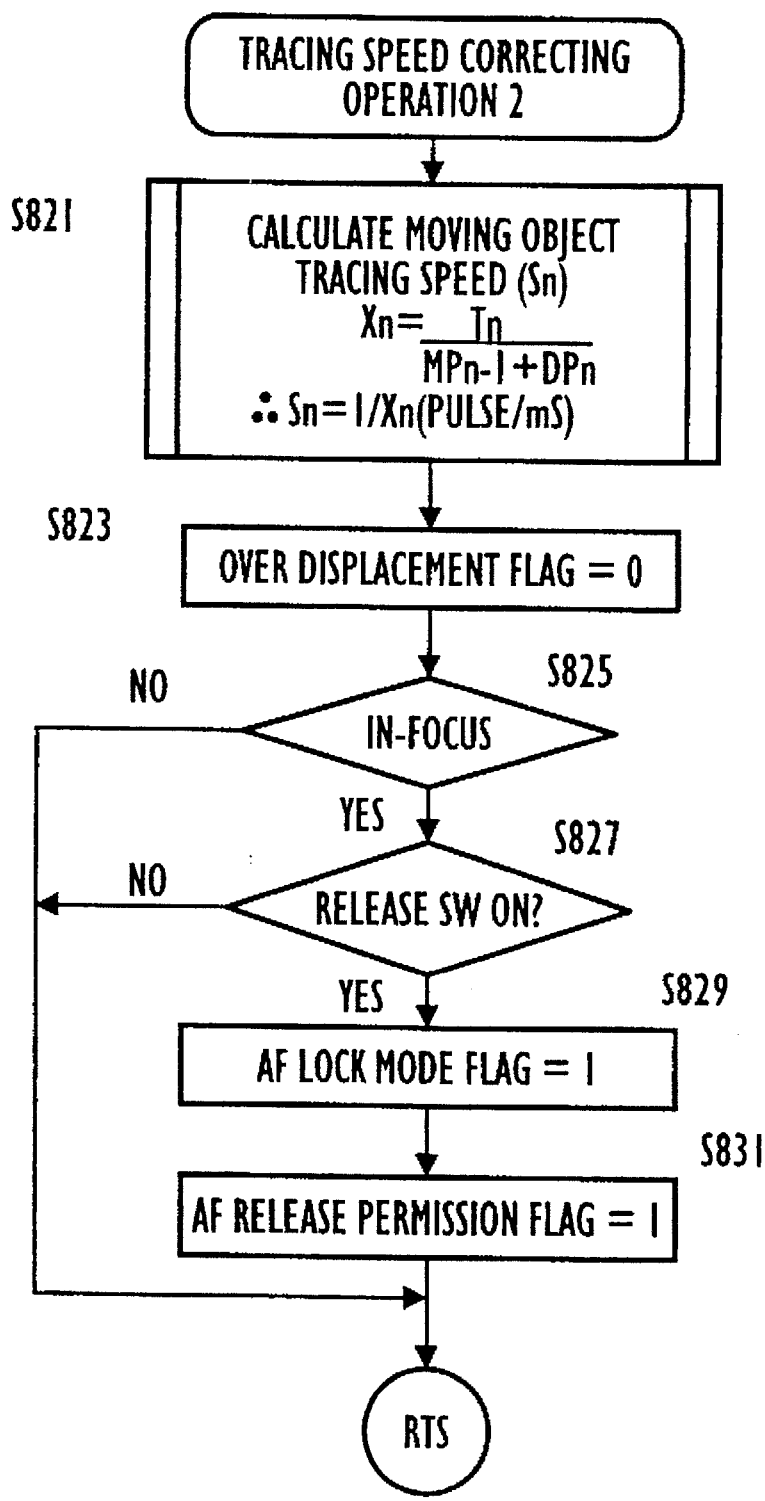
Figure 20C:
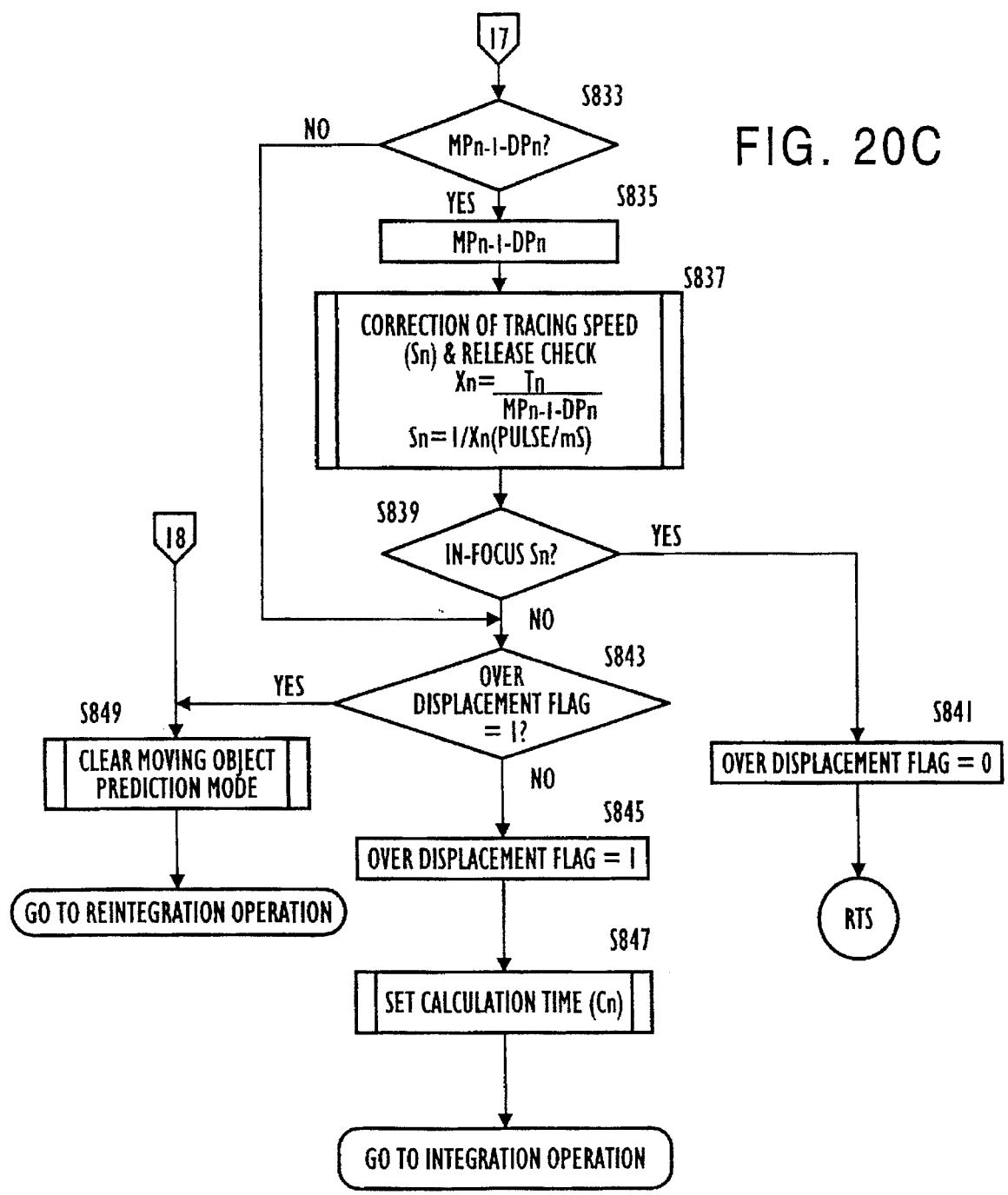
Figure 22:
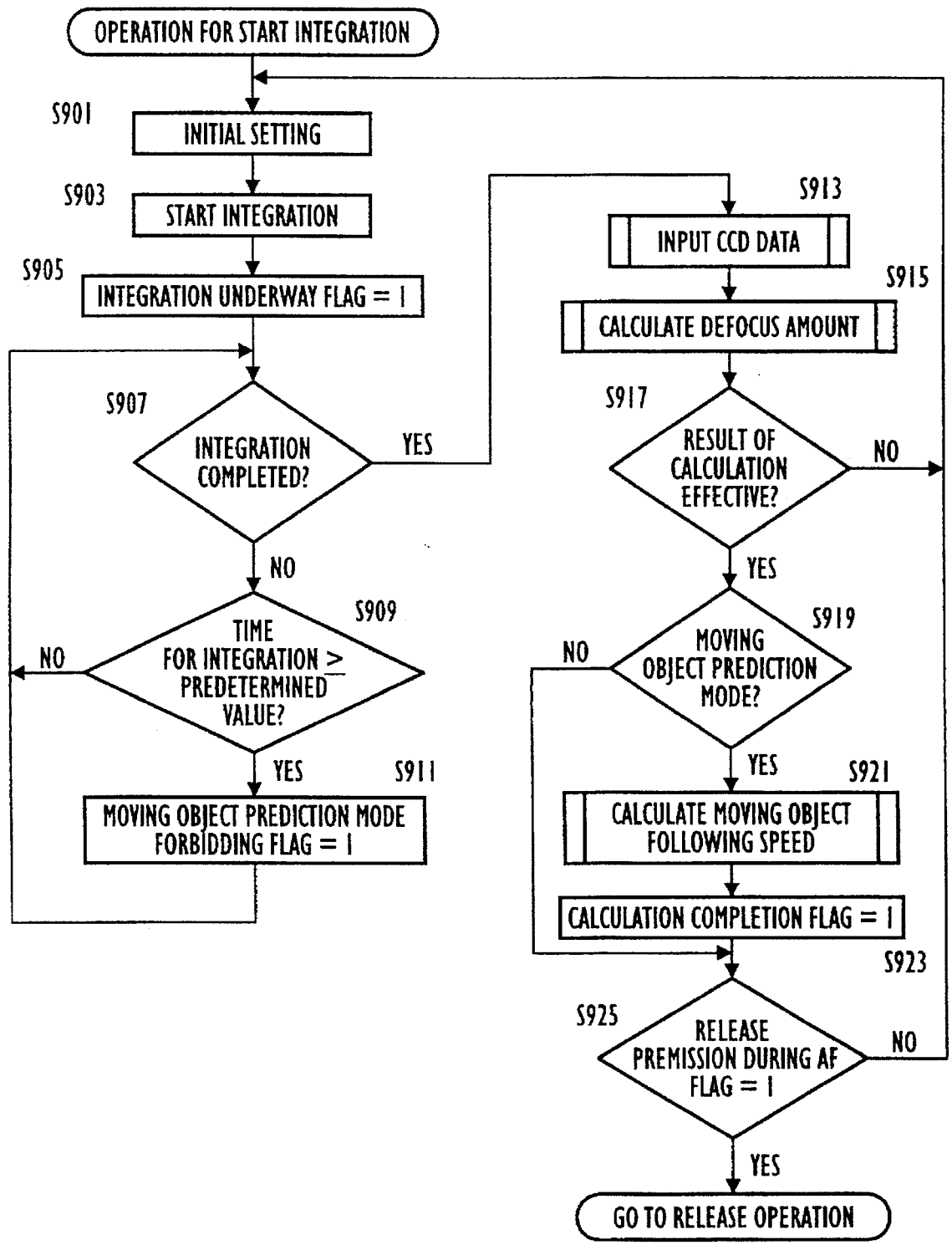

FIGS. 20 (20A–20C) and 21 (21A–21B) show flow charts of the second tracing operation of the moving object. In this embodiment, the operations shown in FIGS. 8–14C and 17 mentioned above and 20B, 20C, 21A, 21B are performed by the main CPU 35, whereas the operation for calculation of the moving object tracing speed 2, shown in FIG. 20A, and the operation of starting integration, shown in FIG. 22, are performed by a sub CPU 36 at the same time as the main CPU 35 operation. In the second embodiment, the reintegration operation shown in FIG. 13C has been performed at step S253 in the reintegration operation shown in FIG. 11A before the moving object prediction mode flag is set. When the moving object prediction mode flag has been set, the reintegration operation shown in FIG. 22 is performed. Further, when the moving object prediction mode flag has been set, steps S326 and S325 are skipped to perform the defocus pulse calculation at the middle point of integration which is equivalent to step S323, before the calculation for the moving object tracing speed at step S921 in the reintegration operation.

First, time $T_n$ between the intermediate point of the previous integration operation and the intermediate point of the present integration operation is calculated (step S801).

Thereafter, whether the object is being traced is checked at step S803. If the object is not traced, that is, if the object has not yet been traced, since it is the first time for the control to come to this operation, after the control had entered the moving object tracing mode, the speed $S_1$ of the object image movement is calculated with the $T_1$ and $DP_1$ values (step S805). Thereafter, $\{(T_1 + I_1/2 + C)/2\}$ is set as the object tracing time (i.e., constant speed control time. If the object is traced and the calculation is the first calculation during tracing operation, that is, if the object has already been traced once, since it is the second time for the control to come to this this operation, the pulse number $MP_1$ corresponding to the displacement of the object image within the time $T_2$ is calculated with the $T_2$ and S values. After the second calculation, the pulse number $MP_{n-1}$ corresponding to the displacement of the object image within time $T_n$ is calculated with the $T_n$ and $S_{n-1}$ values (steps S803, S807, S809, S811).

Thereafter, the direction of the present movement of the focusing lens group 53 is compared with the direction of the previous movement at step S813. If the directions are identical to each other, the over displacement flag is cleared and the calculated pulse number $MP_{n-1}$ is added to the present defocus pulse number $DP_n$ (steps S813, S815, S818 and S819). Thereafter, control proceeds to step S821 (i.e., tracing speed correcting calculation 2).

Conversely, if the directions of movement of the focusing lens group are different from each other (as determined in step S813), it is assumed that the moving speed of the object has decreased, the object has stopped, or the direction of movement of the object image has changed, resulting in a displacement beyond the intended position. Accordingly, control proceeds to step S833.

If the direction cannot be detected, for example, by an unexpected error, the moving object predicting mode flag is cleared. Thereafter, control proceeds to the reintegration operation (steps S815, S817 and S849).

Tracing Speed Correcting Calculation 2:

In a tracing speed correcting calculation 2, the object tracing speed $S_n$ is obtained by the following formula (step S821):

$$X_n = T_n/(MP_{n-1} + DP_a)$$
$$S_n = 1/X_n$$
$$= (MP_{n-1} + DP_n)/T_2 \quad \text{(pulse/ms)}$$

If the object is in-focus and the release switch SWR is turned ON, the AF lock, flag and the AF release permission flag are set. Thereafter, control is returned (steps S825, S827, S829 and S831). If the object is out-in-focus or the release switch SWR is not turned ON, control is directly returned (steps S825 and S827).

If the directions of the present movement of the focusing lens is different from that of the previous movement, whether $(MP_{n-1}-DP_n)$ is positive or negative is checked. If $(MP_{n-1}-DP_n) \geq 0$, tracing speed Sn is obtained by the following equations (steps S815, S833, S835 and S837):

$$X_n = T_n/(MP_{n-1} + DP_a)$$
$$S_n = 1/X_n$$
$$= (MP_{n-1} + DP_n)/T_n \quad \text{(pulse/ms)}$$

If the object is in-focus at step S839, the over displacement flag representing the over displacement of the focusing lens is cleared (steps S839, S841). If the object is out-of-focus at step S643, or if $(MP_{n-1}-DP_n)<0$ at step S833, whether or not the over displacement flag is set is checked (step S843). If the over displacement flag has been set, the moving object predicting mode flag is cleared at step S849, since the over displacement occurs for the second time. Namely, if the over displacement (excess displacement) of the focusing lens group takes place, this may be caused by an error. This is because when the two over displacements occur, the moving object predicting mode flag is cleared. Alternatively, it is possible to clear the moving object predicting mode flag by one over displacement or more than two over displacements.

If an over displacement flag is not set at step S647, it is set at step S845, since the over displacement occurs for the first time. Thereafter, integration data is input and the calculation time $C_n$ is set. Control then waits for calculation time $C_n$ and proceeds to the an integration operation (steps S843, S845 and S847).

Figure 21A:
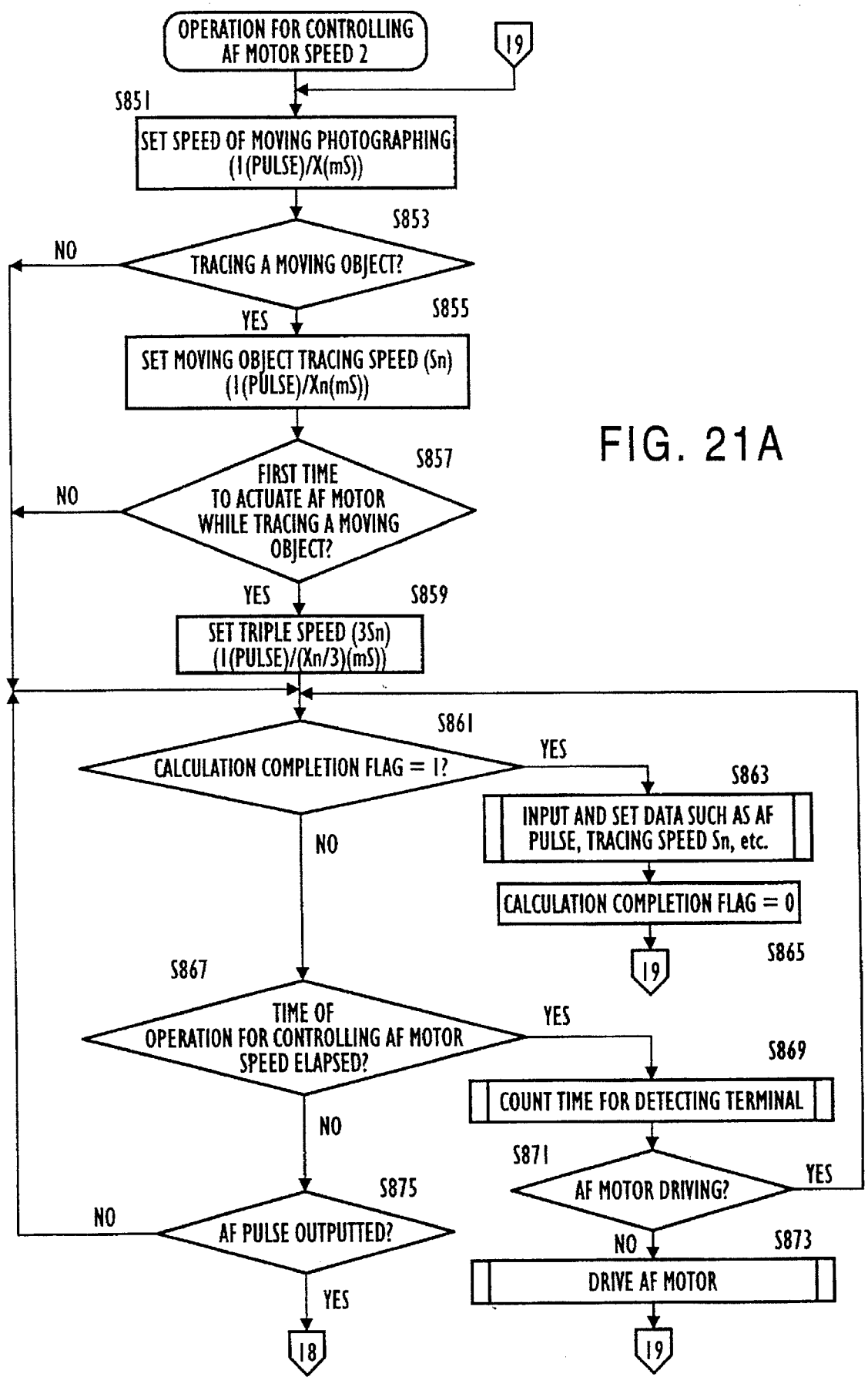
FIGS. 21A and 21B are flow charts of a constant speed control operation in the second moving object predicting AF mode operation shown in FIG. 18; and, FIG. 22 is a flow chart of an integral operation in the second moving object predicting AF mode operation shown in FIG. 18.
Figure 21B:
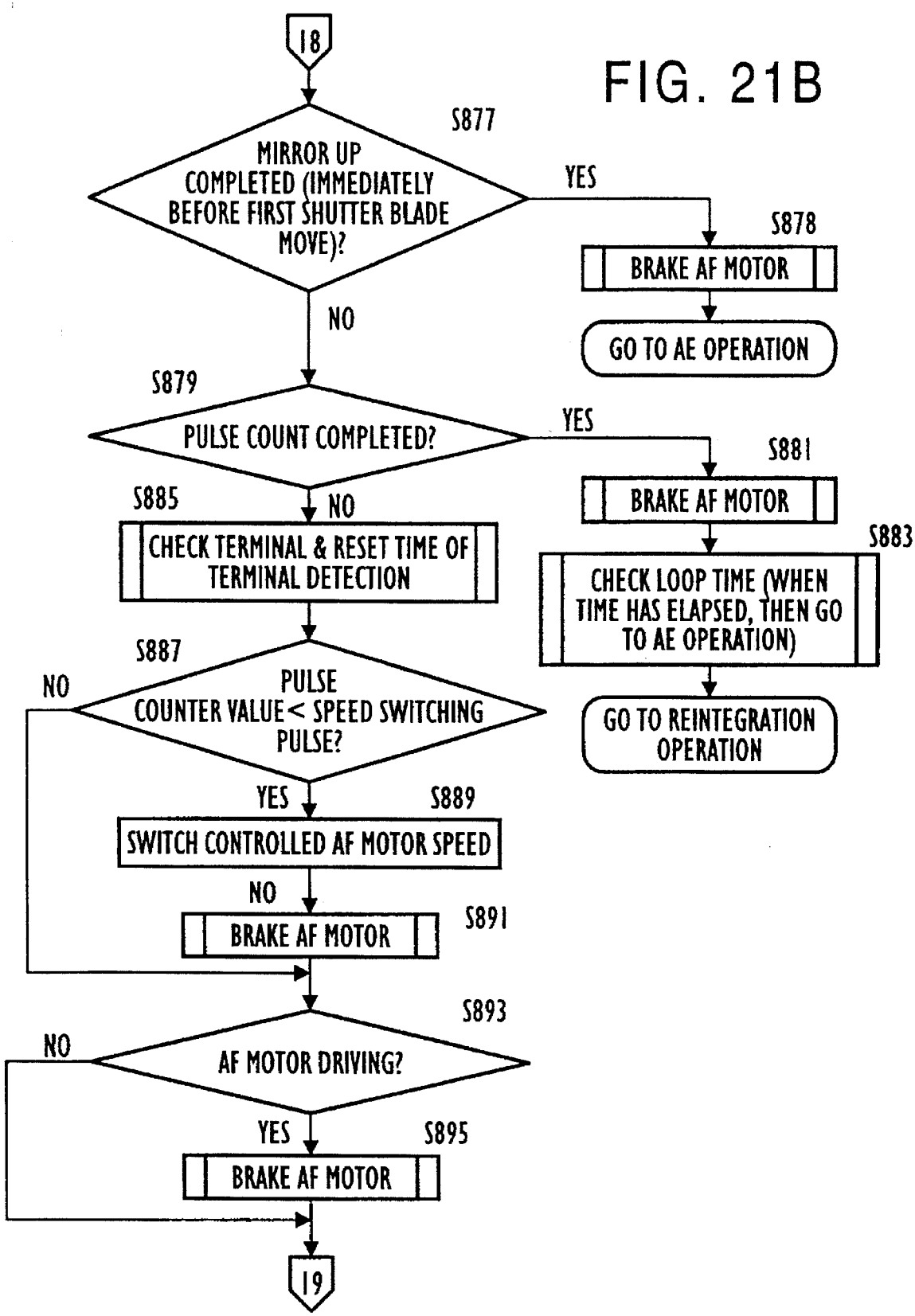

Constant Speed Control 2:

The following discussion will be directed to another constant speed control, with reference to FIGS. 21A and 21B.

The pulse duration $X_n$ is set in step S851. Thereafter, if the moving object is being traced, the tracing speed $S_n(1/X_n)$ is set (steps S853, S855). If the object is traced, and if the operation is the first operation after the tracing operation commences, the triple speed $3S_n$ of the tracing speed $S_n$ is reset (steps S857, S859). But, if the operation is the second or subsequent operation, resetting of the tracing speed is not effected (steps S853, S855, S857). If the calculation is completed (i.e., calculation completion flag=1), data, such as AF pulse, tracing speed $S_n$, etc., is input and set. Thereafter, the calculation completion flag is cleared (steps S861, S863 and S865). Thereafter, control returns to step S851.

If the calculation is not finished (i.e., calculation completion flag=0), whether the constant speed control time has elapsed is checked at step S867. If the constant speed control time has elapsed, the terminal point detecting counter begins counting. If the AF motor 39 is driven, control is returned to step S861 (steps S867, S869 and S871). If the AF motor 39 is not driven, the AF motor 39 starts and control returns to step S851 (steps S871 and S873).

If the constant speed control time has not elapsed, whether the AF pulses are outputted is checked (steps S867 and S875). If there is no output of the AF pulses, control is returned to step S861, and if the pulses are outputted, control proceeds to step S877.

At step S877, whether the upward movement of the mirror is completed is checked. If the upward movement of the mirror is completed, the AF motor 39 is braked and stopped (steps S877 and S878).

Conversely, if the upward movement of the mirror is not completed, whether the count of the AF pulses is completed is checked (step S879). If the count is finished, the AF motor 39 is stopped. Thereafter, the loop time is checked. If the loop time has elapsed, the AF operation is effected. If the loop time has not elapsed, control proceeds to the reintegration operation (steps S879, S881 and S883).

If the counting operation of the AF pulses is not finished in step S8879 the checking operation of the terminal point and the setting of the terminal point detecting timer are effected (step S885) thereafter, whether the value of the AF pulse counter is below the speed switching pulse number is checked (steps S879, S885, S887). If the value of the AF pulse counter is below the speed switching pulse number, the speed control is switched to a low speed control and the AF motor 39 is braked. Thereafter, control proceeds to step S893. Conversely, if the value of the AF pulse counter is not smaller than the speed switching pulse number, control directly proceeds to step S893 (steps S887, S889 and S891).

At step S893, whether the AF motor 39 is driven is checked. If the AF motor 39 is not driven, control is directly returned to step S851. Conversely, if the AF motor 39 is driven, the AF motor 39 is braked. Thereafter, control is returned to step S851 (step S895).

Integration Operation:

In the subroutine of the reintegration operation, the reintegration operation commences after initialization, and the reintegration operation flag is set (steps S901, S903 and S905). The integration operation time is checked until the integration operation is completed (steps S907 and S909). If the integration operation time is longer than a predetermined time, the object is too dark to be photographed. Accordingly, the moving object predicting mode forbidding flag is set (steps S909 and S911).

If the integration operation is finished, the integral data is inputted to calculate the defocus amount (steps S907, S909 and S911). If the calculation result is effective and the mode is the moving object predicting mode, the object tracing speed is calculated. Thereafter, the calculation completion flag is set. Thereafter, control proceeds to step S925. If the calculation result is not effective, control is returned to step S901 (steps S919, S921 and S923). At step S925, whether or not the AF release permission flag is set is checked. If the AF release permission flag is not set, control is returned to step S901, and if the AF release permission flag is set, control proceeds to the release operation.

Figure 18:
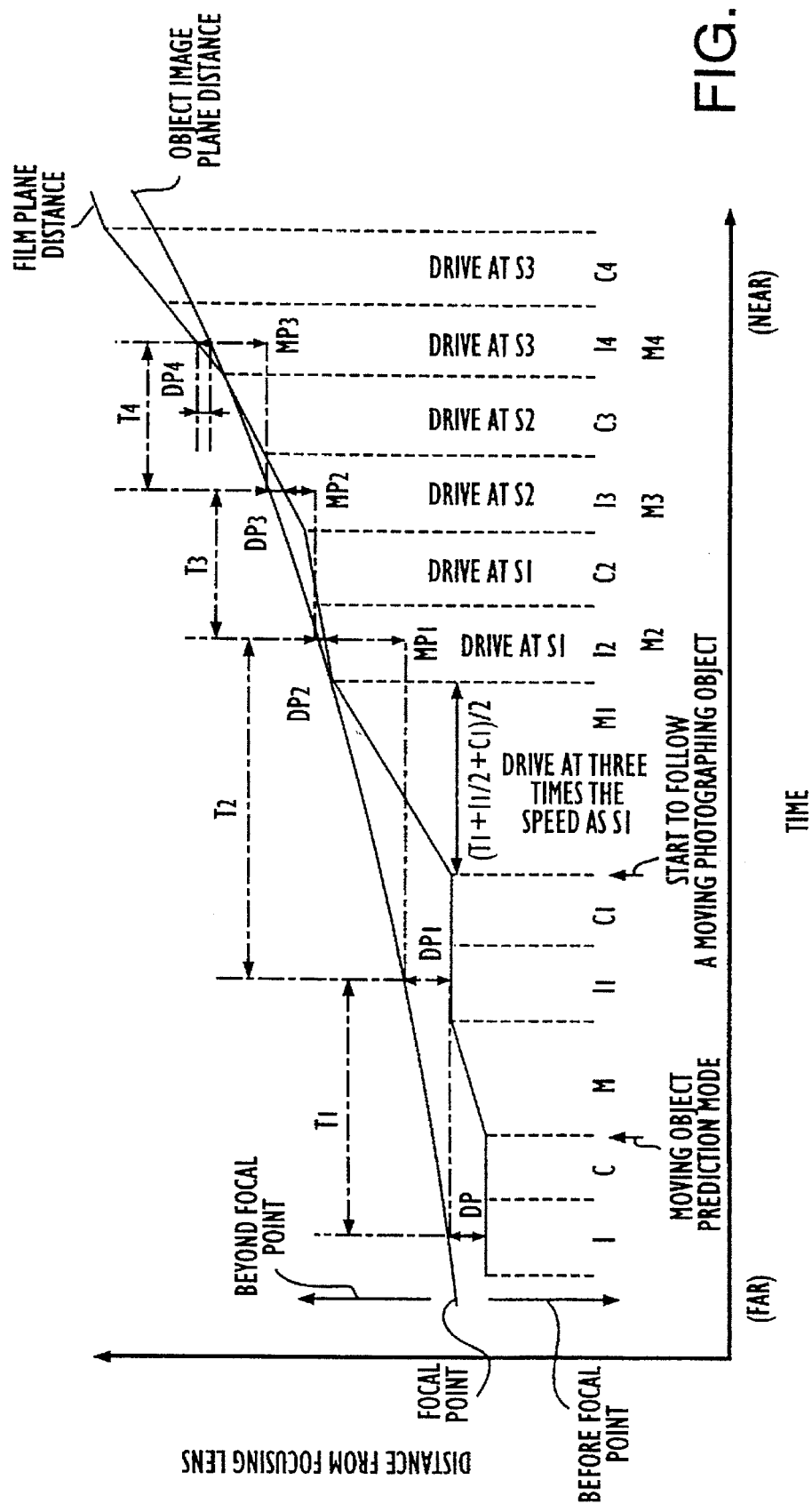
FIG. 18 is a graph showing a second moving object predicting AF mode operation in an automatic focusing apparatus according to the present invention.
Figure 19:
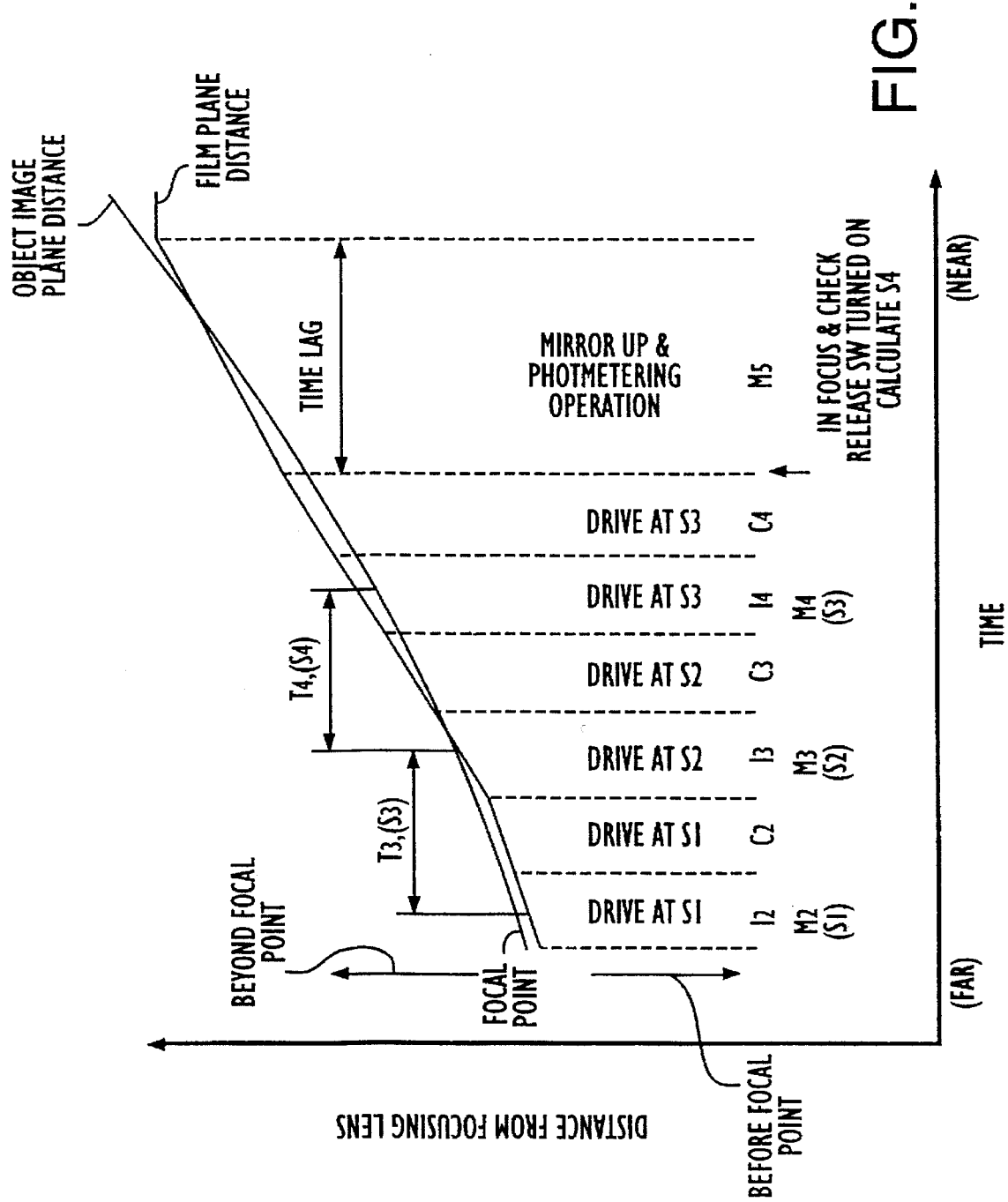

As can be understood from the above discussion, since the focusing lens group 53 is driven by a constant speed control during the integration and calculation, as shown in FIGS. 18 and 19, the moving object can be precisely kept in focus.

According to the present invention, even if the object is once in-focus, if the object is out of focus in the AF operation at a predetermined time later, it is assumed that the object is moving. Accordingly, the movement of the object can be detected even when the object is accidentally in-focus, for example, in the case that the object approaching the camera is focused with the focusing lens group moving from a near focal position to a far focal position.

Although the object is judged to be a moving object when three consecutive out-of-focus states are detected in the AF operation after the object is once in-focus, as in the illustrated embodiment, the number of out-of-focus states to be detected is not limited to three. Furthermore, it is possible to judge the moving object when more than one discontinuous or consecutive out-of-focus state is detected in the AF operation after the detection of one in-focus state.

As can be seen from the above discussion, according to the present invention, when the focus judging means determines that the object is in-focus, the object distance measuring means and the lens driving means are actuated after the lapse of a predetermined time. Thereafter, if the focus judging means determines that the object is out-of-focus more than one time, the object is considered to be a moving object. Consequently, the moving object can be detected even if the object continues moving after it is once focused or the focusing lens is moved in the direction opposite to the direction of movement of the object, thereby bringing the object into focus.

Furthermore, according to the present invention, when the object moves, the focusing lens group is moved at a speed corresponding to the speed of movement of the object image. Accordingly, the moving object can be precisely brought into in focus.

Furthermore, if the object is a moving object, the measurement of the defocus amount and the calculation of the speed of movement of the object image are repeatedly effected, and the lens driving means drives the focusing lens group at the latest tracing speed during the measurement or the calculation. Consequently, the in-focus state can always be substantially maintained. According to the present invention, since the focusing lens group is driven at the same speed as the speed of movement of the object image until the exposure commences, the exposure can be effected in the in-focus state.

In addition to the foregoing, according to the present invention, if the object contrast is low, the defocus amount for the object is temporarily stored and the object distance is again measured, so that the defocus amount obtained by the re-measurement is compared with the stored defocus amount. As a result, a smaller defocus amount is selected and little or no measurement error occurs. Namely, there is little or no possibility that the moving object, which is in-focus, is determined to be out-of-focus, thus resulting in the elimination of unsteady blinking of the focus state indication light.

Furthermore, if there is a backlash, since the focusing lens groups is driven to compensate for the displacement corresponding to the backlash, independently of the driving operation based on the defocus amount the calculation for obtaining the sum of the displacement based on the backlash and the displacement based on the defocus amount is not necessary, thereby simplifying the calculation.

According to the present invention, the lens driving speed for the defocus amount varies depending on the displacement of the focusing lens group. Namely, if there is a large displacement, the driving speed is increased to shorten the drive time. If there is a small displacement, the driving speed is decreased to prevent the focusing lens group from moving beyond the intended position (over displacement).

I claim:

1. An automatic focusing apparatus that includes an optical system having a group of focusing lenses, means for measuring a defocus amount, and means for driving said focusing lens group, comprising:

means for calculating a displacement of said focusing lens group, including a direction and amount of movement thereof, in accordance with said defocus amount measured by said defocus amount measuring means; and a controller that drives said lens driving means in accordance with said displacement calculated by said lens displacement calculating means and for controlling a displacement necessary to compensate for a backlash, independently of a drive based on said defocus amount when said direction of movement of said focusing lens group changes, wherein said controller drives said lens driving means by said displacement corresponding to said backlash at a high speed and a low speed when said displacement based on said defocus amount is above and below a predetermined value, respectively.

2. The automatic focus apparatus of claim 1, wherein said automatic focusing apparatus is applied to a camera having a memory for storing data on said displacement corresponding to said backlash.

3. The automatic focus apparatus of claim 2, wherein said camera includes a camera body, and a taking lens that is detachably attached to said camera body, said defocus amount measuring means, said lens driving means, said lens displacement calculating means, and said controller means being provided in said camera body.

4. The automatic focus apparatus of claim 3, wherein said camera body has a memory for storing data of a displacement corresponding to said backlash on said camera body side, and said taking lens has a memory for storing data of a displacement corresponding to a backlash on said taking lens side, respectively.

5. The automatic focus apparatus of claim 4, wherein said controller drives said lens driving means by a displacement necessary to absorb said backlash in accordance with said backlash data red from said memory of said camera body and said taking lens.

6. An automatic focusing apparatus that includes an optical system having a group of focusing lenses, means for measuring a defocus amount, and means for driving said focusing lens group, comprising:

means for calculating a displacement of said focusing lens group, including a direction and amount of movement thereof, in accordance with said defocus amount measured by said defocus amount measuring means; and a controller that drives said lens driving means in accordance with said displacement calculated by said lens displacement calculating means and for controlling a displacement necessary to compensate for a backlash, independently of a drive based on said defocus amount when said direction of movement of said focusing lens group changes, wherein said controller further comprises:

means for carrying out a backlash compensation drive by a DC drive operation of said lens driving means when said displacement necessary to compensate for backlash is larger than a predetermined value; and means for carrying out a backlash drive by a constant speed driving operation of said lens driving means when said displacement necessary to compensate for backlash is smaller than said predetermined value.

7. The automatic focusing apparatus of claim 1, wherein said drive based on said defocus amount is carried out at a high speed when said displacement is above a predetermined value, and is carried out at a low speed when said displacement is below said predetermined value.

8. An automatic focusing apparatus for a lens, in which a lens is driven in response to a measured defocus amount, the automatic focusing apparatus comprising:

a controller that controls a backlash compensation drive that is independent of the driving of the lens based on the measured defocus amount when a direction of movement of the lens changes, said backlash compensation drive comprising:

means for performing a DC drive operation when a displacement necessary to compensate for backlash is larger than a predetermined value; and means for performing a constant speed driving operation when said displacement necessary to compensate for backlash is smaller than said predetermined value.

9. The automatic focusing apparatus of claim 8, wherein said automatic focusing apparatus is associated with a camera, said camera comprising a camera body and a taking lens detachably attached to the camera body, wherein said controller is provided in said camera body.

10. The automatic focusing apparatus of claim 9, wherein said camera body includes a memory that stores data of a camera body side contribution to said displacement necessary to compensate for said backlash, and said lens includes a memory that stores data of a lens side contribution to said displacement necessary to compensate for said backlash.

* * * * *

UNITED STATES PATENT AND TRADEMARK OFFICE
CERTIFICATE OF CORRECTION

PATENT NO. : 5,640,225
DATED : June 17, 1997
INVENTOR(S) : Masahiro NAKATA

It is certified that error appears in the above-identified patent and that said Letters Patent is hereby corrected as shown below:

On the cover, in section [56], "Foreign Patent Documents", insert ---A2 349 736  1/1990 European Patent Office---.

On the cover, in section [56], "Foreign Patent Documents", insert ---A3 349 736  1/1990 European Patent Office---.

At column 28, line 56 (claim 5, line 4), change "red" to ---read---.

Signed and Sealed this

Twenty-ninth Day of December, 1998

Attest:

BRUCE LEHMAN

*Attesting Officer*   Commissioner of Patents and Trademarks